(12) United States Patent
Freedman

(10) Patent No.: US 11,542,838 B2
(45) Date of Patent: Jan. 3, 2023

(54) HYBRID HEAT ENGINE SYSTEM

(71) Applicant: Job E. Freedman, Salt Lake City, UT (US)

(72) Inventor: Job E. Freedman, Salt Lake City, UT (US)

( * ) Notice: Subject to any disclaimer, the term of this patent is extended or adjusted under 35 U.S.C. 154(b) by 119 days.

(21) Appl. No.: 17/011,951

(22) Filed: Sep. 3, 2020

(65) Prior Publication Data
US 2022/0065137 A1 Mar. 3, 2022

(51) Int. Cl.
*F01K 11/00* (2006.01)
*F01K 17/00* (2006.01)

(52) U.S. Cl.
CPC ............. *F01K 11/00* (2013.01); *F01K 17/00* (2013.01)

(58) Field of Classification Search
CPC .......... F01K 11/00; F01K 11/02; F01K 13/02; F01K 21/04; F01K 21/005; F01K 23/108; F01K 27/005; F01K 9/023; F01K 17/00; F03B 13/00; F03B 17/005; F05B 2210/13; Y02E 20/16; Y02P 80/15
See application file for complete search history.

(56) References Cited

U.S. PATENT DOCUMENTS

| | | | |
|---|---|---|---|
| 4,370,860 A | 2/1983 | Assaf | |
| 4,430,861 A | 2/1984 | Avery | |
| 5,488,828 A * | 2/1996 | Brassard | F03G 3/00 60/641.6 |
| 6,094,914 A | 8/2000 | Zorner | |
| 6,202,417 B1 | 3/2001 | Beck | |
| 6,412,281 B2 | 7/2002 | Cover | |
| 7,021,900 B2 * | 4/2006 | Prueitt | F04F 7/02 417/92 |
| 7,260,934 B1 * | 8/2007 | Roberts | F01K 13/02 60/671 |
| 7,748,219 B2 * | 7/2010 | Baker | F03G 6/02 60/641.15 |
| 8,047,808 B2 | 11/2011 | Kondo | |
| 9,220,996 B2 | 12/2015 | Xu et al. | |
| 10,273,168 B2 | 4/2019 | Riley et al. | |
| 2010/0199667 A1 | 8/2010 | Ullman | |
| 2010/0275599 A1 | 11/2010 | Glynn | |

(Continued)

FOREIGN PATENT DOCUMENTS

WO 2019173386 A1 9/2019

OTHER PUBLICATIONS

International Search Report and Written Opinion dated Apr. 30, 2019, on application No. PCT/US2019/020818.

(Continued)

*Primary Examiner* — Loren C Edwards
(74) *Attorney, Agent, or Firm* — Lowenstein Sandler LLP

(57) ABSTRACT

A hybrid heat engine system includes a valve configured to provide first fluid from a heat source. The hybrid heat engine system further includes one or more first pipes fluidly coupled between the valve and a turbine. The one or more first pipes house a second fluid. The hybrid heat engine system further includes a chamber disposed between the valve and the one or more first pipes. The hybrid heat engine system further includes a piston disposed in the chamber between the first fluid and the second fluid. At least a portion of the second fluid is to be pushed through the turbine to generate energy responsive to actuation of the valve.

16 Claims, 19 Drawing Sheets

(56) References Cited

U.S. PATENT DOCUMENTS

| | | |
|---|---|---|
| 2010/0326069 A1 | 12/2010 | Fong et al. |
| 2013/0031903 A1 | 2/2013 | Van Ryzin et al. |
| 2013/0276446 A1* | 10/2013 | Hall ..................... F01K 23/101 60/645 |
| 2013/0276447 A1 | 10/2013 | Chaix |
| 2015/0285227 A1 | 10/2015 | Wei |
| 2016/0108899 A1 | 4/2016 | Favy |
| 2016/0312646 A1 | 10/2016 | Juano |
| 2016/0363114 A1 | 12/2016 | Johnson |
| 2019/0271294 A1 | 9/2019 | Freedman |

OTHER PUBLICATIONS

International Search Report and Written Opinion dated Jan. 14, 2022 for PCT Application No. PCT/US2021/0445115.

* cited by examiner

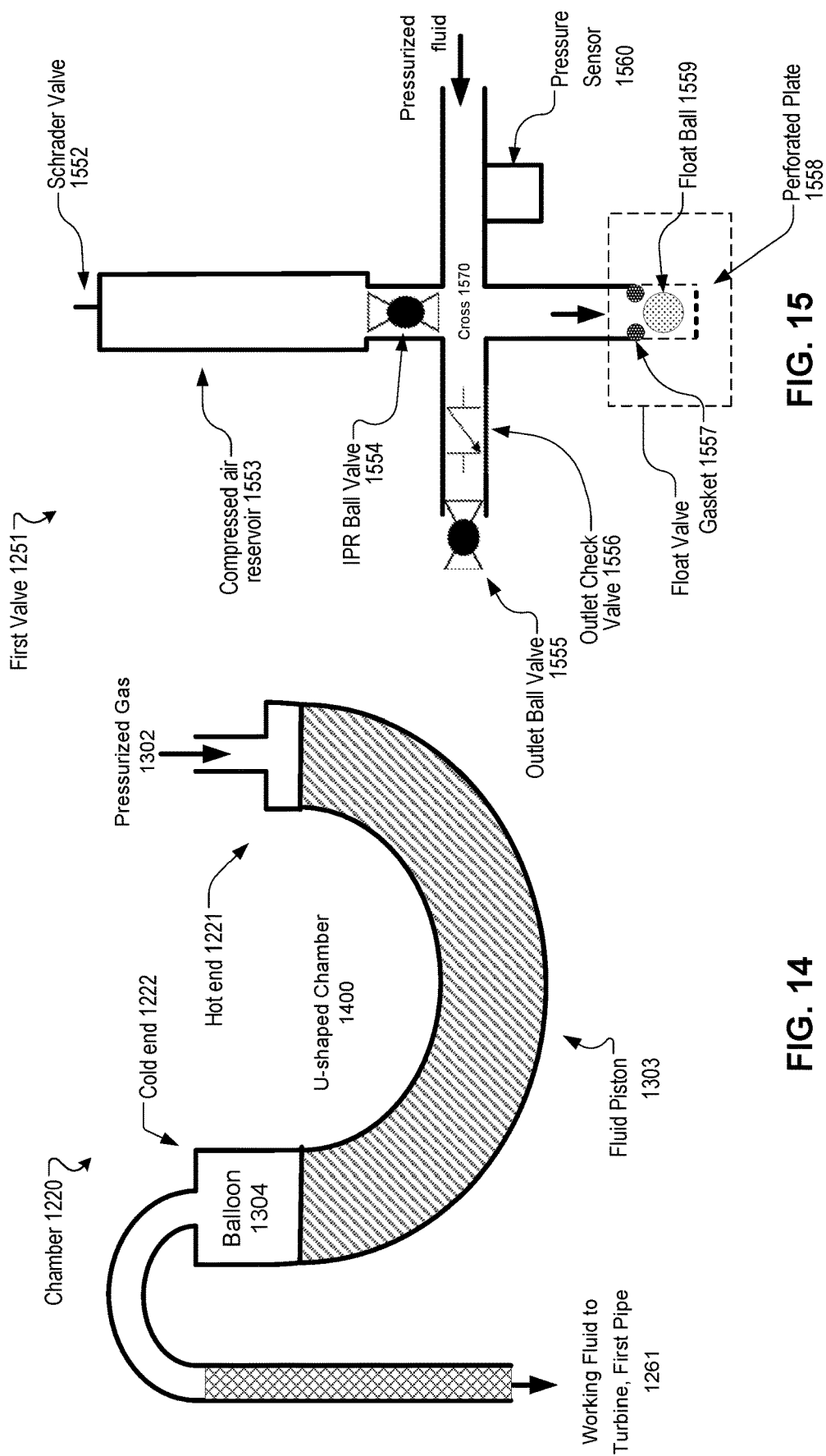

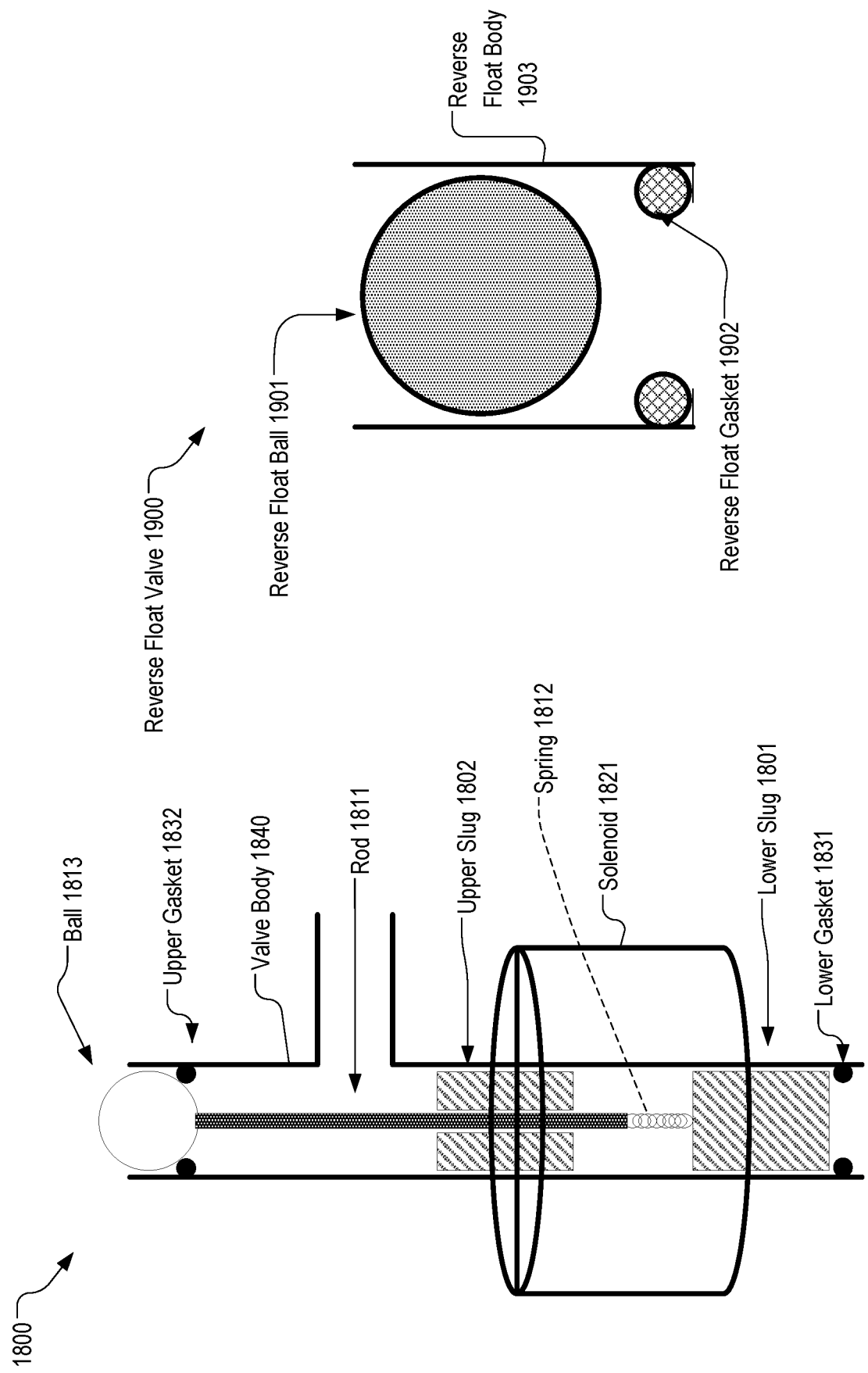

HYBRID HEAT ENGINE SYSTEM

BACKGROUND

Systems are used to convert one type of energy to another type of energy. A system can convert thermal energy to mechanical energy. The thermal energy may be associated with a heat source and a heat sink.

BRIEF DESCRIPTION OF DRAWINGS

The examples described herein will be understood more fully from the detailed description given below and from the accompanying drawings, which, however, should not be taken to limit the application to the specific examples, but are for explanation and understanding only.

FIG. 14 is a schematic diagram illustrating a chamber, according to certain embodiments.

FIG. 15 is a schematic diagram illustrating a valve assembly, according to certain embodiments.

FIG. 18 is a schematic diagram illustrating a solenoid drain valve (SDV), according to certain embodiments.

FIG. 19 is a schematic diagram illustrating a reverse float valve, according to certain embodiments.

DETAILED DESCRIPTION

Figure 1A:
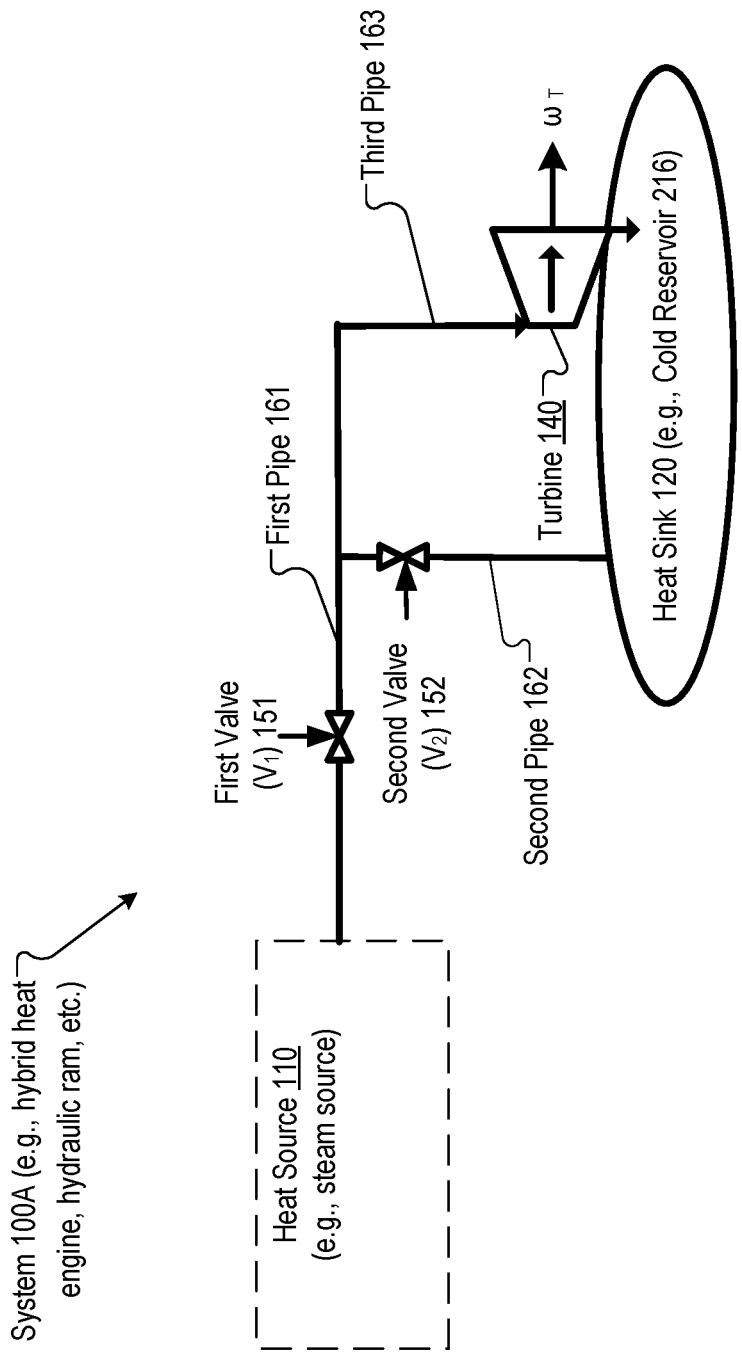
FIG. 1A is a schematic diagram illustrating a system to convert energy, according to certain embodiments.

Embodiments described herein are related to a hybrid heat engine system (e.g., a system to convert energy).

Systems are used to convert one type of energy to another type of energy. A system can convert thermal energy to mechanical energy. The thermal energy may be associated with a heat source and a heat sink. A system (e.g., heat engine) may bring a working fluid from a higher state temperature to a lower state temperature to convert thermal energy to mechanical energy to do mechanical work. A heat source may generate thermal energy that brings the working fluid to the high temperature state. The working fluid may generate work in the system (e.g., heat engine) while transferring heat to a heat sink until the working fluid reaches the low temperature state. Thermal energy may be converted into work by exploiting the properties of the working fluid. Increasing the temperature differential between the heat source and the heat sink increases the thermal efficiency of the system. The heat sink of heat engines is generally limited to being close to the ambient temperature of the environment, so most efforts to improve the thermal efficiency of heat engines focus on increasing the temperature of the heat source. Conventional heat engines use high-temperature heat sources and large temperature differentials between the heat source and the heat sink. The temperature of conventional heat engines are limited by the melting points of the materials that make up the heat engine, environmental concerns (e.g., limits on oxides of nitrogen (NOx) production, etc.), availability of high-temperature heat sources, etc. Conventional heat engines cannot efficiently extract energy from low-temperature heat sources. Conventional heat engines cannot efficiently extract energy from working fluid once the working fluid reaches a threshold temperature. This leads to wasted energy and a waste disposal problem.

Described herein are technologies of a hybrid heat engine system (e.g., a system to convert energy). In some embodiments, the system transforms a low-level temperature differential between a heat source and a heat sink into useful electrical power.

In some embodiments, the hybrid heat engine system is an energy-producing hydraulic ram system. A hydraulic ram system is a system that uses water hammer effect to raise a fluid at an original hydraulic head to a higher hydraulic head (e.g., this change in pressure can be used to convert energy and/or produce electricity).

In some embodiments, the hybrid heat engine system includes a valve, one or more first pipes, a chamber, and a piston. The valve is configured to provide a first fluid (e.g., gas, steam, etc.) from a heat source. The one or more pipes are fluidly coupled between the valve and a turbine. The one or more pipes house a second fluid (e.g., working fluid, water, fluid at a lower pressure than the steam from the heat source, etc.). The chamber is disposed between the valve and the one or more first pipes. The piston is disposed in the chamber between the first fluid and the second fluid. At least a portion of the second fluid is to be pushed through the turbine to generate energy responsive to actuation of the valve.

In some embodiments, a first distal end of the chamber is fluidly coupled to the heat source to receive the first fluid from the heat source responsive to actuation of the valve and a second distal end of the chamber is fluidly coupled to the one or more first pipes (e.g., one or more first pipes housing the second fluid) to receive a first amount of the second fluid. The piston is configured to move the first amount of the second fluid responsive to the actuation of the valve to increase pressure of the second fluid (e.g., cause water hammer in the second fluid) and to push at least a portion of the second fluid through the turbine.

In some embodiments, the hybrid heat engine system includes one or more second pipes fluidly coupled between the turbine and the one or more first pipes. The second fluid has a cyclical flow from the one or more first pipes to the turbine, from the turbine to the one or more second pipes, and from the one or more second pipes to the one or more first pipes. In some embodiments, the cyclical flow causes the second fluid to not be discarded or wasted (e.g., after the second fluid passes through the turbine).

In some embodiments, the hybrid heat engine system includes a condenser fluidly coupled to the heat source and the one or more first pipes. The condenser may be configured to condense at least a portion of the first fluid (e.g., expended fluid from the heat source used to push the working fluid) into a liquid to be combined with the second fluid in the one or more first pipes. The condenser may use second fluid from the heat sink as the cooling fluid.

In some embodiments, a hybrid heat engine system includes a hydro-electric turbine, a steam source configurable to generate steam from a hot water source, a condenser, and a slug intake bend (SIB) in a first pipe coupled between the steam source and the condenser. The SIB is configurable to receive a slug of water from a cold water source. The steam from the hot water source pushes the slug of water up a vertical distance to the condenser. The condenser is configurable to receive the slug of water and the steam, mix the slug of water with the steam to generate liquid water, and power a turbine with the liquid water.

By using low-level temperature differentials between a heat source and a heat sink, the systems (e.g., hybrid heat engine system, energy-producing hydraulic ram system, etc.) described herein can produce electrical power from low-temperature heat sources (e.g., waste liquid from mechanical processes) that were previously unused (e.g., at too low of a temperature to be used) by conventional systems. The systems described herein may use a heat engine that is not below ambient temperature (e.g., does not require lowering temperature of the heat sink below ambient temperature). The systems described herein may be made of materials with lower melting points than conventional systems (e.g., the low-temperature heat sources of the systems described herein can be used with materials with lower melting points than materials of conventional systems used with high-temperature heat sources). The systems described herein may have a better impact on the environment than conventional systems by extracting energy from low-temperature heat sources (e.g., waste water) whereas conventional systems generally dispose of the low-temperature heat sources (e.g., heating and providing waste to the environment).

The devices, systems, and methods disclosed herein have advantages over conventional solutions. The present disclosure has advantages of cost, efficiency, and adaptability when compared to conventional solutions. The present disclosure can be implemented under varying conditions. In some embodiments, the present disclosure can convert the thermal energy in water at temperatures at about 100 degrees Celsius to mechanical and electrical power. The present disclosure can be used in industries where low temperature waste heat is abundant and is currently underutilized. Such applications include mining, refining, and power generation industries.

Although some embodiments of the present disclosure refer to a system using steam and water, in some embodiments, other fluids can be used. For example, one or more types of gas (e.g., air, oxygen, steam, nitrogen, a refrigerant, exhaust gas, etc.) and/or liquids (e.g., water, a refrigerant, ammonia, waste water, waste liquid, etc.) can be used.

FIG. 1A is a schematic diagram illustrating a system 100A to convert energy, according to certain embodiments. In some embodiments, system 100A is a hybrid heat engine system that transforms a low-level temperature differential between a heat source and a heat sink into useful electrical power. In some embodiments, system 100A is a hydraulic ram (hydram) system. In some embodiments, system 100A is a hydram heat engine system. In some embodiments, system 100A (e.g., hydram system, hydram heat engine system) uses a fluid piston through the hydraulic ram effect. The piston divides a chamber (e.g., cylinder) and is situated between a first distal end and second distal end of the chamber. When hot first fluid (e.g., water) is introduced at the first distal end of the chamber there is a small pressure differential between the first distal end and second distal end of the chamber. This pressure differential causes the piston to accelerate in the chamber from the first distal end to the second distal end of the chamber, gaining kinetic energy (KE) as it accelerates. As the piston reaches the second distal end of the chamber it is forced to decelerate rapidly. This rapid deceleration causes the KE of the piston to be transformed to a pressure surge in a second fluid on the second distal end of the chamber. This high-pressure second fluid is then passed through a high-pressure turbine, generating mechanical or electrical power (e.g., using hydraulic ram effect). In some embodiments, system 100A uses the hydraulic ram effect to take advantage of efficiencies inherent to a high-pressure turbine compared to a low pressure turbine.

System 100A may produce electric power from a lower temperature heat source. For example, system 100A may combine characteristics of a steam engine and a power plant (e.g., hydropower plant) to economically produce electric power from a low temperature heat source.

System 100A may be coupled to a heat source 110 and a heat sink 120. In some embodiments, the heat source 110 may be configured to provide a fluid (e.g., gaseous fluid, steam, heated liquid) at higher-than-ambient temperature. The heat source 110 may be configured to generate steam from a hot water source. In some embodiments, the heat source 110 may harness waste (e.g., exhaust) or excess steam from a manufacturing or refining process. In some embodiments, the heat sink 120 is a cold reservoir 216 (e.g., cold reservoir 216 of FIG. 2). In some embodiments, heat sink 120 is a pool or reservoir of water. In some embodiments, heat sink 120 includes a pipe that houses fluid (e.g., spillway). In some embodiments, heat sink 120 includes a cooling tower or a set of cooling towers.

In some embodiments, system 100A is coupled to a turbine 140. In some embodiments, system 100A includes turbine 140. The turbine 140 may be a hydro-electric turbine. The turbine 140 may be a high-pressure turbine. System 100A may include one or more valves 150 including a first valve 151 and/or a second valve 152. The system 100A may include one or more pipes 160 including a first pipe 161, a second pipe 162, and/or a third pipe 163.

The heat source 110 may provide fluid (e.g., steam) to an input of the first valve 151.

The first pipe 161 may be fluidly coupled between the heat source 110 and the turbine 140 (e.g., via the third pipe 163). The second pipe 162 may be fluidly coupled between the turbine 140 and the first pipe 161 (e.g., fluidly coupled via the heat sink 120, the second pipe 162 includes the heat sink 120, etc.).

In some embodiments, a chamber is disposed between the first valve 151 and the first pipe 161. In some embodiments, a piston (e.g., fluid piston, oil on water) is disposed in the chamber between a first fluid (e.g., steam) provided from the heat source 110 and a second fluid disposed in the first pipe 161. In some embodiments, at least a portion of the second fluid is to be pushed through the turbine 140 to generate energy responsive to actuation of the first valve 151 (e.g., which causes the piston to move and cause water hammer and/or increased pressure in the second fluid in the first pipe 161, system 100A being a hydram system).

In some embodiments, a second valve 152 is coupled to the first pipe 161 and the heat sink 120. The second valve 152 may be configured to allow a first amount of cold water (e.g., a slug of water) to flow from the cold water source (e.g., heat sink 120) into the first pipe 161. The first valve 151 may be controlled to provide fluid (e.g., steam) from the heat source 110 to push the slug of water (e.g., via a slug intake bend) through the turbine 140 to generate energy.

In some embodiments, a working fluid is pushed through one or more pipes (e.g., first pipe 161 and third pipe 163) and through a turbine 140 to generate energy responsive to actuation of the first valve 151. The working fluid may spin the turbine 140 to generate electrical power. Electrical power ($\omega_T$) may be the work of the turbine 140 over time (e.g., rate of the work of the turbine 140).

Figure 1B:
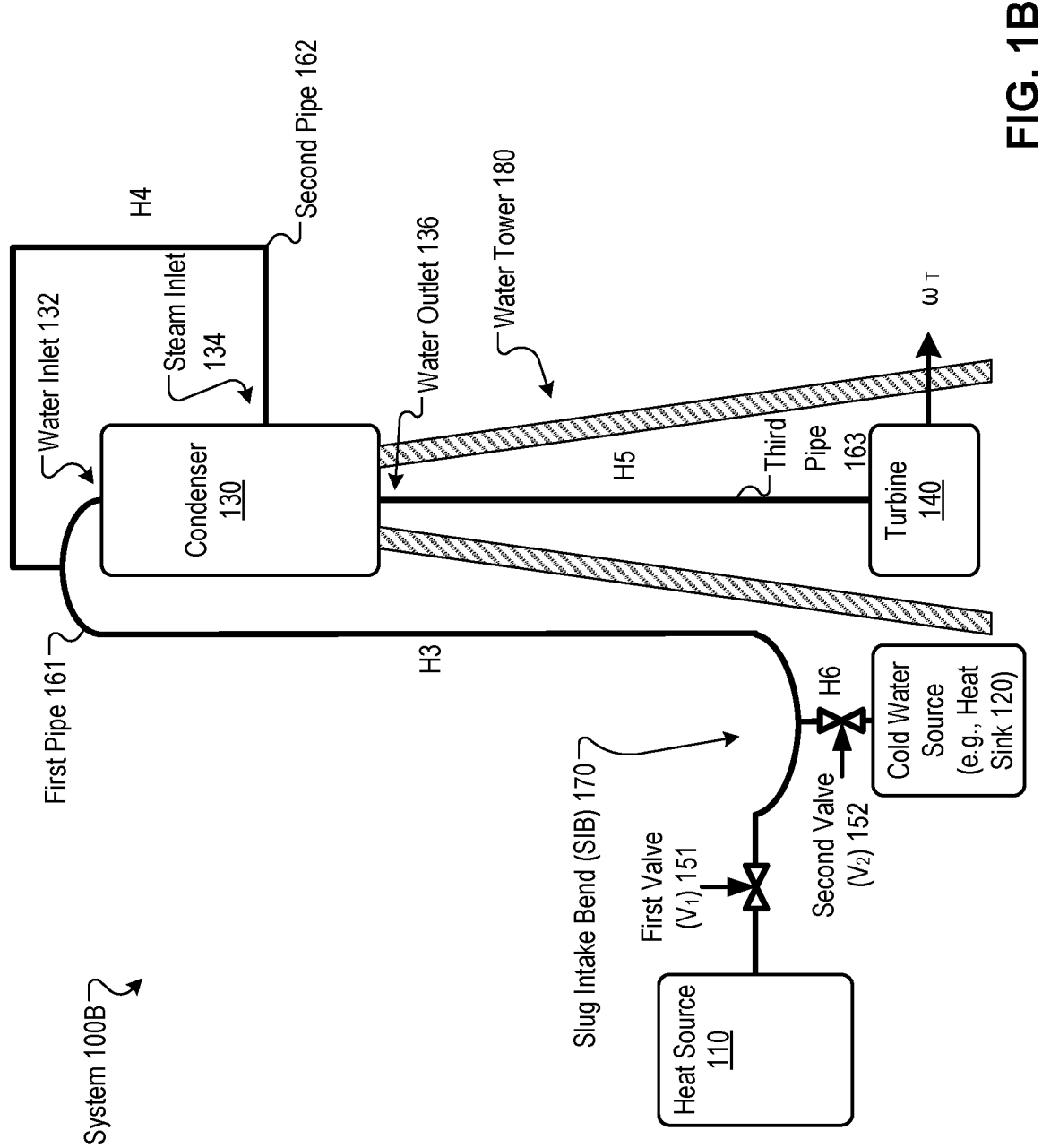
FIG. 1B is a schematic diagram illustrating a system to convert energy, according to certain embodiments.

FIG. 1B is a schematic diagram illustrating a system 100B (e.g., system 100A of FIG. 1A) to generate electrical power, according to one embodiment. System 100B may be a heat engine that transforms a low-level temperature differential between a heat source and a heat sink into useful electrical power. System 100B may be a hybrid heat engine. A hybrid heat engine may produce electric power from a lower temperature heat source, For example, a hybrid heat engine may combine characteristics of a steam engine and a power plant (e.g., hydropower plant) to economically produce electric power from a low temperature heat source.

System 100B may be coupled to a heat source 110 and a cold water source (e.g., heat sink 120). The heat source 110 may be configurable to generate steam from a hot water source. System 100B may include a condenser 130. In some embodiments, system 100B is coupled to a turbine 140. In some embodiments, system 100B includes turbine 140. The turbine 140 may be a hydro-electric turbine. The turbine 140 may be a high-pressure turbine. System 100B may include valves 150 including a first valve 151 and a second valve 152. The system 100B may include pipes 160 including a first pipe 161, a second pipe 162, and a third pipe 163. The first pipe 161 may include a slug intake bend (SIB) 170. The system 100B may include a water tower 180.

The heat source 110 may be located at a first height. The heat source 110 may provide steam to an input of the first valve 151.

In some embodiments, the condenser 130 is a jet condenser. In some embodiments, the condenser 130 is a surface condenser. In some embodiments, the condenser is an air-cooled condenser. For example, if the ambient temperature is very low (e.g., the condenser 130 is outside in the winter in a cold climate), an air condenser may be used. The condenser 130 may be disposed at a top end of a water tower 180. The condenser 130 may have a water inlet 132, a steam inlet 134, and a water outlet 136. The condenser 130 may be located at a second height that is at a higher elevation than the first height of the heat source 110 (e.g., steam source).

The first pipe 161 may be coupled between the heat source 110 and the water inlet 132 of the condenser 130. The second pipe 162 may be coupled between a top portion of the first pipe 161 and the steam inlet 134 of the condenser 130.

A second valve 152 may be coupled to the SIB 170 and the cold water source (e.g., heat sink 120). The second valve 152 may be controlled to inject a first amount of cold water from the cold water source (e.g., heat sink 120) into the SIB 170. The first valve 151 may be controlled to inject the steam into the first pipe 161. The steam may push the first amount of cold water as a slug of water through a vertical portion of the first pipe 161 upwards to the water inlet 132 of the condenser 130. The vertical portion may correspond to the second height of the water tower 180. The steam in the first pipe 161 may enter the second pipe 162 to be input into the steam inlet 134 of the condenser 130.

The third pipe 163 may be coupled between the water outlet 136 of the condenser 130 and an input of the turbine 140 that is located at a lower elevation than the condenser 130. The cold water received by the condenser 130 via the water inlet 132 and the steam received by the condenser 130 via the steam inlet 134 may mix in the condenser 130. The cold water may condense the steam in the condenser 130. The liquid water (e.g., cold water and steam that is condensed by the cold water) in the condenser 130 may flow (e.g., fall) through the third pipe 163 to the input of the turbine 140 responsive to being output from the water outlet 136 of the condenser 130. The third pipe 163 may be a vertical pipe coupled to a bottom of the condenser 130 and a top portion of the turbine 140. The liquid water may spin the turbine 140 to generate electrical power. Electrical power ($\omega_T$) may be the work of the turbine 140 over time (e.g., rate of the work of the turbine 140).

Figure 2:
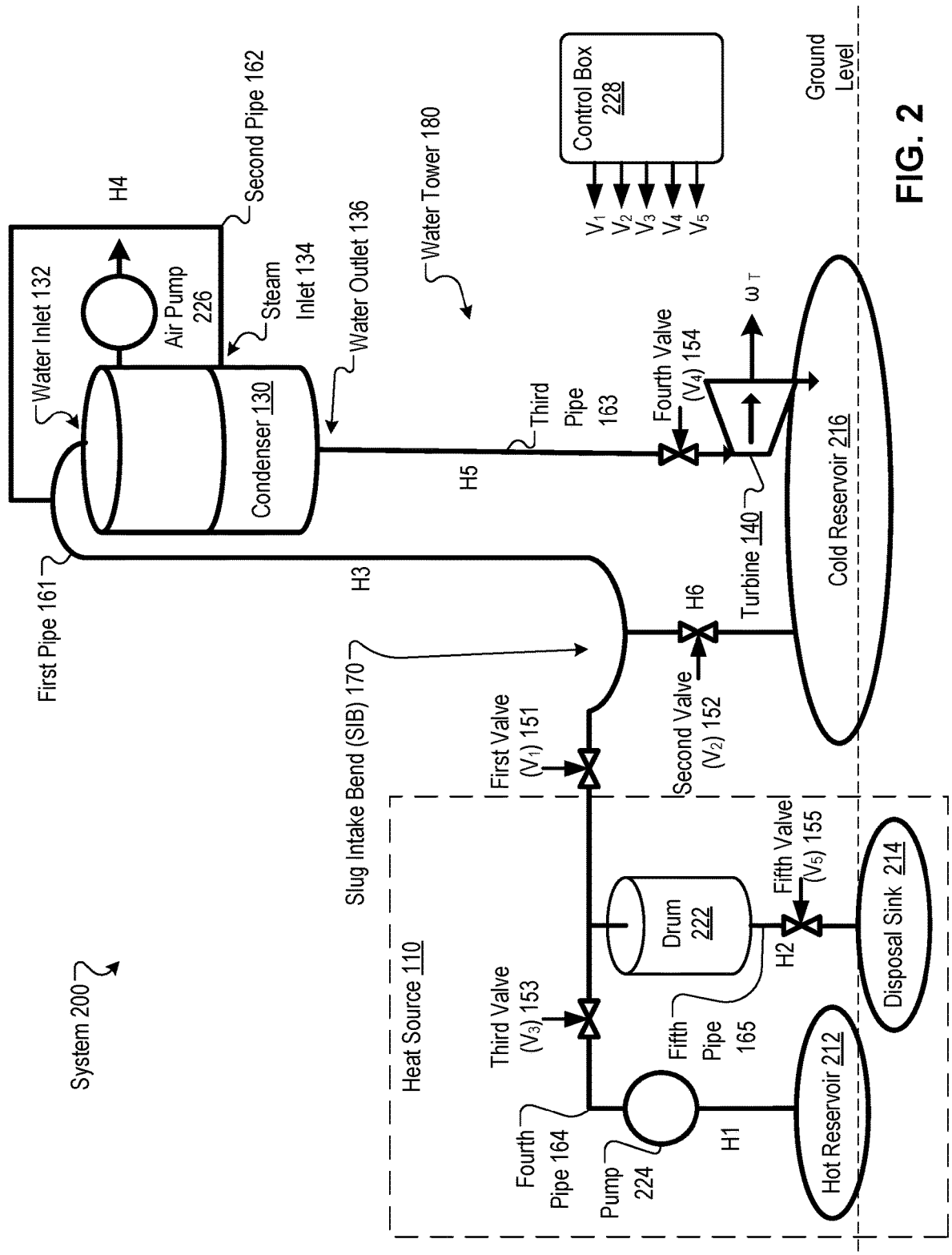
FIG. 2 is a schematic diagram illustrating a system to convert energy, according to certain embodiments.

FIG. 2 is a schematic diagram illustrating a system 200 (e.g., system 100A of FIG. 1A, system 100B of FIG. 1B) to generate electrical power, according another embodiment. Elements in FIG. 2 that have a similar reference number as elements in FIG. 1A and/or FIG. 1B may include similar features and similar functionality as the elements described in relation to FIG. 1A and/or FIG. 1B. System 200 may be a heat engine that transforms a low-level temperature differential between a heat source and a heat sink into useful electrical power. System 200 may be a hybrid heat engine. A hybrid heat engine may produce electric power from a lower temperature heat source, For example, a hybrid heat engine may combine characteristics of a steam engine and a power plant (e.g., hydropower plant) to economically produce electric power from a low temperature heat source.

System 200 may be coupled to a hot reservoir 212 (e.g., a steam source, heat source 110, etc.), a disposal sink 214, and a cold reservoir 216. System 200 may include or may be coupled to a drum 222 and a pump 224. System 200 may include an air pump 226 (e.g., vacuum pump) and control box 228. System 200 may include one or more of a first valve 151, a second valve 152, a third valve 153, a fourth valve 154, or a fifth valve 155. System 200 may include one or more of a first pipe 161, a second pipe 162, a third pipe 163, a fourth pipe 164, or a fifth pipe 165.

System 200 may be a heat engine that is coupled to a heat source and a heat sink. The heat engine may include a working fluid and may generate electrical power.

The heat sink may be the cold reservoir 216 (e.g., cold water source (e.g., heat sink 120), reservoir of cold water). The cold reservoir 216 may be located at a base of the turbine 140. The cold reservoir 216 may be a large reservoir of water that is cooled by direct exposure to the atmosphere and other surroundings. Cooling water and condensate from the turbine 140 may pass (e.g., be output) to the cold reservoir 216 (e.g., after use) where the cooling water and condensate is cooled to the temperature of the cold reservoir 216 by convection and evaporation. In one embodiment, the cold reservoir 216 is a natural body of water (e.g., lake, pond, ocean, river, stream, etc.) that is exposed to the atmosphere. In another embodiment, the cold reservoir 216 is a man-made body of water (e.g., a cooling pond, etc.) that is exposed to the atmosphere. In another embodiment, the cold reservoir 216 may include a liquid that is not water. For example, the cold reservoir 216 may include a refrigerant (e.g., ammonia). The cold reservoir 216 may include water with gas dissolved in the water at pressure (e.g., $P_{atm}$) higher than the pressure of the condenser (e.g., $P_{condenser}$). The water in the cold reservoir 216 may or may not be in a saturated state, but the non-condensable gases may remain dissolved until the pressure is reduced below a threshold pressure.

In one embodiment, the working fluid is water. In another embodiment, the working fluid is a refrigerant. For example, the working fluid may be ammonia. The working fluid may include gas (e.g., non-condensable gases) dissolved in the working fluid at the original pressure of the working fluid (e.g., $P_{atm}$). As the pressure is reduced below the original pressure (e.g., reduced towards $P_{condenser}$), the gas (e.g., non-condensable gases) may bubble out of the working fluid. The working fluid may be extracted from the cold reservoir 216 and expelled to the cold reservoir 216 (e.g., the working fluid and the fluid in the cold reservoir 216 may be the same fluid).

The heat source may be the hot reservoir 212. The hot reservoir 212 may be part of the heat source 110 (e.g., steam source). In one embodiment, the hot reservoir 212 includes waste water that is at a higher temperature than the cold reservoir 216. In one example, the waste water is from a processing plant. In another example, the waste water is from an oil refinery. In another embodiment, the hot reservoir 212 includes co-produced water from an oil platform (e.g., offshore platform, oil rig). In another example, the hot reservoir 212 includes cooling water that has been heated by a power plant. In another embodiment, the hot reservoir 212 includes exhaust from a power plant. In another embodiment, the hot reservoir 212 includes brackish water.

In one embodiment, a power plant may use multiple stages to extract energy from a working fluid or exhaust. The power plant may use system 200 to extract energy from a working fluid or exhaust subsequent to a first system extracting energy from the working fluid or exhaust. For example, a power plant (e.g., combined cycle power plant) may use a reciprocating engine to generate electrical power from working fluid or exhaust, may then use the exhaust output from the reciprocating engine to run a steam turbine to generate energy, and then may use system 200 to extract more energy from the exhaust output from a heat exchanger that heats the working fluid that goes into the steam turbine. By using system 200, a power plant may achieve higher efficiency and waste less energy.

In one embodiment, the hot reservoir 212 may be at a lower elevation (e.g., at the bottom of a hill or mountain) and the liquid water from the condenser 130 is at a higher elevation (e.g., at the top of a hill or mountain) than the hot reservoir 212. The liquid water may be at least a threshold distance below the condenser (e.g., 10 meters (m)). The turbine 140 may be at a lower elevation than the liquid water.

The liquid water from the condenser 130 may be stored at the higher elevation and may be allowed to flow down to the turbine 140 at the lower elevation to generate electrical power.

The water in the hot reservoir 212 may be at a first temperature ($T_H$) and a saturation pressure ($P_{H,sat}$) or atmospheric pressure ($P_{atm}$). In some embodiments, the pump 224 may pump water from the hot reservoir 212 into the drum 222 and may increase the pressure of the water to a pressure ($P_H$) that is above $P_{H,sat}$ (at the beginning of each cycle). In some embodiments, hot water at a pressure ($P_H$) higher than $P_{H,sat}$ being provided to the drum 222 (at the beginning of each cycle). The drum 222 may throttle the water to a pressure ($P_{drum}$) that is lower than $P_{H,sat}$. By throttling the water to $P_{drum}$, some of the liquid water changes to steam to expand up the pipe. Water in the cold reservoir 216 may be at atmospheric pressure ($P_{atm}$) and at a second temperature ($T_C$) that is less than $T_H$ (e.g., $T_C$=30 degrees Celsius (° C.) and $T_H$=100° C.).

The air pump 226 (e.g., a vacuum pump) may pump air (e.g., non-condensable gases) out of the condenser 130 to maintain the condenser 130 at a pressure ($P_{condenser}$) that is less than $P_{atm}$. The condenser 130, SIB 170, and first pipe 161 may all be at $P_{condenser}$. The air pump 226 may create a vacuum in the first pipe 161 (e.g., to suction cold water from the cold water source (e.g., heat sink 120) to the SIB 170, etc.). The air pump 226 may expel the non-condensable gases in the condenser 130 to the atmosphere (e.g., by bringing the non-condensable gases to a pressure exceeding atmospheric pressure). Non-condensable gases may include hydrogen sulfide, methane, etc. In some embodiments, the non-condensable gases are filtered as they are expelled from the condenser 130. In some embodiments, the non-condensable gases are discarded after being expelled from the condenser 130. In some embodiments, the non-condensable gases are burned after being expelled from the condenser 130. The burning of the non-condensable gases may be used to provide extra heat. For example, the extra heat can be used for heating the hot reservoir 212.

The heat source 110 (e.g., steam source) may include a drum 222, a pump 224, a third valve 153, and a fifth valve 155. The heat source 110 (e.g., steam source) may be coupled to a hot reservoir 212 and a disposal sink 214.

Hot water may be at $T_H$ and $P_{H,sat}$ (e.g., 212 degrees Fahrenheit (° F.) and 1 atmosphere (atm)) in the hot reservoir 212. A first amount of the hot water may be pumped by pump 224 from the hot reservoir into the drum 222 (with the third valve 153 open, the first valve 151 closed, and the fifth valve 155 closed). The first amount of the hot water may be pumped into the drum 222 at $P_H$, where $P_H$ is greater than $P_{H,sat}$. (e.g., $P_{H,sat}$ is 1 atm and $P_H$ is greater than 1 atm). Responsive to the first amount of hot water entering the drum 222, the third valve 153 may close. The hot water in the drum 222 is pressurized (at $P_{H,sat}$). The drum 222 may throttle the water to a pressure ($P_{drum}$) that is lower than $P_{H,sat}$. By throttling the water to $P_{drum}$, some of the liquid water changes to steam to expand up the first pipe 161. The first valve 151 may be opened and steam from the first amount of hot water in the drum 222 may expand into first pipe 161. The steam may decrease from $P_{drum}$ towards $P_{condenser}$ by expanding against a slug of water through first pipe 161. The viscosity of the water may hold the slug of water together as it is pushed by the steam. The pressure ($P_H$) of the steam and the amount of hot water in the drum 222 may be sufficient to push a first slug of water from the SIB 170 of the first pipe 161 into the condenser 130. A second slug of water may enter the SIB 170 (e.g., after the steam pushes the first slug into the condenser 130 or before the steam pushes the first slug into the condenser 130 as long as the first slug has the kinetic energy to enter the condenser). The second slug of water may be pushed by a second amount of steam and the second slug of water may push the previous amount of steam into the condenser 130.

The condenser 130 may mix the slug of water with the steam to generate a mixture (e.g., a saturated mixture). The steam, slug of water, and air pump 226 may maintain the condenser 130 at a constant pressure ($P_{condenser}$) and temperature ($T_{condenser}$). $T_{condenser}$ may be higher than $T_C$ and lower than $T_H$.

The fourth valve 154 may remain closed while the air pump 226 initially sets the pressure of the condenser 130 to $P_{condenser}$. The fourth valve 154 may also remain closed to store energy in the condenser 130. The fourth valve 154 may be opened to allow the liquid water from the condenser 130 to flow (e.g., fall) through the third pipe 163 to the turbine 140 to spin the turbine to generate electrical power. The liquid water may exit the turbine 140 to the cold reservoir 216. The liquid water from the turbine 140 may be at $T_{condenser}$ that is higher than $T_C$ of the cold reservoir 216. The liquid water at $T_{condenser}$ may mix with the water in the cold reservoir 216 (to meet equilibrium) and the cold reservoir 216 may maintain $T_C$ via convection and evaporation.

The drum 222 may be a throttling drum. The drum 222 may throttle the water to a pressure ($P_{drum}$) that is lower than $P_{H,sat}$. In some implementations, the drum is elevated at a height (H1) similar to the height of the SIB. The height H1 may be such that the steam outlet of the drum 222 may be as close as possible to the slug bottom face (e.g., H1 may be substantially similar to or the same as the height H6 of SIB 170). The drum 222 may be connected to the heat source (e.g., hot reservoir 212) by a fourth pipe 164 and a third valve 153. The third valve 153 may be a throttling valve.

The drum 222 may be connected to a disposal sink 214 that is vertically below the drum 222 by a fifth pipe 165 and a fifth valve 155. The disposal sink 214 may be located below the drum 222. The disposal sink 214 may be situated far enough below the drum 222 (vertical height H2) such that water easily drains out of the drum 222. The fifth valve 155 may be controlled to remove liquid water from the drum 222 (e.g., at the end of the cycle).

In some embodiments, the water may be drained out of the drum 222 when the drum 222 is at the pressure of the condenser 130 ($P_{condenser}$) and/or the temperature of the condenser ($T_{condenser}$). For example, the liquid in the drum 222 may be initially at 100° C. and the liquid may be drained once the liquid is proximate to 30° C. In some embodiments, the liquid may be drained out of the drum 222 at the end of each cycle.

In some embodiments, the liquid may be drained out of the drum when the liquid is at a pressure and/or temperature that are lower than $T_H$ and $P_H$, but higher than $T_{condenser}$ and $P_{condenser}$. For example, the liquid in the drum 222 may be initially at 100° C. and the liquid may be drained once the liquid is proximate to 60° C. when $T_{condenser}$ is at 30° C.

In some embodiments, there is a constant flow of hot water from the hot reservoir 212 into the drum 222 by flowing the hot water at a constant rate into the drum 222 and flowing steam and remaining hot water out of the drum 222. The drum 222 may be a drum or a throttling valve to adjust the pressure (e.g., reduce the pressure) of the steam to push the slug of water up the first pipe 161 into the condenser 130. The first valve 151 may close while the slug of water is being siphoned into the SIB 170 from the cold reservoir 216. The control box 228 may control first valve 151, second valve 152, third valve 153, and fifth valve 155 to provide the amount of water in each slug and the pressure of steam to be able to push each slug into the condenser 130.

The drum 222 may be connected to the SIB 170 by first pipe 161 and a first valve 151 in the first pipe 161. The first valve 151 may be located at the top of the drum 222.

The drum 222 may be fueled by injections of hot water from hot reservoir 212 (e.g., a reservoir of hot water). The drum 222 may be configured to maintain $P_H$ and to throttle the water from $P_H$ to a pressure ($P_{drum}$) that is lower than $P_{H,sat}$. By throttling the water to $P_{drum}$, some of the liquid water changes to steam to expand up the pipe. The condenser 130 may be configured to maintain $P_{condenser}$ corresponding to a saturation pressure of the cold water from the slug mixed with condensate. $P_{condenser}$ may be lower than $P_{drum}$. The steam from the drum, when allowed by the first valve 151, may expand against the $P_{condenser}$ at the condenser 130, pushing the slug up the first pipe 161 and into the condenser 130. The water from the slug may be mixed with the steam coming into the condenser 130, cooling and condensing the steam and maintaining $P_{condenser}$ of the condenser 130.

The SIB 170 may be a U-shaped bend in the first pipe 161 adjacent to and just above the drum 222. Cold water may be injected to the SIB 170 from a cold water source (e.g., the heat sink, the cold reservoir 216). The timing and amount of this injection may be controlled by second valve 152. Timing and duration of the second valve 152 may be controlled to inject the first amount of water into the SIB 170 without a pump. In some embodiments, at the time of the injection, the SIB 170 may be at a lower pressure ($P_{condenser}$) than the heat sink (e.g., $P_{atm}$ of cold reservoir 216) and the water may be sucked into the SIB 170 when the valve is opened without the need for a pump. In some embodiments (the first cycle), air pump 226 provides the pressure difference (maintains $P_{condenser}$ below $P_{atm}$) to siphon the cold water from the cold reservoir 216. The height (H6) of the SIB may be slightly less than the pressure differential in head that exists between the atmosphere and the condenser 130. The height H6 may be the maximum height possible so that a difference between $P_{condenser}$ and $P_{atm}$ of the cold water source (e.g., cold reservoir 216) is sufficient to propel the cold water into the SIB 170 without mechanical assistance (e.g., such that water is quickly and easily sucked into the SIB 170 at the time of injection when the pressure in the SIB 170 is equal to that of the condenser 130).

The condenser 130 may be a jet condenser. The condenser may include a top compartment and a bottom compartment. Liquid water from the slug may come into direct contact with the steam coming behind it. The cold water from the slug may enter (e.g., fall) into a top compartment in the condenser where the condenser may spray a mist of water from the slug of water into the bottom compartment. The steam behind the slug may be routed via steam inlet 134 to the bottom compartment in the condenser 130 by a second pipe 162, where the steam rises to meet the liquid water mist and condenses. The bottom of the condenser may be coupled to a third pipe 163 that extends to a turbine through which liquid water (e.g., the slug water and condensate) flow (e.g., fall) to enter the turbine 140. The liquid water may spin the turbine 140 to generate electric power. The height (H5) of the condenser 130 may be great enough so that the pressure of a column of water of height H5 is greater than the difference in pressure between the cold reservoir 216 and the condenser 130. This difference in pressure between the condenser and a pressure in head having the value H5 may determine the maximum possible pressure at which the turbine may be operated.

The turbine 140 may be located below the condenser 130 and may be connected to the condenser by a vertical third pipe 163. The third pipe 163 may be termed a water tower 180 which as a height of H5. Condensate and cooling water run down the water tower 180 (e.g., third pipe 163) and enter the turbine 140 at an absolute pressure in head equal to the height of the water tower 180. The falling water may spin the turbine 140 to generate electrical power.

The system 200 may include a control box 228. The control box 228 may regulate the timing of valves of the system and control the amount of water injected into the drum 222 and into the SIB 170. The control box 228 may determine the amount of water injected based on variables including temperatures of the hot reservoir 212 and the cold reservoir 216 and power generation needs of the operators.

The control box 228 may include a processing device to execute operations. The processing device may include one or more of a processor, a microprocessor, a controller, a microcontroller, an application specific integrated circuit (ASIC), a field programmable gate array (FPGA), a digital signal processor (DSP), network processor or the like. The operations may include one or more of blocks 502-514 of FIG. 5. The processing device of the control box 228 may execute a control algorithm to determine the first amount of cold water to be injected into the SIB 170 and the first amount of hot water to be injected into the drum 222, respectively, based on variables comprising at least one of a temperature of the steam source, a temperature of the cold water source, a temperature of atmosphere, and a specified power generation requirement.

As shown in FIG. 2, the turbine 140, the heat source 110 (e.g., steam source), and the SIB 170 may be above ground level. The condenser 130 is located at a height above the turbine 140, the heat source 110 (e.g., steam source), and the SIB 170. The liquid water may flow (e.g., fall) from the condenser 130 down the height through a pipe (e.g., third pipe 163) and enter the turbine 140 to spin the turbine 140 to generate electrical power.

Figure 3:
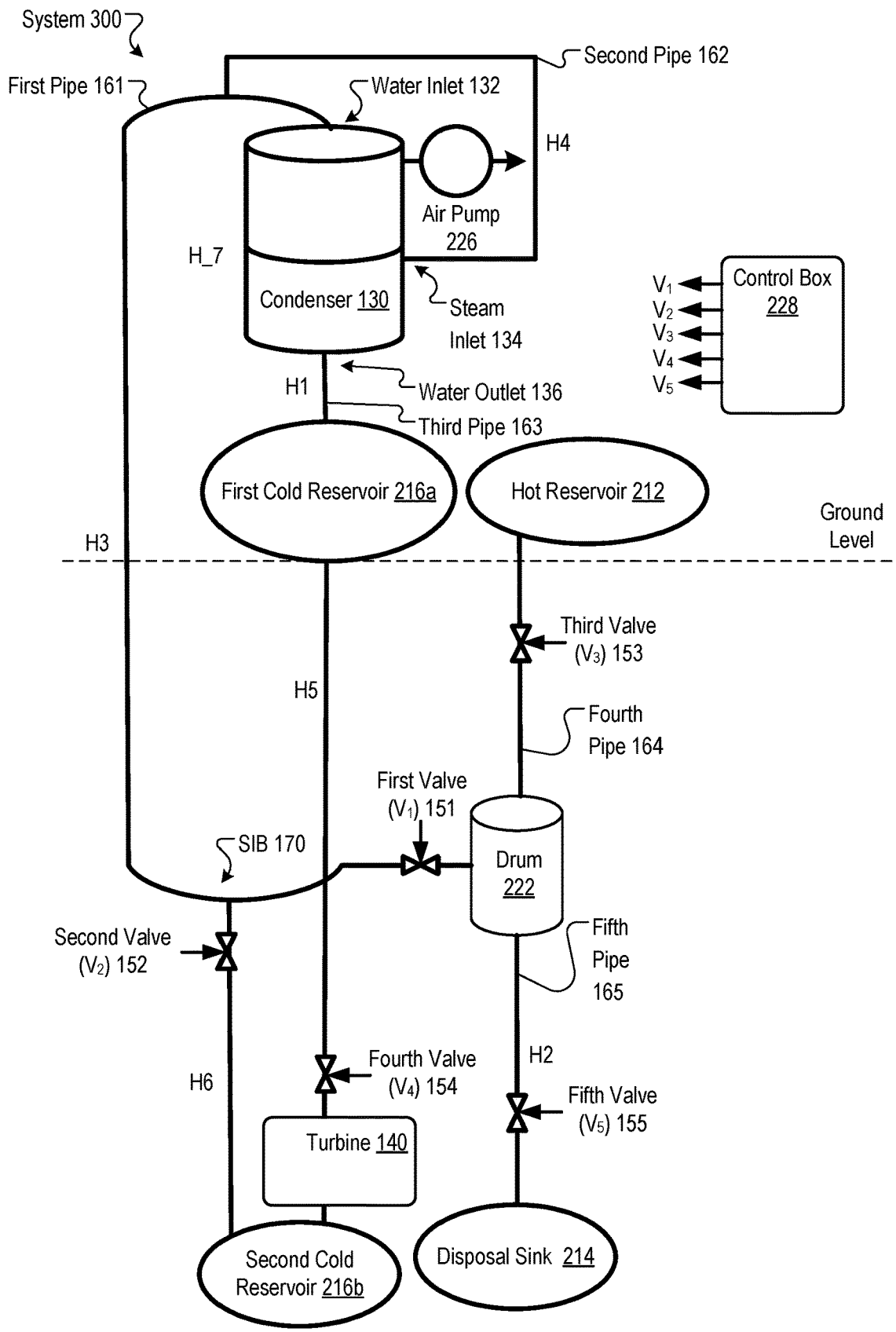
FIG. 3 is a schematic diagram illustrating a system to convert energy, according to certain embodiments.

FIG. 3 is a schematic diagram illustrating a system 300 (e.g., system 100A of FIG. 1A, system 100B of FIG. 1B, system 200 of FIG. 2) to generate electrical power, according another embodiment. Elements in FIG. 3 that have a similar reference number as elements in FIG. 2, FIG. 1A, and/or FIG. 1B may include similar features and similar functionality. System 300 may be a heat engine that transforms a low-level temperature differential between a heat source and a heat sink into useful electrical power. System 300 may be a hybrid heat engine. A hybrid heat engine may produce electric power from a lower temperature heat source, For example, a hybrid heat engine may combine characteristics of a steam engine and a power plant (e.g., hydropower plant) to economically produce electric power from a low temperature heat source.

As shown in FIG. 3, the turbine 140 and the heat source 110 (e.g., steam source) are below ground level. The condenser 130 is located above ground level. The condenser 130 may be located at a height above the turbine 140. The liquid water may flow from the condenser 130 down the height through a pipe and enter the turbine to spin the turbine 140 to generate electrical power.

As shown in FIG. 3, the hot reservoir 212 is located above the drum 222. The hot water from the hot reservoir 212 may flow to and pressurize the hot water in the drum 222 without the use of a pump (e.g., pump 224). As shown in FIG. 3, since the turbine 140 is located below ground level, the condenser 130 may not be located on a water tower 180 or the water tower 180 may be shorter than the water towers 180 of FIGS. 1-2.

The control box 228 opens third valve 153 to insert a first amount of hot water in the drum 222 from the hot reservoir 212 via fourth pipe 164. The first amount of hot water in the drum is at $P_H$ which is greater than $P_{H,sat}$ of the hot water in the hot reservoir 212. The drum 222 may throttle the water to a pressure ($P_{drum}$) that is at $P_{H,sat}$, or a lower pressure. The SIB 170 is at $P_{condenser}$ that is less than $P_C$ of the second cold reservoir 216b. The second cold reservoir 216b may be a tank under the turbine 140. The second cold reservoir 216b may be smaller than the first cold reservoir 216a.

In some embodiments, the control box 228 opens second valve 152 to siphon a first amount of cold water from the second cold reservoir 216b located below turbine 140. In some embodiments, the control box 228 opens second valve 152 to siphon a first amount of cold water from the turbine 140. The first amount of cold water may be siphoned because of the difference in pressure between $P_{condenser}$ and $P_C$. The control box 228 opens first valve 151 to allow the first amount of hot water at $P_{drum}$ in the drum 222 which is greater than $P_{condenser}$ to expand and to push the slug of water (the first amount of cold water in the SIB 170) up the first pipe 161 and to the condenser 130. The slug of water enters the condenser 130 via water inlet 132, the steam enters the condenser via steam inlet 134, and the slug and steam mix (e.g., the steam condenses). Liquid water from the condenser 130 flows through third pipe to one or more of first cold reservoir 216a or to the turbine 140. The liquid water from the condenser 130 may be stored in the first cold reservoir 216a to store energy for later use. In some embodiments, the fourth valve 154 is disposed between the turbine and the first cold reservoir 216a, proximate first cold reservoir 216a. In some embodiments, a sixth valve 156 is disposed between the condenser 130 and the first cold reservoir 216a.

The control box 228 may open the fifth valve 155 for the liquid in the drum 222 to flow to the disposal sink 214. In some embodiments, the liquid in the disposal sink is pumped to ground level to be disposed. In some embodiments, the disposal sink is below the water table and the liquid in the disposal sink 214 percolates into the ground.

In some embodiments, the components of system 300 that are below ground level may be in a well (e.g., a shaft that extends into the ground). For example, the components below ground level may be in an oil well (e.g., a used oil well).

In one embodiment, the heat engine in system 200 of FIG. 2 and/or the heat engine in system 300 of FIG. 3 are part of a first heat engine cycle including states 1a-5a. From state 1a to state 2a, hot water from the hot reservoir 212 may be pressurized to a pressure ($P_H$) greater than the saturation pressure ($P_{H,sat}$) of hot water. The pressurized hot water may be injected into the drum 222 and sealed therein. The drum 222 may throttle the water to a pressure ($P_{drum}$) that is lower than $P_{H,sat}$.

From state 2a to state 3a, the first valve 151 between the drum 222 and the first pipe 161 opens. Hot steam leaves the drum under pressure ($P_{drum}$) and pushes against the slug in the SIB 170, pushing the slug up the first pipe 161 into the condenser 130. As the steam from the drum expands, the saturated mixture cools until it is the temperature ($T_{condenser}$) of the condenser 130 as the last of the slug spills into the condenser 130. The fifth valve 155 between the drum 222 and the disposal sink 214 opens and the now cold liquid water (e.g., colder than $T_H$) in the drum 222 is expelled to the disposal sink.

From state 3a to state 4a, the steam, now at the saturation temperature and pressure of the condenser 130, is pushed into the condenser 130 by a succeeding slug. In the condenser 130, the steam mixes with the atomized liquid water from the slug the steam had pushed and the steam is condensed to liquid water. Non-condensable gases are pumped out of the condenser by an electric pump (e.g., air pump 226).

From state 4a to state 5a, the slug water and condensate fall down the water tower 180 (third pipe 163) and run through a turbine 140, generating electric power. The liquid water is then expelled from the turbine 140 to the cold reservoir 216.

From state 5a to state 1a, the slug water and condensate are cooled to the temperature of the cold reservoir by convection with the surroundings and by evaporation. The cold water is then sucked up into the SIB 170 and the cycle is complete.

In another embodiment, the heat engine in system 200 of FIG. 2 and/or the heat engine in system 300 of FIG. 3 are part of a second heat engine cycle including states 1b-5b. The second heat engine cycle may maintain steady state (e.g., constant pressure and constant temperature) in the drum 222 which may simplify the system. The second heat engine cycle may have a greater energy output than the first heat engine cycle over time, but may be less efficient than the first heat engine cycle.

From state 1b to state 2b, hot water from the hot reservoir 212 is pressurized to a pressure ($P_H$) greater than the saturation pressure ($P_{H,sat}$) of the hot water and is injected into the drum 222 where the hot water is throttled to a pressure ($P_{drum}$) less than the saturation pressure of the hot water in the hot reservoir 212. By throttling to $P_{drum}$, some of the liquid water changes to steam and then can expand up the pipe, pushing the slug.

From state 2b to state 3b, hot steam leaves the drum 222 at constant pressure and pushes against the slug in the SIB 170, pushing the slug up the pipe 161 into the condenser 130. A constant pressure and temperature is maintained in the drum 222 by regulating the flow of hot water into the drum 222 and the flow of liquid water out of the drum 222 to the disposal sink 214. Once the slug has sufficient kinetic energy to make it to the condenser 130 without assistance from the force of the hot steam beneath it, a new slug is sucked into the SIB 170.

From state 3b to state 4b, in the condenser 130, the steam mixes with the atomized liquid water from the slug that the steam had pushed and the steam is condensed to liquid water. Non-condensable gases are pumped out of the condenser by an electric pump (air pump 226).

From state 4b to state 5b, liquid water (e.g., the slug of water and condensate) fall down the water tower 180 and run through a turbine 140, generating electric power. The liquid water is then expelled to the cold reservoir 216.

From state 5b to state 1b, the slug water and condensate are cooled to the temperature of the cold reservoir 216 by convection with the surroundings and by evaporation. The cold water is then sucked up into the SIB 170 and the cycle is complete.

In some embodiments, the system 200 of FIG. 2 and/or the system 300 of FIG. 3 has an alternative heat engine design. In the alternative heat engine design, H1 may be such that pressure head of H1 is equal to atmospheric pressure ($P_{atm}$) minus the pressure in the condenser 130 ($P_{condenser}$) ($h_{H1}=P_{atm}-P_{condenser}$). In the alternative engine design, H2 may be such that the pressure head of H2 is equal to atmospheric pressure ($P_{atm}$) minus the pressure in the drum 222 ($P_H$) ($h_{H2}=P_{atm}-P_{drum}$). In the alternative heat engine design, H3 times acceleration of gravity times mass flow rate of the slug up the tower is the work rate done by the system. In the alternative heat engine design, H5 times acceleration of gravity times mass flow rate of water from the condenser 130 to the turbine 140 is the output work rate of the system. In the alternative heat engine design, H6 may be such that pressure head of H6 is less than atmospheric pressure ($P_{atm}$) minus the pressure in the first pipe 161 at the slug intake ($P_{pipe}$) ($h_{H6}<P_{atm}-P_{pipe}$). How much less depends on the pressure differential needed to upload the slug. The pressure differential may be minimized to maximize output work. In the alternative heat engine design, H7 (height of condenser 130) may be sufficient height so that the cold water from the slug runs through the condenser 130. The condenser 130 height H7 may be minimized to maximize output work.

Figure 4:
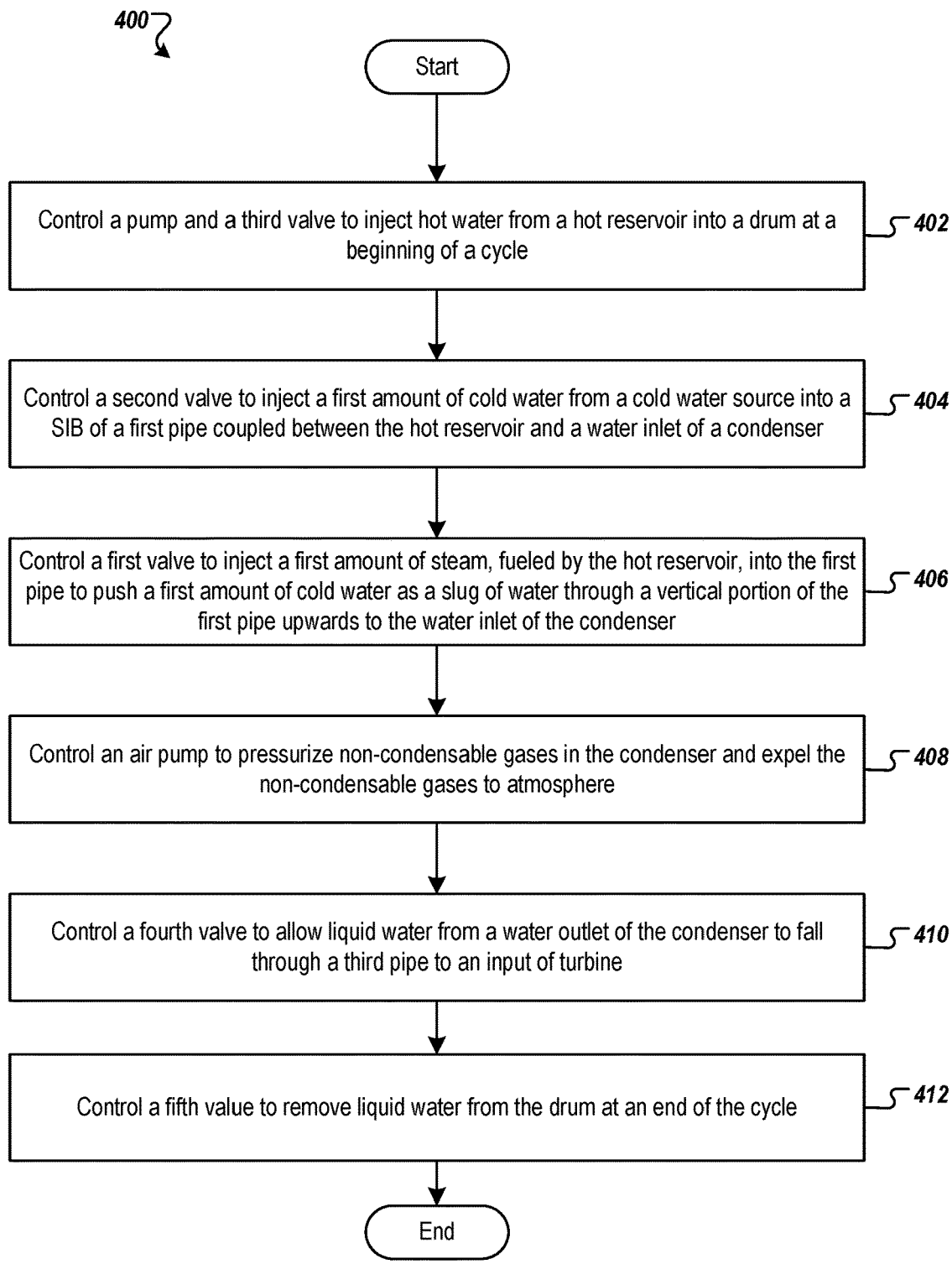
FIG. 4 is a flow diagram of a method of converting energy, according to certain embodiments.

FIG. 4 is a flow diagram of one embodiment of a method 400 of generating electrical power, in accordance with embodiments of the present disclosure. The method 400 may be performed by processing logic that includes hardware (e.g., circuitry, dedicated logic, programmable logic, microcode, etc.), software (e.g., instructions run on a processor to perform hardware simulation), or a combination thereof. In one embodiment, the method 400 may be performed by system 100A of FIG. 1A and/or system 100B of FIG. 1B. In one embodiment, the method 400 may be performed by system 200 or control box 228 of FIG. 2. In one embodiment, the method 400 may be performed by system 300 or control box 228 of FIG. 3. In one embodiment, the method 400 may be performed by a processing device of a control box 228 of a heat engine. Alternatively, the method 400 can be performed by other components as described herein.

Referring to FIG. 4, at block 402, the control box 228 implementing the method may control the pump 224 and the third valve 153 to inject hot water into the throttling drum 222 at a beginning of a cycle.

At block 404, the control box 228 may control a second valve 152 to inject a first amount of cold water from a cold water source (e.g., heat sink 120) into a SIB 170 of a first pipe 161 coupled between a heat source 110 (e.g., steam source) and a water inlet 132 of a condenser 130. In some embodiments, the control box 228 may control the air pump 226 in conjunction with the second valve 152 to inject the first amount of cold water from the cold water source (e.g., heat sink 120) into the SIB 170.

At block 406, the control box 228 may control a first valve 151 to inject a first amount of steam, fueled by a hot water source (e.g., of a hot reservoir 212), from the drum 222 into the first pipe 161 to push the first amount of cold water as a slug of water through a vertical portion of the first pipe 161 upwards to the water inlet 132 of the condenser 130. The first amount of steam may enter a steam inlet 134 of the condenser 130.

At block 408, the control box may control the air pump 226 to remove non-condensable gases from the condenser 130.

At block 410, the control box may control a fourth valve 154 to allow liquid water from a water outlet 136 of the condenser 130 to flow (e.g., fall) through a third pipe 163 to an input of turbine 140 (e.g., a hydro-electric turbine). The liquid water may spin the turbine 140 to generate electrical power.

At block 412, the control box may control the fifth valve 155 to remove water (e.g., liquid water) from the drum 222 at an end of the cycle.

Figure 5A:
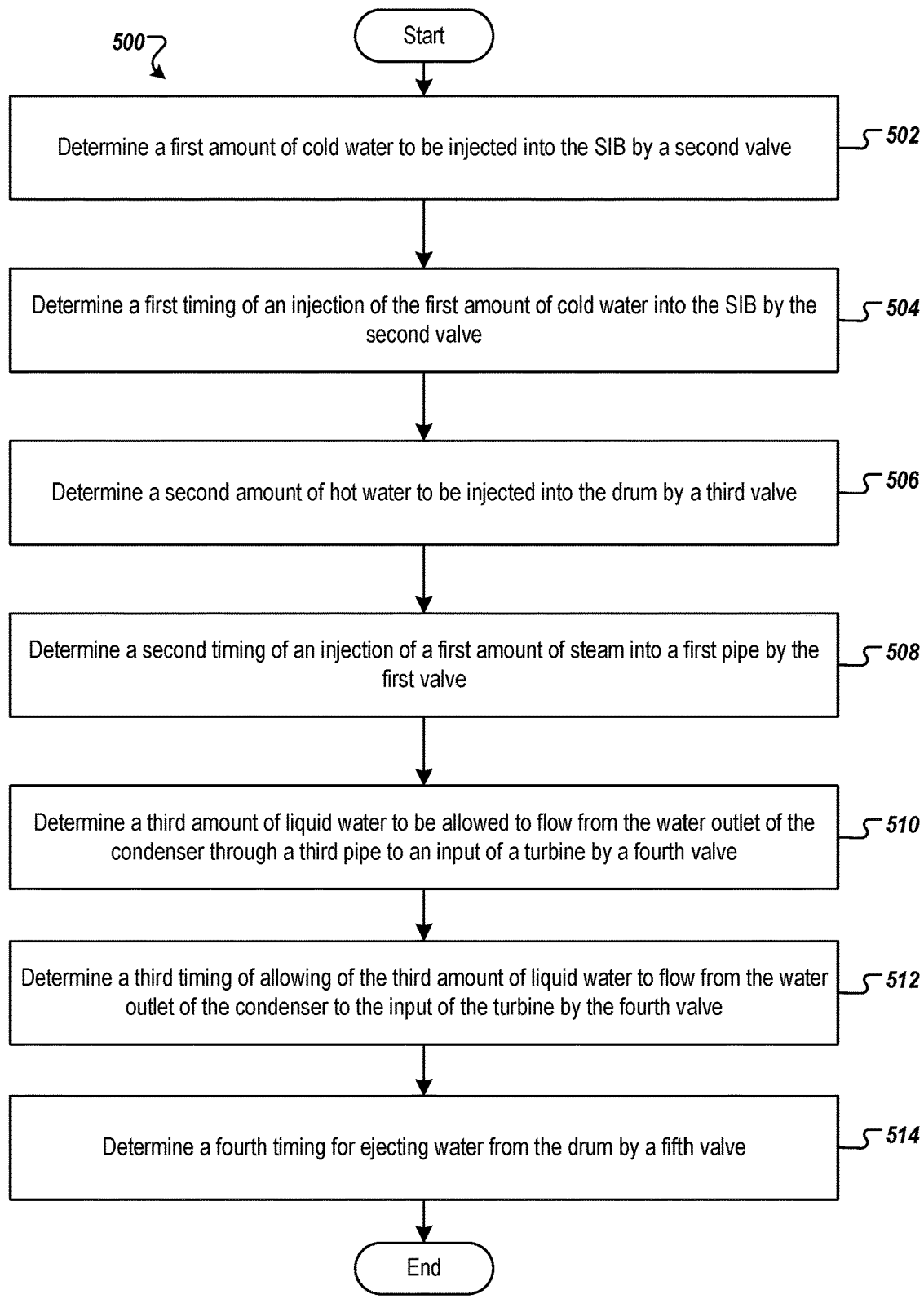
FIG. 5A is a flow diagram of a method of computing values to control a mechanical system to convert energy, according to certain embodiments.

FIG. 5A is a flow diagram of one embodiment of a method 500 of computing values to control a mechanical system to generate electrical power, in accordance with embodiments of the present disclosure. The method 500 may be performed by processing logic that includes hardware (e.g., circuitry, dedicated logic, programmable logic, microcode, etc.), software (e.g., instructions run on a processor to perform hardware simulation), or a combination thereof. In one embodiment, the method 500 may be performed by system 100A of FIG. 1A and/or system 100B of FIG. 1B. In one embodiment, the method 500 may be performed by system 200 or control box 228 of FIG. 2. In one embodiment, the method 500 may be performed by system 300 or control box 228 of FIG. 3. In one embodiment, the method 500 may be performed by a processing device of a control box 228 of a heat engine. Alternatively, the method 500 can be performed by other components as described herein.

Referring to FIG. 5A, at block 502, the control box 228 implementing the method 550 may determine the first amount of cold water to be injected into the SIB 170 by the second valve 152. The first amount of cold water may be based on variables comprising at least one of a temperature of the heat source 110 (e.g., steam source), a temperature of the cold water source (e.g., heat sink 120), a temperature of atmosphere, and a specified power generation requirement.

At block 504, the control box 228 may determine a first timing of an injection of the first amount of cold water into the SIB 170 by the second valve 152. The timing may be after the condenser 130 is at a pressure ($P_{condenser}$) that is less than the pressure ($P_{atm}$) of the cold reservoir 216. The control box 228 may control the air pump 226 to set the pressure of the condenser 130 to $P_{condenser}$.

At block 506, the control box 228 may determine a second amount of hot water to be injected into the drum 222 by the third valve 153. The first amount of hot water may be based on variables comprising at least one of a temperature of the heat source 110 (e.g., steam source), a temperature of the cold water source (e.g., heat sink 120), a temperature of atmosphere, and a specified power generation requirement.

At block 508, the control box 228 may determine a second timing of an injection of a first amount of steam into the first pipe 161 by the first valve 151.

At block 510, the control box 228 may determine the third amount of liquid water to be allowed to flow from the water outlet 136 of the condenser 130 through the third pipe 163 to an input of a turbine 140 by the fourth valve 154.

At block 512, the control box 228 may determine a third timing of allowing of the third amount of liquid water to flow from the water outlet 136 of the condenser 130 to the input of the turbine 140 by the fourth valve 154.

At block 514, the control box 228 may determine a fourth timing for ejecting water from the drum 222 by the fifth valve 155.

Figure 5B:
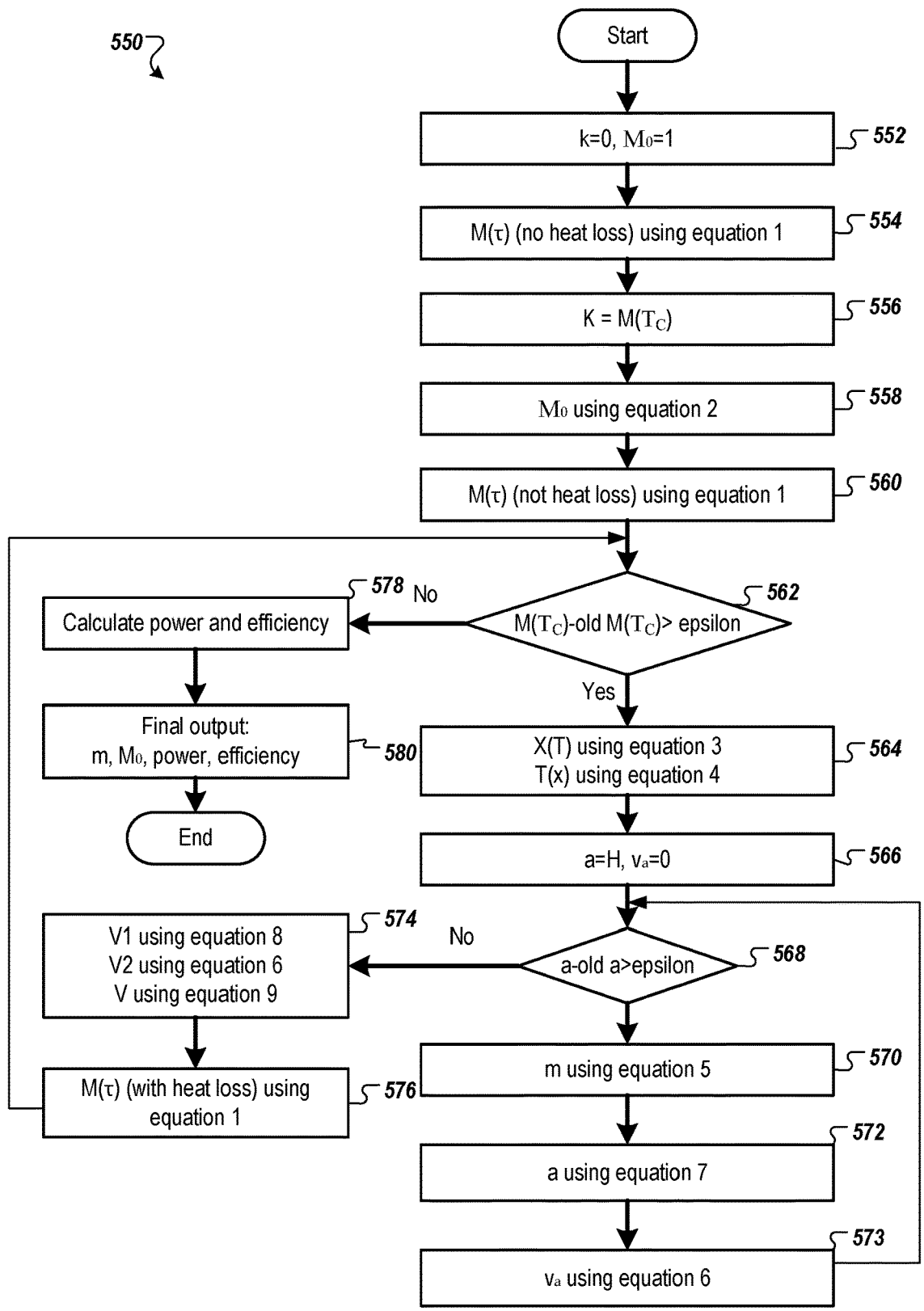
FIG. 5B is a flow diagram of a method of computing values to control a mechanical system to convert energy, according to certain embodiments.

FIG. 5B is a flow diagram of one embodiment of a method 550 of computing values to control a mechanical system to generate electrical power, in accordance with embodiments of the present disclosure. The method 550 may be performed by processing logic that includes hardware (e.g., circuitry, dedicated logic, programmable logic, microcode, etc.), software (e.g., instructions run on a processor to perform hardware simulation), or a combination thereof. In one embodiment, the method 550 may be performed by system 100A of FIG. 1A and/or system 100B of FIG. 1B. In one embodiment, the method 550 may be performed by system 200 or control box 228 of FIG. 2. In one embodiment, the method 550 may be performed by system 300 or control box 228 of FIG. 3. In one embodiment, the method 550 may be performed by a processing device of a control box 228 of a heat engine. Alternatively, the method 550 can be performed by other components as described herein.

Method 550 may enable the control box 228 to optimize the variables for efficiency, power, and cost. The control box 228 implementing the method 550 may determine, in real time, the optimal amount (e.g., mass) of cold water to be injected into the SIB 170 per cycle and the optimal amount (e.g., mass) of hot water to be injected into the drum 222 per cycle. The method 550 may use successive substitution approach to simultaneously solve equations (1) through (10). Equations (1)-(10) and the corresponding variables are shown below.

Referring to FIG. 5B, at block 552, the control box 228 implementing the method 550 may set k to zero and $M_0$ to one (k=0 and $M_0$=1).

At block 554, the control box 228 may calculate (e.g., using an initial value problem (IVP) solver) $M(\tau)$ using equation (1) with no heat loss. Equation (1):

$$M'(\tau)=(E(\tau,M))/(F(\tau,M)), T_C \leq \tau \leq T_H, M(T_H)=M_0 \qquad (1)$$

$$E(\tau,M)=M^*\delta'(\tau)-M_0^*\mu'_g(\tau)+[(k^*X(\tau,M)^*(\tau-T_{atm}))/(A^*v(X(\tau,M)))+P(\tau)]^*R(\tau)^*(M_0-M)$$

$$F(\tau,M)=-\delta(\tau)-[(k^*X(\tau,M)^*(\tau-T_{atm}))/(A^*v(X(\tau,M)))+P(\tau)]^*S(\tau)$$

$$\delta(\tau)=u_g(\tau)-u_f(\tau)$$

$$R(\tau)=(\rho'_{sf}(\tau))/(\rho_{sf}^2(\tau))-(\rho'_w(\tau))/(\rho_w^2(\tau))$$

$$S(\tau)=(\rho_w(\tau)-\rho_{sf}(\tau))/(\rho_{sf}(\tau)^*\rho_w(\tau))$$

At block 556, the control box 228 may calculate K using the following equation: $K=M(T_C)$.

At block 558, the control box 228 may calculate $M_0$ using equation (2). Equation (2) is an initial guess of $M_0$ (the mass of water injected in the drum 222):

$$M_0=\rho_{sf}(T_C)^*v_{max}/(1-K) \qquad (2)$$

At block 560, the control box 228 may set k=0 and use the initial guess of $M_0$ from block 558, to again compute $M(\tau)$ using equation (1) (e.g., using an IVP solver) with no heat loss.

At block 562, the control box 228 may determine whether $M(T_C)$ minus the old $M(T_C)$ is greater than epsilon (a small number that represents the tolerance for error in the results of the method 550; as long as the estimated error is greater than a user-defined epsilon, the method will be iterated to provide better results) using the following equation:

$$M(T_C)-\text{old } M(T_C)>\varepsilon$$

In response to $M(T_C)$ minus old $M(T_C)$ being greater than epsilon, flow continues to block 564. In response to $M(T_C)$ minus old $M(T_C)$ not being greater than epsilon, flow continues to block 578.

At block 564, the control box 228 may calculate $X(\tau,M)$ using equation (3) and calculate $T(x)$ using equation (4). Equation (3) is used to determine the position of the bottom edge of the slug up the first pipe 161 (at temperature $\tau$ and mass M):

$$X(\tau,M)=(M_0-M)^*S(\tau)/A \qquad (3)$$

The variables $M_0$ and M may be recalibrated to make up for the volume in the drum 222 that will be occupied by steam as the liquid water changes to steam. This may be calculated using a bisection method to find the correct value of $M_0$ such that $X(T_C)=H$ and recalculating M with no heat loss (using the IVP solver on each iteration).

The variable $X(\tau)$ may be redefined with the revised $M(\tau)$ function using equation (3). Equation (4) may provide the temperature of the saturated mixture below the slug when the slug is at position "x." Equation (4) is a temperature at position x:

$$T(x) = \text{inverse of } X(\tau) \quad (4)$$

At block 566, the control box 228 may set a=H and $v_a=0$.

At block 568, the control box 228 may determine whether a minus old a is greater than epsilon with the following equation: a−old a>ε

In response to a minus old a being greater than epsilon, flow continues to block 570. In response to a minus old a not being greater than epsilon, flow continues to block 574.

At block 570, the control box 228 may calculate $m(a,v_a)$ using equation 5. Equation (5) is used to determine the optimum mass of the slug such that it will have velocity $v_x$ at position x:

$$m(x,v_x) = (2*c*e^{-2cx})/(c*v_x^2+g*(1-e^{-2cx}))*\int_0^x e^{2cz}*F(T(z))dz \quad (5)$$

At block 572, the control box 228 may calculate "a" using equation (7). Equation (7) is used to determine the position "a" of the bottom edge of the slug in the first pipe 161 in meters when the top edge reaches the top of the first pipe 161. Equation (7) is:

$$a = a(H,m,D,t_s) = H - (4*m)/(\pi*D^2*\rho_w(t_s)) \quad (7)$$

At block 573, the control box 228 may calculate $v_a$ using equation (6).

After block 573, flow may continue to 568. Blocks 568-572 may be a while loop to converge on optimum "m" and "a."

At block 574, the control box 228 may calculate $v_1(x)$ using equation (8), calculate $v_2(x)$ using equation (6), and calculate v(x) using equation (9).

Equation (6) is used to determine the velocity "$v_2(x)$" of the slug at position x from a to H, and is the minimum velocity necessary for the slug to have at position x when the top edge of the slug reaches the top of the first pipe 161, in order to completely clear the top of the first pipe 161. Equation (6):

$$v_2(x) = \text{sqrt}((g/c)*[e^{2c(H-x)}-1]-((2*e^{-2cx})/(\rho*A))*\int_H^x (e^{2cz}*F(T(z)))/(H-z)dz) \quad (6)$$

Equation (8) may give the velocity of the slug from 0 to "a":

$$v_1(x) = \text{sqrt}(((2*e^{-2cx})/m)*\int_0^x (e^{2cz}*F(T(z)))dz - (g/c)(1-e^{-2cx})) \quad (8)$$

Equation (9) is used to determine the velocity of the slug up the pipe at position x. Equation (9) may be a concatenation of $v_1(x)$ and $v_2(x)$ and may provide the velocity of the slug from 0 to H:

$$v(x) = v_1(x), \text{ for } 0 \leq x \leq a; v(x) = v_2(x), \text{ for } a \leq x \leq H \quad (9)$$

At block 576, $M(\tau)$ with heat loss may be recalculated (using an IVP solver) using equation (1). At block 576, $M(\tau)$ with heat loss may be recalculated resetting "k" to its true value.

After block 576, flow may continue to block 562. At block 562, $M_0$ and M may be recalibrated to make up for the volume in the drum that will be occupied by steam as the liquid water changes to steam, using a bisection method to find the correct value of $M_0$ such that $X(T_C)=H$. A while loop may be used to repeat recalculating $M(\tau)$ using equation 1 and recalibrating M0 and M using the bisection method until $X(T_C)=H$ and $X(\tau_H)=0$ (with a threshold tolerance).

A while loop may be used to repeat blocks 564-562 until $M(T_C)$ converges. Values for "a," "$m(x,v_x)$," "$v_1(x)$," "$v_2(x)$," and "v(x)" may be recalculated using equations (7), (5), (8), (6), (9), and using the new M and $M_0$.

At block 578, the control box 228 may calculate power and efficiency of the system. In some embodiments, the time for the slug to spill over the top of the first pipe 161 may be calculated. In some embodiments, the theoretical efficiency of the system may be calculated.

At block 580, the control box 228 may generate a final output of m, $M_0$, power, and efficiency. To calculate power, the time for each cycle is calculated, work output per cycle is calculated, and then power is calculated. Time for each cycle may be calculated by integrating 1/v(x) from zero to H. Work output per cycle may be calculated as the mass of the slug times g times the height of the water tower. Power may be calculated as work over time.

Efficiency may be calculated as the work output divided by the energy input. Energy input may be calculated as the internal energy of the liquid water at $T_H$ when the liquid water is put into the drum 222 minus the internal energy of the water at the end of the cycle at $T_C$.

The control box 228 may compute values for m and $M_0$. The values for m and $M_0$ may be used to find intermediate values that optimize power and efficiency according to the needs of an operator of the system.

In some embodiments, the control box 228 may perform operations a)-t) to calculate optimum slug mass and velocity of the slug if $M_0$ is increased beyond the ideal amount.

At operation a), the control box 228 may determine the value for $M_0$ has been increased beyond the ideal value by multiplying $M_0$ by a factor greater than 1.

At operation b), the control box 228 may set the value of "k" to 0 (k=0) and $M(\tau)$ may be recalculated with the new $M_0$ from operation a).

At operation c), the control box 228 may recalculate $X(\tau)$ and T(x).

At operation d), the control box 228 may set the value for "a" to ideal "a" for optimum $M_0$ found in block 562 (e.g., recalculating values for "a," "$m(x,v_x)$," "$v_1(x)$," "$v_2(x)$," and "v(x)" using equations (7), (5), (8), (6), (9), and using the new values for M and $M_0$).

At operation e), the control box 228 may set the value for "a" to a=H−((H−a)*factor) where factor is the factor by which $M_0$ is increased from the ideal.

At operation f), the control box 228 may identify the points so in the interval [a,H], where the force of the steam and the force of gravity on the slug are of equal magnitude. A bisection method may be used to find so such that the following equation is used: −g+Force($\tau(s_0)$)/($\rho*A*(H-s_0)$)=0.

At operation g), the control box 228 may estimate the value of "$v_a$" to be equal to $v_2(a)$ from the ideal case.

At operation h), the control box 228 may calculate the square of the velocity of the slug at point $s_0$ given velocity "$v_a$" when the top edge of the slug reaches the top edge of the first pipe 161 using equation (10):

$$v_{ns}(y,v_a) = v_a^2 * e^{-2c(y-a)} + (2*e^{-2cy})/(\rho*A) * \int_a^y e^{2cz}*F(T(z))/(H-z)dz - (g/c)*[1-e^{-2c(y-a)}] \quad (10)$$

At operation i), the control box 228 may use a bisection method to find the minimum (within a threshold tolerance) value for "$v_a$" such that "$v_{ns}(s_0,v_a)$" is greater than zero.

At operation j), the control box 228 may recalculate $m(a,v_a)$ using equation (5).

At operation k), the control box 228 may recalculate "a" using equation (7).

At operation l), the control box 228 may loop back to operations f) through k) until "a" converges.

At operation m), the control box 228 may calculate $v_n(x)$ using the following equation: $v_n(x)=\text{sqrt}(v_{ns}(y,v_a))$.

At operation n), the control box 228 may redefine $v_1(x)$ using equation (4) with the new "m" and the control box 228 may define $v(x)$ (the velocity of the slug) to be $v_1(x)$ on the interval [0,a] and $v_{ns}(x)$ on the interval [a,H].

At operation o), the control box 228 may recalculate $M(\tau)$ using the value of $v(x)$ (e.g., the velocity function selected in operation n) ($v_1(x)$ or $v_{ns}(x)$)).

At operation p), the control box 228 may recalculate $X(\tau)$ and $T(x)$.

At operation q), the control box 228 may loop back to operations f) through p) until $M(T_C)$ converges.

At operation r), the control box 228 may repeat operations i) through n) to calculate "a," "m," and "v(x)."

At operation s), the control box 228 may calculate the time for the slug to spill over the top of the first pipe 161.

At operation t), the control box 228 may determine power, efficiency, and the max theoretical efficiency of the system.

The following variables may be used in the equations disclosed herein.

The variable "A" is the cross sectional area of the pipe in meters squared ($m^2$).

The variable "a" is the position of the bottom edge of the slug on the pipe in meters (m) when the top edge reaches the top of the pipe, and is defined by $a=a(H, m, D, t_s)$.

The variable "c" is the friction coefficient, defined as $c=\lambda/(2*D)$.

The variable "D" is the diameter (m) of the pipe.

The variable "d" is the thickness (m) of pipe insulation.

The variable "$F(\tau)$" is the net force in Newtons (N) pushing on the slug by the saturated steam below and above it, when $\tau$ is the temperature of the saturated mixture below the slug, and is defined by $F(\tau)=A*(P(\tau)-P(T_C))$.

The variable "g" is the acceleration of gravity in meters per second squared ($m/s^2$).

The variable "H" is the height (m) of the pipe.

The variable "K" is a constant used in determining the initial guess of $M_0$.

The variable "k" is a constant defined by $k=K_0*\pi*D/d$.

The variable "$K_0$" is the thermal conductivity constant of the pipe insulation in Watts per meter-Kelvin (W/(m*K)).

The variable "$\lambda$" is the Darcy-Weisbach friction coefficient which is dependent on velocity, but may be approximated as a constant between 0.018 and 0.007.

The variable "m" is the mass of the slug in kilograms (kg).

The variable "M" is the mass (kg) of the liquid water remaining in the drum 222 at temperature $\tau$, and is defined by $M=M(\tau)$.

The variable "$m(x,v_x)$" is the optimum mass (kg) of the slug such that the slug will have velocity "$v_x$" at position "x."

The variable "$M_0$" is the mass (kg) of water injected into the drum 222.

The initial guess of the variable "$M_0$" is the first guess at how much hot water to put in the drum 222.

The variable "$P(\tau)$" is the saturation pressure in Pascals (P) of the saturated mixture below the slug at temperature "$\tau$."

The variable "$\rho_{st}(\tau)$" is the saturation density in kilograms per meters cubed ($kg/m^3$) of the steam at temperature "$\tau$."

The variable "$\rho_w(\tau)$" is the saturation density ($kg/m^3$) of the liquid water at temperature "$\tau$."

The variable "so" is the point in the interval [a, H] where the force of the steam and the force of gravity on the slug are of equal magnitude.

The variable "$t_s$" is the inlet temperature of the slug in degrees Celsius (° C.).

The variable "$T_{atm}$" is the temperature (° C.) of the atmosphere outside the system (e.g., system 100, 200, and/or 300).

The variable "$T_C$" is the saturation temperature (° C.) in the condenser 130.

The variable "$T_H$" is the initial temperature (° C.) of the saturated mixture in the drum 222.

The variable "$T(x)$" is the temperature (° C.) of the saturated mixture below the slug when the bottom edge of the slug is at position "x."

The variable "$u_f(\tau)$" is the specific internal energy in kilojoule per kilogram (kJ/kg) of the saturated liquid water at temperature "$\tau$."

The variable "$u_g(\tau)$" is the specific internal energy (kJ/kg) of the saturated water vapor at temperature "$\tau$."

The variable "$v_a$" is the velocity in meters per second (m/s) of the slug at position "a."

The variable "$v_1(x)$" is the velocity (m/s) of the slug up the first pipe 161 at position "x" from 0 to "a."

The variable "$v_2(x)$" is the velocity (m/s) of the slug at position "x" from "a" to "H," and is the minimum velocity necessary for the slug to have at position "x" when the top edge of the slug reaches the top of the first pipe 161, in order to completely clear the top of the first pipe 161.

The variable $v(x)$ is the velocity (m/s) of the slug up the first pipe 161 at position x.

The variable "$v_{ns}(y,v_a)$" is the square of the velocity of the slug at position "y" from "a" to "H" given the velocity at point "a" is "$v_a$," in the case of when "$F(\tau)$" is greater than zero at "H."

The variable "$v_x$" is the velocity (m/s) of the slug at position "x."

The variable "$\upsilon_{max}$" is the maximum volume in meters cubed ($m^3$) that the steam will occupy before the slug completely leaves the first pipe 161. In some embodiments, the volume of the steam in the drum is disregarded and "$\upsilon_{max}$" is the volume of the pipe and is defined by $\upsilon_{max}=A*L$, where L is the length of the pipe.

The variable "$X(\tau,M)$" is the position (m) of the bottom edge of the slug up the first pipe 161, at temperature "$\tau$" and mass "M."

The variable "x" is the position (m) of the bottom edge of the slug up the first pipe 161 in meters.

Figure 6:
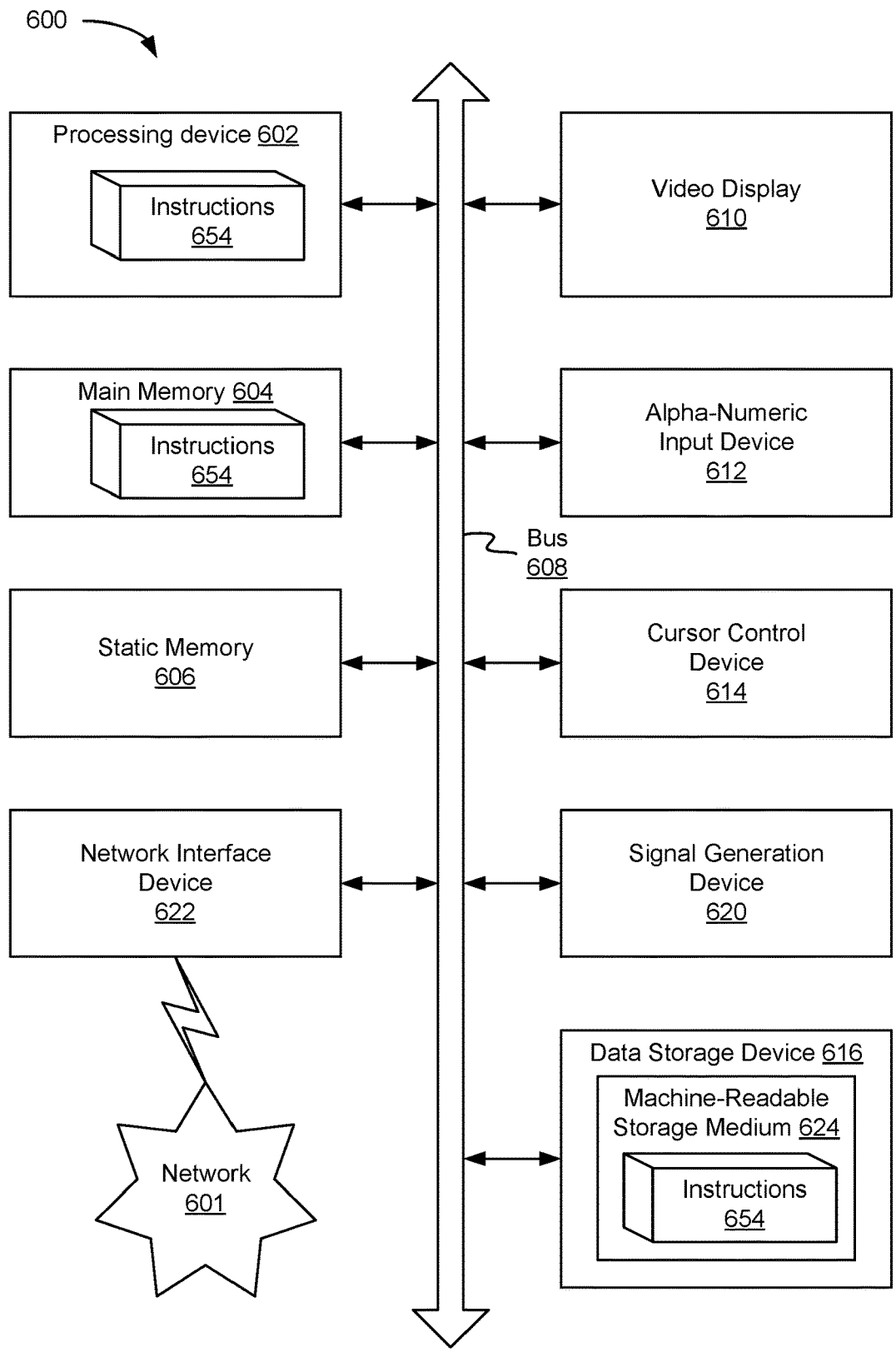
FIG. 6 illustrates a component diagram of a computer system which may implement one or more methods of converting energy or computing values for converting energy described herein, according to certain embodiments.

FIG. 6 illustrates a component diagram of a computer system which may implement one or more methods of generating electrical power or computing values for generating electrical power described herein. A set of instructions for causing the computer system 600 to perform any one or more of the methods discussed herein may be executed by the computer system 600. In one embodiment, the computer system 600 may implement the functions of the control box 228 of FIGS. 2 and/or 3.

In one embodiment, the computer system 600 may be connected to other computer systems by a network 601 provided by a Local Area Network (LAN), an intranet, an extranet, the Internet or any combination thereof. The computer system may operate in the capacity of a server or a client machine in a client-server network environment or as a peer machine in a peer-to-peer (or distributed) network environment. The computer system may be a personal computer (PC), a tablet PC, a set-top box (STB), a Personal Digital Assistant (PDA), a cellular telephone, a web appliance, a server, a network router, switch, bridge or any machine capable of executing a set of instructions (sequential or otherwise) that specify actions to be taken by that machine. Further, while a single machine is illustrated, the term "computer system" shall also be taken to include any collection of machines (e.g., computers) that individually or jointly execute a set (or multiple sets) of instructions to perform any one or more of the methodologies discussed herein.

In one embodiment, the computer system 600 includes a processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.) and a data storage device 616, which communicate with each other via a bus 608.

In one embodiment, the processing device 602 represents one or more general-purpose processors such as a microprocessor, central processing unit or the like. Processing device may include any combination of one or more integrated circuits and/or packages that may, in turn, include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 602 may therefore include multiple processors. The processing device 602 may include a complex instruction set computing (CISC) microprocessor, reduced instruction set computing (RISC) microprocessor, very long instruction word (VLIW) microprocessor, processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor or the like.

The processing device 602 may be the processing device of control box 228 (see FIGS. 2-3). The processing device 602 may include one or more interfaces to connect to one or more of valves 150, sensors, pumps (e.g., air pump 226, pump 224), value control interfaces, etc.

In one embodiment, the computer system 600 may further include one or more network interface devices 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and a signal generation device 620 (e.g., a speaker).

In one embodiment, the data storage device 618 may include a computer-readable storage medium 624 on which is stored one or more sets of instructions 654 embodying any one or more of the methods or functions described herein. The instructions 654 may also reside, completely or at least partially, within the main memory 604 and/or within the processing device 602 during execution thereof by the computer system 600; the main memory 604 and the processing device 602 also constituting machine-readable storage media. The computer-readable storage medium 624 may be a non-transitory computer-readable storage medium.

While the computer-readable storage medium 624 is shown as a single medium, the term "computer-readable storage medium" should be taken to include a single medium or multiple media (e.g., a centralized or distributed database and associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methods described herein. Examples of computer-readable storage media include, but not limited to, solid-state memories, optical media and magnetic media.

Figure 7:
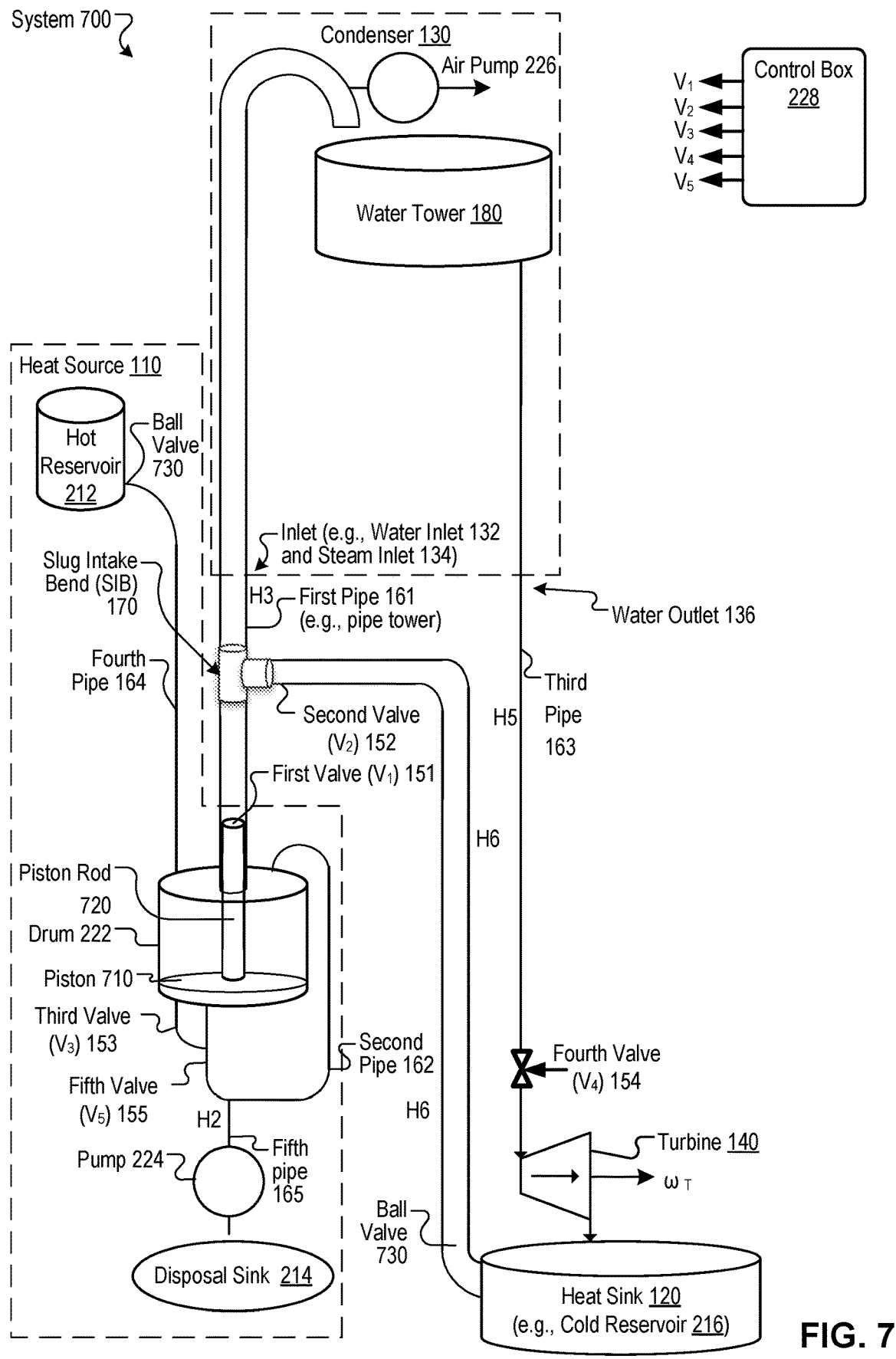
FIG. 7 is a schematic diagram illustrating a system to convert energy, according to certain embodiments.

FIG. 7 is a schematic diagram illustrating a system 700 to generate electrical power, according another embodiment. System 700 may be an example of system 100A of FIG. 1A and/or system 100B of FIG. 1B. One or more of elements in FIG. 7 that have a similar reference number as elements in FIGS. 1-3 may include similar features and similar functionality as one or more of the elements described in relation to FIGS. 1-3. One or more of the elements described in relation to system 700 may be used in one or more of systems 100, 200, or 300 (e.g., systems 100, 200, or 300 may use one or more of a piston 710, piston rod, ball valve 730, etc.). System 700 may be a heat engine that transforms a low-level temperature differential between a heat source and a heat sink into useful electrical power. System 700 may be a hybrid heat engine (e.g., piston-operated hybrid heat engine). A hybrid heat engine may produce electric power from a lower temperature heat source, For example, a hybrid heat engine may combine characteristics of a steam engine and a power plant (e.g., hydropower plant) to economically produce electric power from a low temperature heat source.

System 700 may be coupled to a hot reservoir 212 (e.g., of a steam source, heat source 110), a disposal sink 214, and a cold reservoir 216 (e.g., heat sink 120). System 700 may include or may be coupled to a drum 222 and a pump 224. System 700 may include an air pump 226 (e.g., priming pump) and control box 228. System 700 may include valves including one or more of a first valve 151, a second valve 152, a third valve 153, a fourth valve 154, a fifth valve 155, a ball valve 730, a push valve, etc. One or more of the valves of system 700 may be controlled by control box 228. The control box 228 may also control the air pump 226 and the pump 224. One or more valves (e.g., push valve of piston 710, first valve 151 of piston rod 720, fifth valve 155, etc.) of system 700 may not be controlled by the control box 228. System 700 may include one or more of a first pipe 161, a second pipe 162, a third pipe 163, a fourth pipe 164, or a fifth pipe 165.

System 700 may be a heat engine that is coupled to a heat source and a heat sink. The heat engine may include a working fluid and may generate electrical power. The heat sink may be the cold reservoir 216. The cold reservoir 216 may be located at a base of the turbine 140. Cooling water and condensate from the turbine 140 may pass (e.g., be output) to the cold reservoir 216 (e.g., after use). The heat source may be the hot reservoir 212. The hot reservoir 212 may be part of the heat source 110 (e.g., steam source). In some embodiments, the hot reservoir 212 may be at a lower elevation than at least a portion of the liquid in the condenser 130 (e.g., at a lower elevation than liquid in the water tower 180) and the cold reservoir 216 may be at a lower elevation than the hot reservoir 212.

System 700 may be coupled to a heat source 110 (e.g., steam source). System 700 may include one or more components of the heat source 110 (e.g., steam source). The heat source 110 (e.g., steam source) may include a hot reservoir 212 that is fluidly coupled to a drum 222 via a fourth pipe 164. Hot reservoir 212 may be the source of heat into the system 700. A ball valve 730 may be disposed in the fourth pipe proximate the hot reservoir 212. The ball valve 730 may be controlled by the control box 228. A third valve 153 may be disposed in the fourth pipe proximate the drum 222. Third valve 153 may be a ball solenoid valve (BSV) (see BSV 1000 of FIGS. 10A-B). Control box 228 may control flow of hot water into the lower portion of the drum 222 by controlling third valve 153.

The drum 222 may include a piston 710 disposed within the drum 222. The piston 710 may be sealed to the walls of the drum 222 with a piston ring. The piston 710 may slide up and down within the drum 222 (e.g., maintaining the seal).

A piston rod 720 may be located on the piston 710 (e.g., piston rod 720 may be secured to the piston 710). The piston rod 720 may be hollow and perforated (e.g., perforated proximate the juncture with the piston 710). Perforation of the piston rod 720 may allow saturated water vapor to enter the piston rod 720. A piston ring may seal the piston rod 720 against the interior wall of the first pipe 161 and may allow the piston rod 720 to slide within the first pipe 161.

The piston 710 may include a push valve and the drum 222 may include a bumper on an upper inner surface (e.g., above the piston 710) of the drum 222. The piston 710 may move up and down in the drum 222, causing the piston rod 720 to move up and down in the drum 222. An inner volume of the drum 222 located above the piston 710 may be referred to as an upper portion of the drum 222 and an inner volume of the drum 222 located below the piston 710 may be referred to as a lower portion of the drum 222. Upon the piston 710 rising above a threshold height, the push valve of the piston 710 may hit the bumper (e.g., a component of the push valve may push against the bumper) of the drum 222 and cause liquid to drain from the upper portion of the drum 222 to the lower portion of the drum 222. The piston 710 may have a concave upper surface to cause liquid in the upper portion of the drum 222 to pool and to drain through the push valve responsive to the push valve hitting the bumper. In some embodiments, the control box 228 may control flow of condensate from the upper portion to the lower portion by controlling the push valve.

A fifth pipe 165 may be disposed between the lower portion of the drum 222 and a disposal sink 214. A fifth valve 155 may be disposed in the fifth pipe 165. Fifth valve 155 may be a low pressure valve (LPV) (e.g., see LPV 1100 of FIG. 11). The LPV may open responsive to pressure being below a threshold amount and may close responsive to the pressure being above the threshold amount. In some embodiments, control box 228 may control flow of hot water to the disposal sink 214 by controlling fifth valve 155. The fifth pipe 165 may be a condensation and spent hot water drain. Fifth pipe 165 may evacuate spent hot water and condensation from system 700 (e.g., from drum 222) to the disposal sink 214 (e.g., responsive to fifth valve 155 opening). Disposal sink 214 (e.g., hot water disposal) may be a receptacle for disposing of hot water and condensate from the system 700 (e.g., drum 222) from which useful energy has been extracted. In some embodiments, a pump 224 is disposed in the fifth pipe 165. Pump 224 (e.g., spent hot water ejection pump) may evacuate water from the fifth pipe 165 (e.g., condensation and spent hot water drain, drum 222, lower portion of drum 222). System 700 may not include pump 224 responsive to disposal sink 214 being a threshold distance below the fifth valve 155.

A second pipe 162 may be disposed between an upper portion of the drum 222 and the fifth pipe 165. Second pipe 162 may be a depressurization channel. Second pipe 162 may equalize pressure between the upper portion of drum 222 and lower portion of drum 222 at a specified instance (e.g., second pipe 162 may have a valve to selectively equalize pressure between the upper and lower portions).

A first pipe 161 (e.g., pipe tower) may be disposed between the heat source 110 (e.g., steam source) (e.g., upper portion of the drum 222) and an inlet (e.g., water inlet 132 and steam inlet 134) to the condenser 130. The first pipe 161 (e.g., pipe tower) may be a vertical pipe that conducts the water column (e.g., first amount of water, slug of water) to the condenser 130 and/or the water tower 180. The first pipe 161 may be sealed to the upper portion of the drum 222. Water may enter the first pipe 161 at SIB 170 (e.g., at a slug intake, at a vertical portion of the first pipe 161) via a second valve 152 from the cold reservoir 216. The SIB 170 may be a SIB as illustrated in one or more of FIGS. 1-3. The SIB 170 may be a slug intake portion of the first pipe 161 with a bend (e.g., a slug intake bend) or without a bend (e.g., a slug intake). SIB 170 may be a vertical portion of the first pipe 161. The steam in the drum 222 may push, using piston rod 720, a slug of cold water through the SIB 170, up the first pipe 161, into the inlet of the condenser 130, and to the water tower 180 to power the turbine 140.

The second valve 152 may be a check valve that allows cold water to enter the first pipe (e.g., enter the SIB 170 from the cold reservoir 216). The second valve 152 may be situated at a threshold height such that a vacuum created in the pipe 161 when the piston 710 and the water column separate (e.g., the piston rod 720 falls) is sufficient to suck water through the second valve 152 from the cold reservoir 216.

A check valve may be included proximate the inlet (e.g., water inlet 132, steam inlet 134) of the condenser 130 and/or proximate the SIB 170 to prevent water column (e.g., slug, first amount of water) from falling back down after being propelled up the first pipe 161. System 700 may not include a check valve proximate the inlet if the rate of flow from the second valve 152 is at least a threshold flow rate.

In some embodiments, condenser 130 may include a portion of first pipe 161 and a water tower 180 (e.g., cold water tower). Water tower 180 may be an elevated tank into which cold water is propelled from the first pipe 161 by the piston rod 720. Water vapor may enter the condenser 130 (e.g., from an upper portion of the drum 222) via a first valve 151 disposed in an upper surface of the piston rod 720. The first valve 151 may be a check valve that allows water vapor and incondensable gases to be ejected from the piston rod 720 into the first pipe 161. In some embodiments, the water vapor may condense by contacting the water disposed in the first pipe 161. In some embodiments, the condenser 130 may be a condenser 130 as described in relation to one or more of FIGS. 1-3. The condenser 130 may include or may be coupled to an air pump 226. Air pump 226 (e.g., priming pump) may initiate the first cycle by evacuating air from system 700 (e.g., first pipe 161). The turbine 140 may convert the potential energy of the liquid in the water tower 180 to electrical power.

Variables PL, PU, P0, P1, and P2 may be used to describe system 700. PL may be pressure in a lower portion of the drum 222 (e.g., below piston 710). PU may be pressure in an upper portion of the drum 222 (e.g., above piston 710). P0 may be saturation pressure of water at temperature of the cold reservoir 216. P1 may be a specified pressure that is greater than P0. Fifth valve 155 may open when PL<P1 and may close when PL>P1. P2 may be P0 plus crack pressure of first valve 151 (e.g., crack pressure may be pressure when first valve 151 opens to insert water vapor and non-condensable gases in the first pipe 161).

The control box 228 may control third valve 153 to inject hot water from the hot reservoir 212 into the drum 222 at the beginning of a cycle. The control box 228 may open the third valve 153 for a specified amount of time and then close the third valve 153 to insert a controlled (e.g., predetermined) amount of water into a lower portion of the drum 222 (e.g., below piston 710). Expanding steam from the hot water inserted into the drum 222 may push up on the piston 710 and may shut the fifth valve 155 as P1 is exceeded in the lower portion of the drum 222.

The control box 228 may control second valve 152 to inject a first amount of cold water from the cold reservoir 216 into the first pipe 161 (e.g., SIB 170, pipe tower).

The expanding steam (e.g., in the lower portion of the drum 222, fueled by the hot reservoir 212) may push the first amount of cold water (e.g., a column of water, slug of water) up the first pipe 161 (e.g., pipe tower). As the steam expands, the pressure may decrease in the lower portion of the drum 222 (e.g., below the piston 710) and pressure may increase in the upper portion of the drum 222 (e.g., above the piston 710). The expanding steam may push the piston 710 which pushes the piston rod 720 which pushes the first amount of cold water (e.g., column of water) up the first pipe 161 (e.g., pipe tower).

System 700 may utilize steam at a lower pressure to elevate a water column (e.g., slug, first amount of water) at a higher pressure to generate electrical power from the higher pressure water column and a turbine 140 (e.g., hydro-electric turbine). System 700 may take advantage of a piston 710 with a surface area greater (e.g., 10-100 times greater) than the cross-sectional area of the water column (e.g., cross-sectional area of the first pipe 161) the piston 710 is elevating. The piston 710 may be pushed from below by hot saturated steam in the lower portion of the drum 222 while colder, low pressure saturated steam is maintained in the upper portion of the drum 222. System 700 may push water against gravity and against atmospheric pressure to elevate the water to a water tower 180, from which the water falls through a turbine 140 to generate electrical power. System 700 may utilize the same cold water the system 700 is elevating to cool and condense the vapor in the upper portion of the drum (e.g., that enters the first pipe 161 via first valve 151), thus maintaining a low pressure in the upper portion of the drum 222.

Once PL is less than P1, fifth valve 155 opens. Cooled water in the drum drains out of the drum 222. Pressure in the upper portion of the drum 222 and pressure in the lower portion of the drum 222 may be equalized (e.g., responsive to fifth valve 155 opening). The piston 710 may continue to rise under the kinetic energy of the piston 710. The column of water may also continue to rise.

Responsive to the push valve of the piston 710 colliding with the bumper of the drum 222, condensate from the upper portion of the drum 222 may flow into the lower portion of the drum 222 via the push valve and the piston 710 and piston rod 720 may accelerate downward.

The column of water may continue to rise under its kinetic energy as the piston 710 and piston rod 720 move downward. A lower pressure P0 may be created in the first pipe 161 (e.g., pipe tower) above (e.g., immediately above) the piston rod 720 and first valve 151 in the upper surface of the piston rod 720 may open, releasing saturated vapor and non-condensable gases into the first pipe 161 until the pressure in the drum 222 decreases to P2.

Once the column of water passes second valve 152, second valve 152 opens as the pressure on the downstream side is reduced. Cold water (e.g., from the cold reservoir 216) may enter the first pipe 161 and may fall toward the piston rod 720 and may be sucked up towards the rising column of water. In some embodiments, the falling cold water may condense (e.g., acting as a condenser 130) the higher pressure vapor that entered the first pipe 161 through the first valve 151. In some embodiments, a separate condenser 130 may be used to condense the higher pressure vapor. In some embodiments, the water tower 180 may be a condenser 130 (e.g., condenser 130 of one or more of FIGS. 1-3).

Responsive to the piston 710 reaching the bottom of the drum 222, cold water has filled the space between the piston rod 720 and the column of water in the first pipe 161. The cycle is complete. More hot water may be injected in the lower portion of the drum 222 to start a new cycle.

In some embodiments, system 700 may be more efficient, more powerful, and less costly that systems 200 and 300. System 700 may operate at a slower velocity than systems 200 and 300, thus reducing friction losses. In some embodiments, system 700 works against atmospheric pressure, thus reducing height required for the water tower 180 (e.g., condenser 130), thus reducing costs. In some embodiments, system 700 condenses the water vapor in the first pipe 161 (e.g., first pipe 161 acts as a condenser 130), which may eliminate use of a separate condenser and further reduce costs.

In some embodiments, the upper portion of the drum 222 is maintained at a constant low pressure by pumping cold water over or through the upper portion of the drum 222 (e.g., to raise efficiency of the system 700).

In some embodiments, the upper portion of the drum 222 is maintained at a constant low pressure by being connected to an external condenser (e.g., condenser 130) (e.g., to raise efficiency of the system 700 and may eliminate the need of a check valve proximate the inlet (e.g., water inlet 132, steam inlet 134)).

Figure 8:
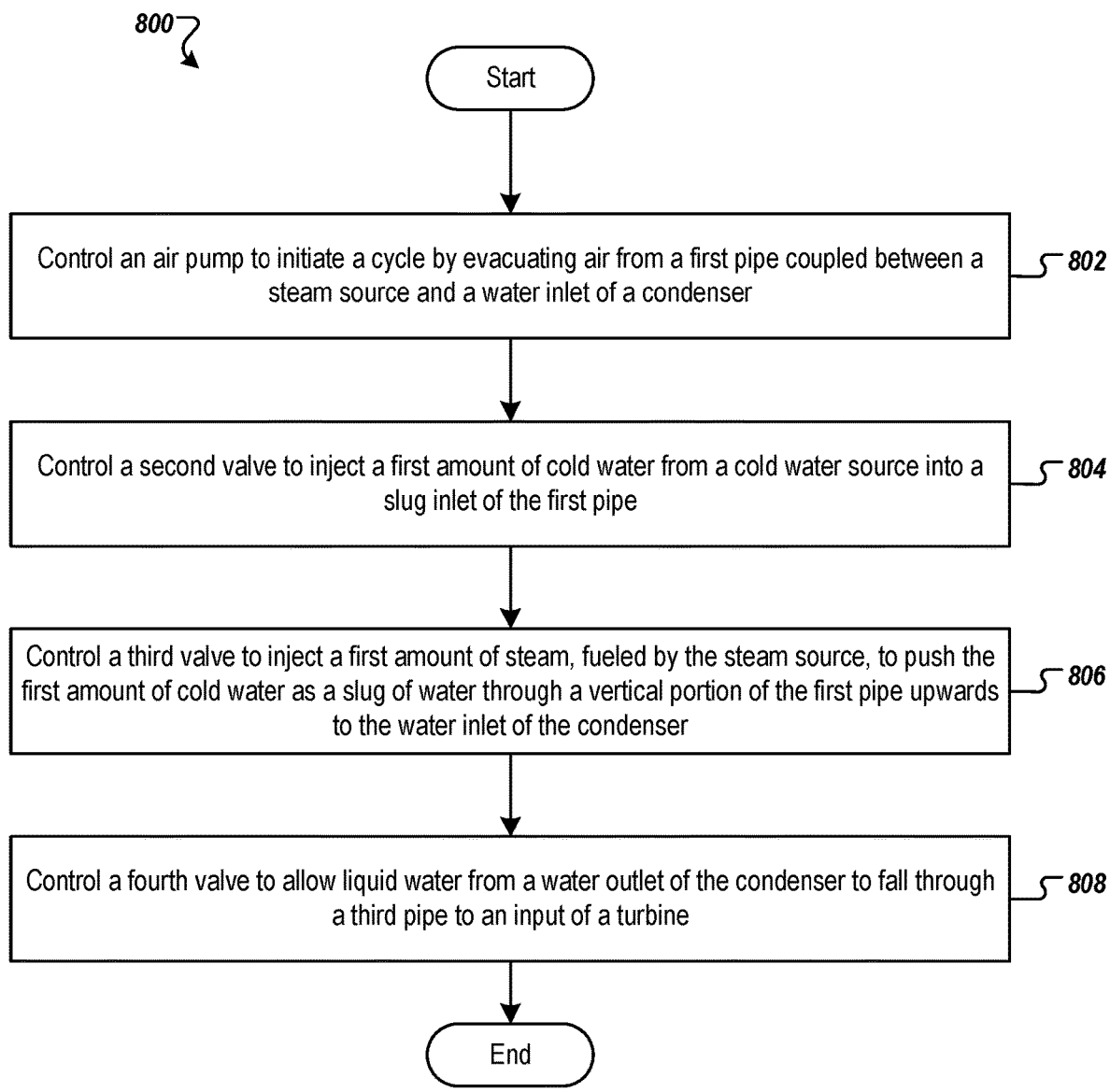
FIG. 8 is a flow diagram of a method of converting energy, according to certain embodiments.

FIG. 8 is a flow diagram of a method 800 of generating electrical power, in accordance with embodiments of the present disclosure. The method 800 may be performed by processing logic that includes hardware (e.g., circuitry, dedicated logic, programmable logic, microcode, etc.), software (e.g., instructions run on a processor to perform hardware simulation), or a combination thereof. In one embodiment, the method 800 may be performed by system 100A of FIG. 1A and/or system 100B of FIG. 1B. In one embodiment, the method 800 may be performed by system 700 or control box 228 of FIG. 7. In one embodiment, the method 800 may be performed by a processing device of a control box 228 of a heat engine. Alternatively, the method 800 can be performed by other components as described herein.

In method 800, variables PL, PU, P0, P1, and P2 may be used. PL may be pressure in a lower cylinder below the piston. PU may be pressure in an upper cylinder, above the piston. P0 may be saturation pressure of water at temperature of the cold reservoir. P1 may be a specified pressure that is greater than P0. Valve 2 may open when PL<P1 and may close when PL>P1. P2 may be P0 plus crack pressure of valve 4.

Referring to FIG. 8, at block 802, in some embodiments, the control box 228 implementing the method may control an air pump to initiate a cycle by evacuating air from a first pipe 161 coupled between a heat source 110 (e.g., steam source) and a water inlet of a condenser 130.

At block 804, the control box 228 may control a second valve 152 to inject a first amount of cold water from a cold water source (e.g., heat sink 120) into a slug inlet of the first pipe 161.

At block 806, the control box 228 may control a third valve 153 to inject a first amount of steam, fueled by the heat source 110 (e.g., steam source), to push the first amount of cold water as a slug of water through a vertical portion of the first pipe upwards to the water inlet 132 of the condenser 130.

In some embodiments, at block 806, the control box 228 opens the third valve 153 for a predetermined amount of time and then closes the third valve 153 to cause a predetermined amount of hot water to enter a lower portion of a drum 222 (e.g., under piston 710). Expanding steam from the hot water may push up on the piston 710 and shut fifth valve 155 responsive to pressure PL in the lower portion of the drum 222 exceeding pressure P1. As the piston 710 rises, pressure PL in the lower portion of the drum 222 may lower and the pressure PU in the upper portion of the drum 222 may rise. The rising piston 710 may cause the piston rod 720 to rise and push a column of water up the first pipe 161.

Once pressure PL is less than pressure P1, the fifth valve 155 opens and cooled water in the lower portion of the drum 222 drains out of the drum 222. In some embodiments, the control box 228 may control fifth valve 155 and/or pump 224 to drain the lower portion of the drum 222. As the cooled water in the lower portion of the drum 222 drains out of the drum 222, pressure in the upper and lower portions of the drum 222 may be equalized. The piston 710 may continue to rise based on the kinetic energy of the piston 710 which causes the column of water to rise. A push valve of the piston 710 may hit a bumper at an upper inner surface of the drum 222, causing the push valve to open and allow accumulated condensate from the upper portion of the drum 222 to drain into the lower portion of the drum 222. The piston 710 and piston rod 720 may accelerate downward responsive to the push valve hitting the bumper. The column of water may continue to rise based on the kinetic energy of the column of water as the piston 710 and piston rod 720 move downward.

A low pressure P0 is created in the first pipe 161 proximate an upper surface of the piston rod 720 (e.g., responsive to the piston rod 720 moving downward) which causes first valve 151 to open. The opening of first valve 151 causes saturated vapor and non-condensable gases to be released from upper portion of the drum 222 (e.g., via the piston rod 720) into the first pipe 161, causing the pressure in the drum 222 to decrease to P2. Once the column of water passes the second valve 152 (e.g., SIB 170), the second valve 152 opens as the pressure of the downstream side is reduced. Cold water may rush into the first pipe 161 and fall toward the piston rod 720 and may be sucked up toward the rising column of water. The falling cold water may condense the higher pressure vapor that entered the first pipe 161 via the first valve 151. Responsive to the piston 710 reaching the bottom of the drum 222, cold water has filled the space between the piston rod 720 and the column of water in the pipe tower and the cycle is complete.

At block 808, the control box 228 may control a fourth valve 154 to allow liquid water from a water outlet of the condenser 130 to fall though a third pipe to an input of the turbine 140.

Figure 9A:
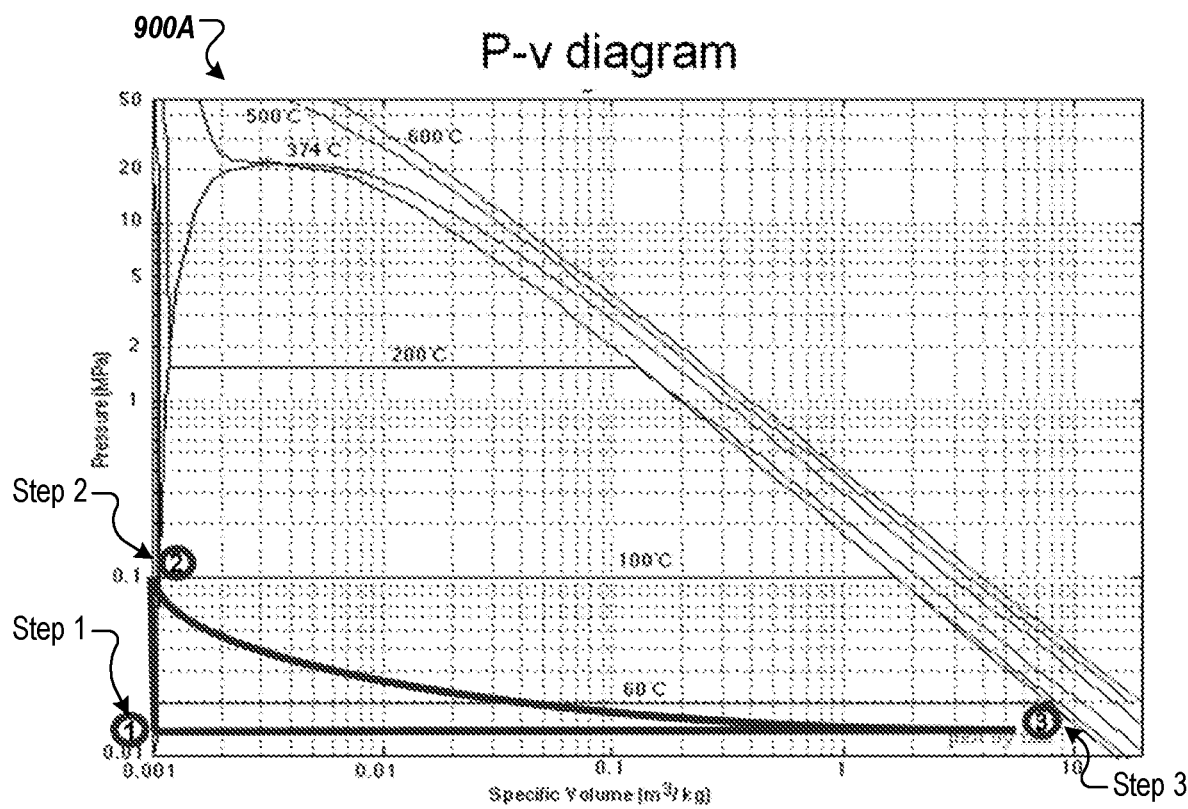
FIG. 9A is a P-v diagram of a hybrid heat engine, according to certain embodiments.
Figure 9B:
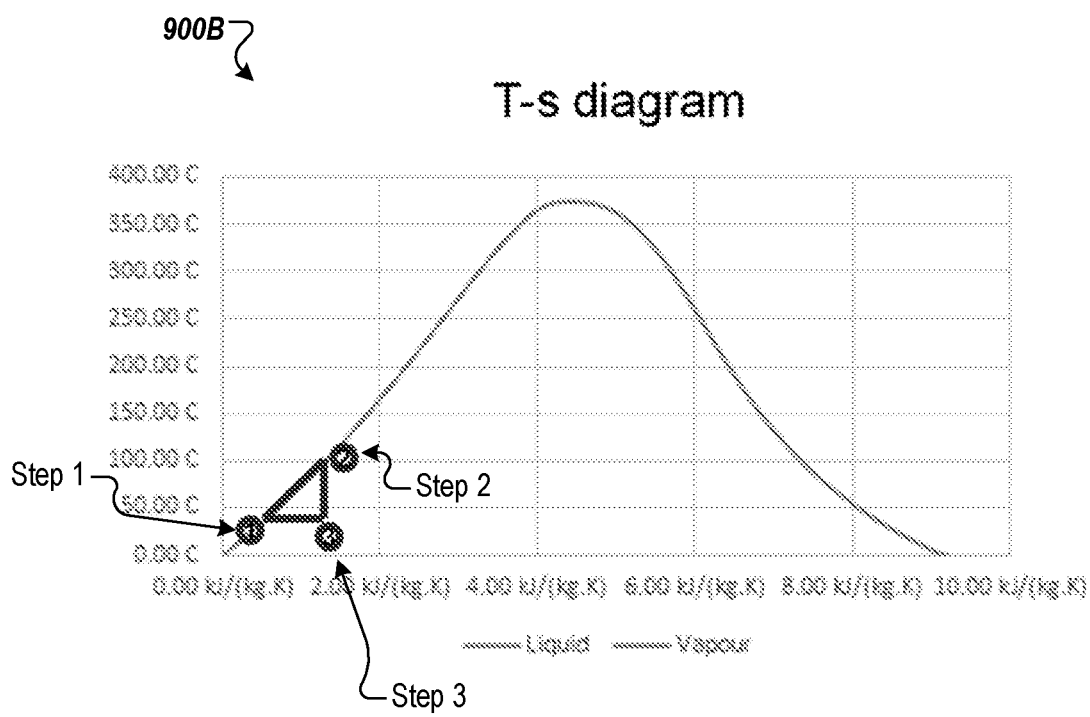
FIG. 9B is a T-s diagram of a hybrid heat engine, according to certain embodiments.

FIG. 9A illustrates a P-v diagram 900A of a hybrid heat engine, according to certain embodiments. FIG. 9B illustrates a T-s diagram 900B of a hybrid heat engine, according to certain embodiments. A heat engine of the present disclosure (e.g., one or more of system 100, system 200, system 300, or system 700) may approximate a thermodynamic cycle shown in the P-v diagram 900A of FIG. 9A and/or T-s diagram 900B of FIG. 9B. From steps 1-2, the heat engine may have a substantially constant volume heat addition. From steps 2-3, the heat engine may have a substantially isentropic expansion. From steps 3-1, the heat engine may have a substantially constant temperature/pressure heat rejection.

Figure 10B:
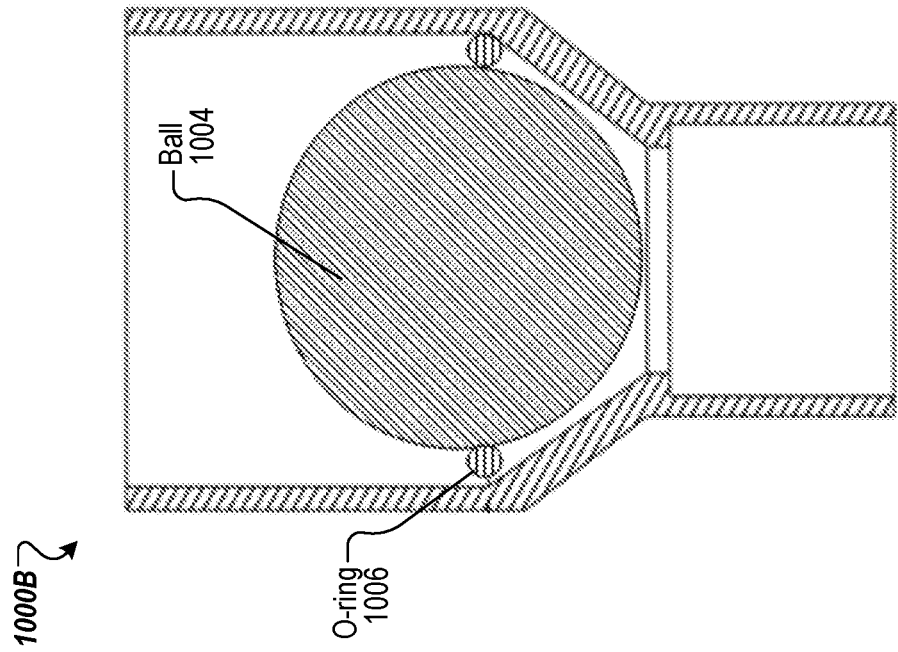
FIGS. 10A-B illustrate a ball solenoid valve (BSV), according to certain embodiments.
Figure 10A:
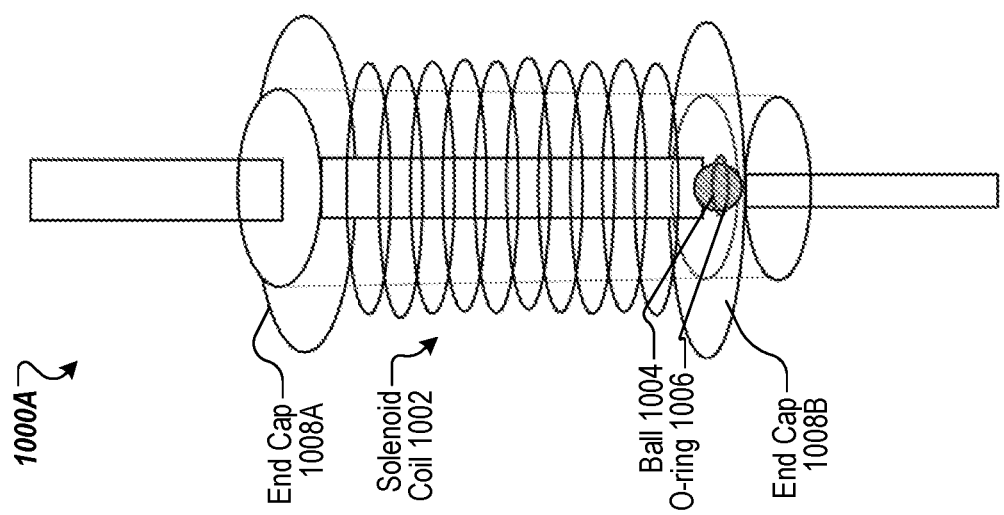
Figure 11:
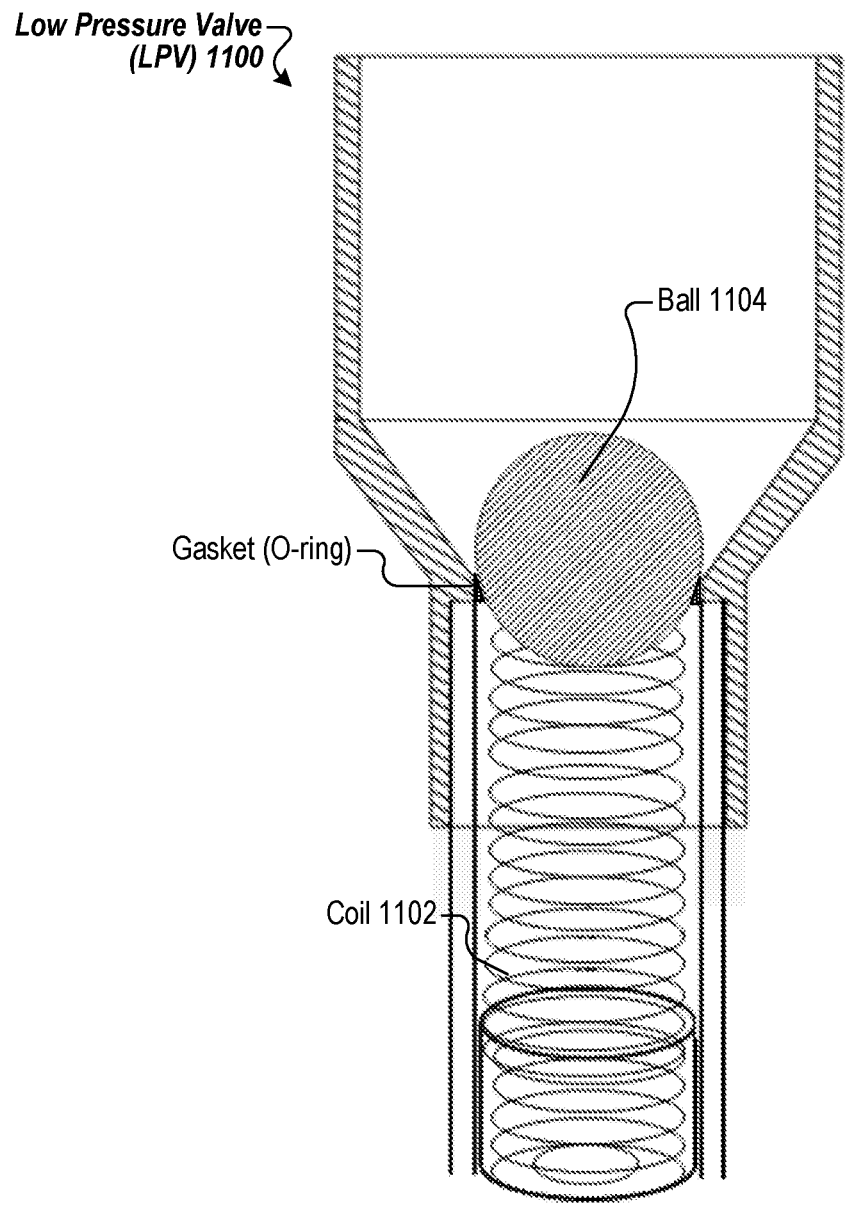
FIG. 11 illustrates a low pressure valve (LPV), according to certain embodiments.

FIGS. 10A-B and 11 illustrate valves that may be used in a heat engine (e.g., one or more of system 100, system 200, system 300, or system 700).

FIGS. 10A-B illustrate a ball solenoid valve (BSV) 1000, according to certain embodiments. In some embodiments, the third valve 153 is a BSV 1000. For example, third valve 153 of FIG. 7 that allows hot water to flow from the hot reservoir 212 into the lower portion of the drum 222 may be a BSV 1000. The BSV 1000 may be an automated valve that cycles very quickly. The BSV 1000 may be configured for low pressures in heat engines (e.g., one or more of system 100, system 200, system 300, or system 700). The BSV 1000 may have an internal seal (e.g., O-ring) that may be quickly and easily replaced as needed instead of replacing the BSV 1000.

The BSV 1000 may have a solenoid coil 1002. The BSV 1000 may have end caps 1008 (e.g., end caps of a spool) and the solenoid coil 1002 may be located between the end caps 1008. The solenoid coil 1002 may have multiple turns.

The BSV 1000 may have a ball 1004.

In some embodiments, as shown in FIG. 10B, the BSV 1000 has a reducer. In some embodiments, BSV 1000 has a coupling instead of a reducer and an O-ring 1006 is between the tubes inserted in the coupling. In some embodiments, the ball 1004 in the BSV 1000 may be a 440C stainless steel. The BSV 1000 may have an O-ring 1006 that is one or more of a rubber, an elastomer, an ethylene propylene diene monomer (EPDM) material, an EPDM rubber, an EPDM elastomer, etc. The O-ring 1006 may be sized to fit around the ball 1004. In some embodiments, the BSV 1000 has an O-ring 1006 configured to fit around the ball 1004 to allow a faster flow rate and less force to break the seal. The maximum temperature used with BSV 1000 may be about 250 degrees Fahrenheit. The BSV 1000 may be at least partially surrounded by insulation.

FIG. 11 is a low pressure valve (LPV) 1100, according to certain embodiments. In some embodiments, fifth valve 155 is a LPV 1100. For example, fifth valve 155 of FIG. 7 that allows hot water that has cooled to drain from the lower portion of the drum 222 to the disposal sink 214 may be a LPV 1100. An LPV 1100 may open at a specified low pressure and closes when that pressure is exceeded. An LPV 1100 may open when a pressure differential between the upstream side and the downstream side falls below a specified value. The LPV 1100 may be used in heat engines (e.g., one or more of system 100, system 200, system 300, or system 700).

Responsive to pressure differential dropping below an established baseline, a coil 1102 (e.g., spring) lifts the ball 1104 and opens the LPV 1100. In some embodiments, the ball 1104 may be one or more of a rubber, an elastomer, an EPDM material, an EPDM rubber, an EPDM elastomer, etc. In some embodiments, the ball 1104 may be metal (e.g., stainless steel, in lieu of a rubber ball) and there may be an O-ring similar to in the BSV 1000 to create the seal (e.g., between the ball 1104 that is metal and an inner surface of the LPV 1100). The maximum temperature the LPV 1100 may withstand may be about 250 degrees Fahrenheit. The coil 1102 (e.g., spring) may rest inside a copper tube on a punctured copper plug rest soldered inside the tube.

Figure 12:
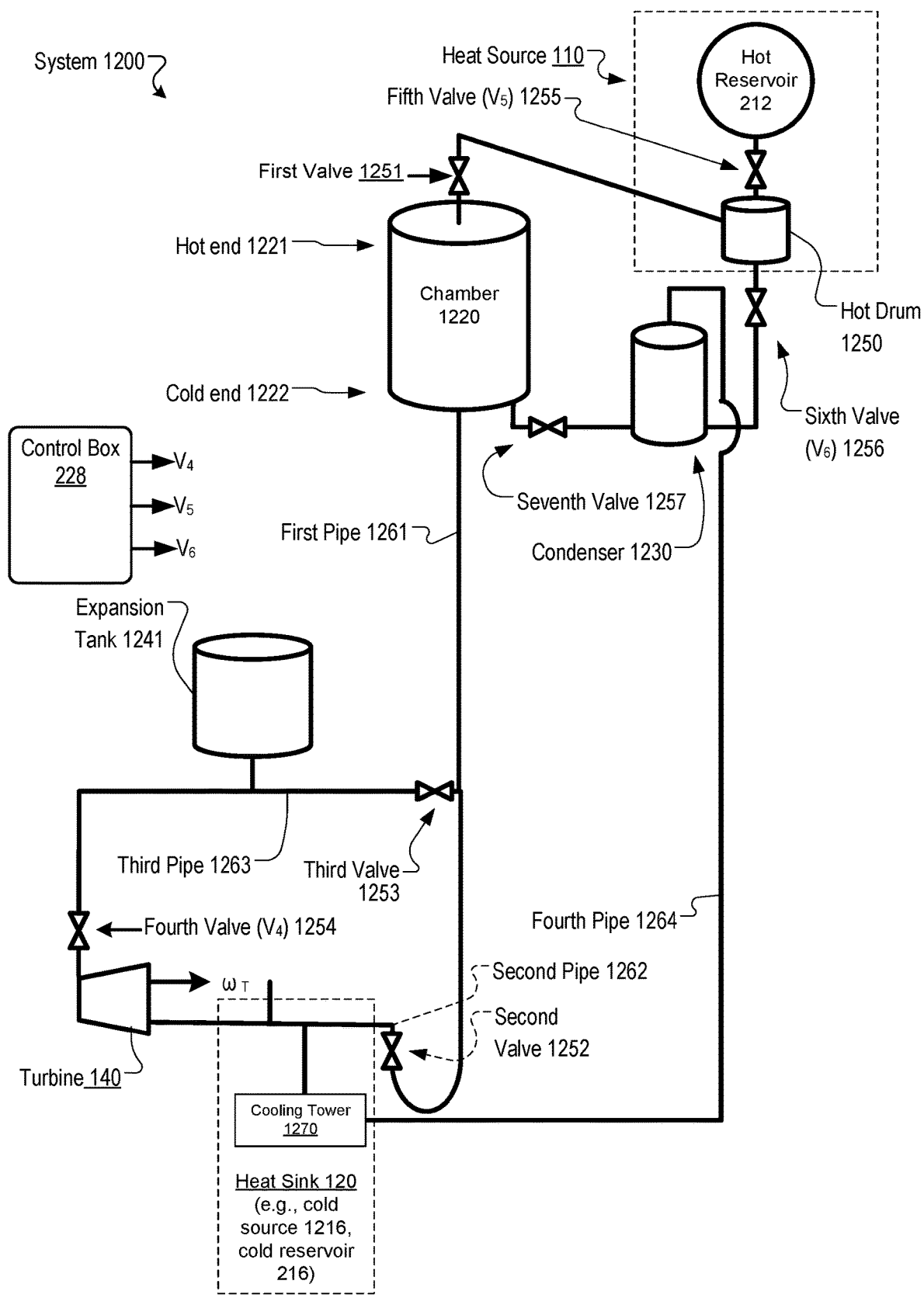
FIG. 12 is a schematic diagram illustrating a system to convert energy, according to certain embodiments.

FIG. 12 is a schematic diagram illustrating a system 1200 (e.g., system 100A of FIG. 1A) to convert energy, according to certain embodiments. Elements in FIG. 12 that have a similar reference number as elements in other FIGS. (e.g., FIG. 1A, FIG. 1B, FIG. 2, FIG. 3, FIG. 7) may include similar features and/or similar functionality. System 1200 may be a heat engine that transforms a low-level temperature differential between a heat source 110 and a heat sink 120 into useful power. System 1200 may be a hybrid heat engine. System 1200 may be a steam powered hydraulic ram (e.g., steam hydram.) System 1200 may produce power from a lower temperature heat source. For example, a steam system 1200 may combine characteristics of a steam engine and a power plant (e.g., hydropower plant) to economically produce power from a low temperature heat source.

System 1200 may be coupled to a heat source 110 (e.g., hot reservoir 212), and a heat sink 120 (e.g., cold source 1216, cold reservoir 216, located proximate the output of the turbine 140). System 1200 may include pipes including one or more of a first pipe 1261, a second pipe 1262, a third pipe 1263, and a fourth pipe 1264. System 1200 may include valves including one or more of a first valve 1251, a second valve 1252, a third valve 1253, a fourth valve 1254, a fifth valve 1255, a sixth valve 1256, and a seventh valve 1257. One or more of the valves of system 1200 may be controlled by the control box 228. One or more valves of system 1200 may not be controlled by the control box 228.

Cooling water and condensate from the turbine 140 may pass (e.g., be output) to the heat sink 120 (e.g., after use). The turbine 140 may be a high-pressure turbine. The heat source 110 may have a hot reservoir 212. In some embodiments, the hot reservoir 212 is not elevated above the remainder of system 1200. The heat sink 120 may be at a lower elevation than the hot reservoir 212.

System 1200 may be coupled to a heat source 110. System 1200 may include one or more components of the heat source 110. The heat source 110 may include a hot reservoir 212. The heat source 110 may include a hot drum 1250 (e.g., hot water chamber (HWC)). The hot reservoir 212 and the hot drum 1250 may be fluidly coupled. The fifth valve 1255 may be controlled by the control box 228. The fifth valve 1255 may be a ball solenoid valve (BSV) (see BSV 1000 of FIGS. 10A-B).

The hot drum 1250 may be fluidly coupled to the chamber 1220 (e.g., cylinder) and the condenser 1230. Flow of fluid (e.g., steam from the hot reservoir 212) into the hot drum 1250 may be controlled by the fifth valve 1255. The hot drum 1250 may be configured to provide fluid (e.g., steam, hot fluid vapor) to the chamber 1220. In some embodiments, the hot drum 1250 is one or more shapes (e.g., cylindrical, non-cylindrical, etc.).

The first valve 1251 may control the flow of hot fluid to chamber 1220. The first valve 1251 may be a valve assembly that includes one or more valves, fittings, and/or passages (e.g., first valve 1251 of FIG. 15). The first valve 1251 may be proximate to the hot end 1221 of the chamber 1220.

In some embodiments, the chamber 1220 may be cylindrical in shape. In some embodiments, the chamber 1220 may be situated at an elevation above the cold source 1216. This height may be optimized for overall efficiency to the system while still allowing for sufficient vacuum created in the first pipe 1261 when the piston moves towards the hot end 1221 to suck working fluid through the second valve 1252 from the cold source 1216. In some embodiments, the chamber 1220 may be a container capable of holding pressurized fluid. The chamber 1220 may have two distal ends. In some embodiments, a first distal end of the chamber 1220 is referred to as hot end 1221 and is fluidly coupled to the heat source 110. In some embodiments, a second distal end of the chamber 1220 is referred to as cold end 1222 and is fluidly coupled to the first pipe 1261. In some embodiments, the hot end 1221 and the cold end 1222 are opposite distal ends of the chamber 1220.

The chamber 1220 may have at least one port (e.g., inlet, outlet). In some embodiments, the chamber 1220 may have at least two ports (e.g., inlet and outlet). In some embodiments, a port of the chamber 1220 functions as an inlet and as an outlet (e.g., fluid flows in the chamber 1220 through the port and flows back out of the chamber 1220 via the same port). In some embodiments, fluid (e.g., pressurized fluid, steam, working fluid, liquid, gas, etc.) enters and/or exits the chamber 1220 through one or more ports. In some embodiments, fluid (e.g., pressurized fluid, steam, gas, etc.) may enter and/or exit the chamber 1220 via a port at the hot end 1221. In some embodiments, fluid (e.g., working fluid, water, etc.) may enter and/or exit the chamber at the cold end 1222.

The chamber 1220 is a structure (e.g., a chamber structure that has chamber walls) that at least partially encloses an interior volume (e.g., forms a cavity). In some embodiments, a piston is disposed in the chamber 1220. In some embodiments, the piston divides an upper portion of the inner volume of chamber 1220 from a lower portion of the inner volume of the chamber 1220. In some embodiments, the upper portion of the inner volume is sealed off from the lower portion of the inner volume via the piston (e.g., the sidewalls of the piston engage with the inner sidewalls of the chamber to prevent fluid from passing the piston). The piston may have an upper surface and a lower surface that is opposite the upper surface. The upper surface of the piston may face the hot end 1221 and the lower surface of the piston may face the cold end 1222. In some embodiments, the piston may be a fluid piston. The fluid piston includes a slug of fluid (e.g., liquid, water, a layer of oil on a layer of water, etc.). In some embodiments, the piston is solid. In some embodiments, the piston may be constructed of metal. The piston may move in two directions along the axis of the chamber 1220. The movement of the piston within chamber 1220 may be cyclic. The piston may move within chamber 1220 responsive to fluid (e.g., steam from the heat source 110, working fluid from the first pipe 1261, etc.) exerting pressure. In some embodiments, fluid may exert pressure on one or both sides of the piston.

The chamber 1220 may contain pressurized gas. In some embodiments, the pressurized gas may be at the hot end 1221. The pressurized gas may exert pressure on the upper surface of the piston that faces the hot end 1221. The pressurized gas may be able to flow into and out of the chamber 1220 responsive to the opening and closing of the first valve 1251. The pressurized gas may flow out of the chamber 1220 responsive to the movement of the piston.

The chamber 1220 may contain working fluid. In some embodiments, the working fluid may be contained at the cold end 1222. The working fluid may be a liquid. In some embodiments, the working fluid may be water. In some embodiments, the working fluid may be a refrigerant. The working fluid may be forced out of the chamber 1220 responsive to the movement of the piston. The working fluid may be drawn into the chamber 1220 responsive to the movement of the piston. The working fluid may exit the chamber 1220 into the first pipe 1261. The working fluid may be drawn into the chamber 1220 from the first pipe

1261. In some embodiments, the working fluid may be drawn into the chamber 1220 from another pipe.

The first valve 1251 may include a float valve. The float valve may include a float ball that may cover a port when supported by the piston. The first valve 1251 may be configured to open when the piston moves away from the hot end and the float ball no longer covers the port. Hot fluid flows into the chamber 1220 when the first valve 1251 is open. The hot fluid may be a vapor. In some embodiments, the vapor is steam. Hot fluid may flow out of the chamber 1220 when the first valve 1251 is open responsive to the movement of the piston. Hot fluid from the heat source 110 may expand within the chamber 1220. The expanding hot fluid may exert a force on the piston within the chamber 1220.

The chamber 1220 may be fluidly coupled to the first pipe 1261. The chamber 1220 may be fluidly coupled to the condenser 1230. The chamber 1220 (e.g., a lower portion of the inner volume of the chamber 1220) may receive working fluid (e.g., condensed steam that was provided from the heat source 110) from the condenser 1230. The chamber 1220 may receive working fluid from the first pipe 1261. The working fluid in chamber 1220 may be pushed by the flow of hot fluid into chamber 1220. In some embodiments, the hot fluid may push the piston which may push the working fluid. The pressure of the working fluid may be raised when pushed on by the piston. The working fluid may be prevented from flowing back to the condenser 1230 by the seventh valve 1257. The seventh valve 1257 may be a check valve. The working fluid may flow out of the chamber 1220 into the first pipe 1261.

The first pipe 1261 may connect the chamber 1220 with the second pipe 1262 and the third pipe 1263. Working fluid may be pushed from the chamber 1220 toward the third pipe 1263 through the first pipe 1261. The flow of working fluid through the first pipe 1261 may include pulsations (e.g., pressure wave, water hammer) of working fluid. The second valve 1252 and the third valve 1253 may be at one end of the first pipe 1261 opposite the chamber 1220. The second valve 1252 may prevent flow of working fluid into the second pipe 1262 from the first pipe 1261.

The second valve 1252 may include a check valve. The second valve 1252 may include a reverse float valve (e.g., reverse float valve 1900 of FIG. 19). The second valve 1252 may allow cold working fluid from cold source 1216 to enter the first pipe 1261. The second valve 1252 may also prevent air from entering the first pipe 1261. The third valve 1253 may prevent flow of working fluid from the third pipe 1263 into the first pipe 1261. The third valve 1253 may be a check valve. The third valve 1253 may allow flow from the first pipe 1261 into the third pipe 1263 only when the pressure of the working fluid in the first pipe 1261 matches or exceeds the pressure of the working fluid in the third pipe 1263.

The third pipe 1263 (e.g., that includes a penstock, sluice, floodgate, channel for conveying the fluid to the turbine, and/or the like) may couple the first pipe 1261 with the turbine 140. The expansion tank 1241 may be coupled to the third pipe 1263. The third pipe 1263 and the expansion tank 1241 may contain working fluid at a higher pressure than working fluid in the first pipe 1261. The expansion tank 1241 may contain an amount of pressurized gas. In some embodiments, the pressurized gas may be air. The expansion tank 1241 may be configured to regulate the pressure of the working fluid contained in the expansion tank 1241 and the third pipe 1263. The initial pressure within the expansion tank 1241 may be set by a user of system 1200. The pressure inside the expansion tank 1241 may be set using a valve (e.g., Schrader valve, Presta valve, or equivalent) to inject gas into the expansion tank 1241. The volume of the expansion tank 1241 may be greater than the volume of working fluid flowing into the third pipe 1263 from the first pipe 1261 with each pulsation of working fluid. Flow of working fluid from the third pipe 1263 to the input of the turbine 140 is regulated by the fourth valve 1254. The fourth valve 1254 may be controlled by the control box 228.

The outlet of the turbine 140 may be connected to the heat sink 120 (e.g., cold source 1216). An amount of working fluid exhausted from the turbine 140 to the heat sink 120 may be bled off to a cooling tower 1270. The cooling tower 1270 may be a single cooling tower or a set of cooling towers. The cooling tower 1270 may utilize liquid to liquid cooling, or air to liquid cooling. In some embodiments, ambient air is used instead of one or more cooling towers. The fourth pipe 1264 may be fluidly coupled between the heat sink 120 (e.g., cooling tower 1270, cold source 1216) and the condenser 1230.

The condenser 1230 may receive cooled working fluid from the heat sink 120 through the fourth pipe 1264. The condenser 1230 may receive heat source fluid provided by the heat source 110 (e.g., at least a portion of the fluid is provided by the heat source 110 to the chamber 1220). Expended heat source fluid from the chamber 1220 may be routed to the condenser 1230 through the first valve 1251, the hot drum 1250, the sixth valve 1256, and associated piping. The sixth valve 1256 may be a low pressure valve (LPV) (e.g., LPV 1100 of FIG. 11). The sixth valve 1256 may be a solenoid drain valve (SDV) (e.g., SDV 1800 of FIG. 18) controlled by the control box 228. The heat source fluid may enter the condenser 1230 in a gaseous state (e.g., steam from hot drum 1250). Working fluid may enter the condenser 1230 in a liquid state (e.g., from cooling tower 1270). In some embodiments, the heat source fluid and the working fluid are the same fluid in different states of matter (e.g., gas and liquid). Working fluid and heat source fluid may mix inside the condenser 1230 where the heat source fluid may condense into fully liquid form. The condenser 1230 may have a perforated plate that serves to direct streams of atomized liquid working fluid. The combined fluid may exit the condenser 1230 to the chamber 1220. The condenser 1230 may be elevated above the chamber 1220 to enable draining of the condenser 1230. The input of mixed fluid to the chamber 1220 from the condenser 1230 may be regulated by the seventh valve 1257. The seventh valve 1257 may be proximate to the chamber 1220. The seventh valve 1257 may only allow flow of fluid away from the condenser 1230. The seventh valve 1257 may be a check valve.

Figure 13:
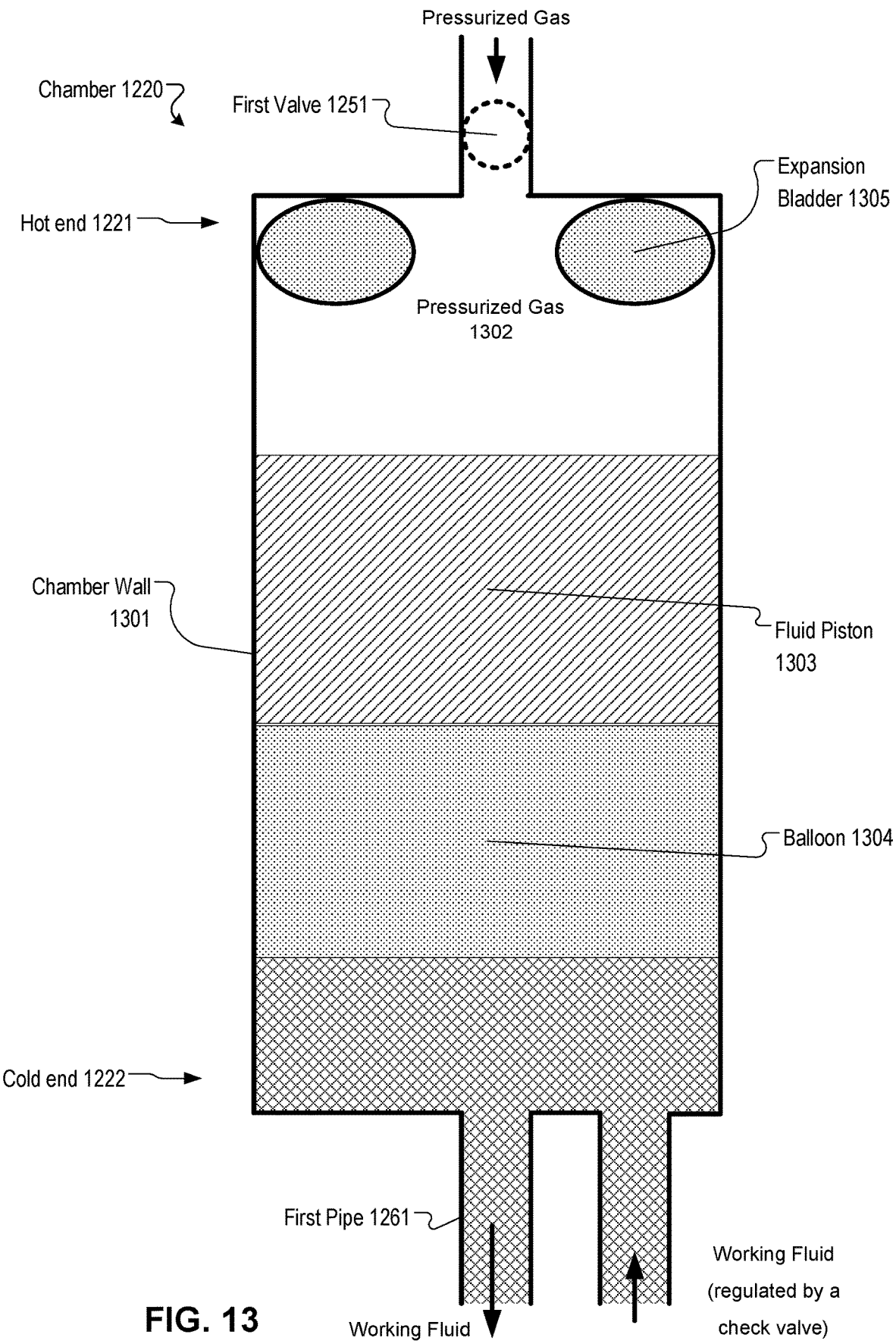
FIG. 13 is a schematic diagram illustrating a chamber, according to certain embodiments.

FIG. 13 is a schematic diagram illustrating a chamber, according to certain embodiments. Elements in FIG. 13 that have a similar reference number as elements in other FIGS. (e.g., FIG. 1A or FIG. 12) may include similar features and/or similar functionality.

The chamber 1220 may contain a piston. In some embodiments, the piston may be a fluid piston 1303 (See FIG. 13). In some embodiments, the fluid piston 1303 may comprise a liquid. In some embodiments, the fluid piston 1303 may be water. In some embodiments, the fluid piston 1303 may comprise a layer of oil and a layer of a different liquid.

The chamber 1220 may contain pressurized gas 1302. The pressurized gas 1302 may be able to flow into and out of the chamber 1220 responsive to the opening and closing of the first valve 1251. The pressurized gas 1302 may flow out of the chamber 1220 responsive to the movement of the piston.

The chamber 1220 may contain an expansion bladder 1305 (e.g., bladder structure). The expansion bladder 1305 may be a doughnut shaped bladder. In some embodiments, the expansion bladder 1305 may be made of rubber. The expansion bladder 1305 may be filled with a compressible gas. In some embodiments, the expansion bladder 1305 may be filled with air. In some embodiments, the expansion bladder 1305 may be filled with nitrogen.

The chamber 1220 may contain a balloon 1304. The balloon 1304 may be a partition. In some embodiments, the balloon 1304 may be compressible. In some embodiments, the balloon 1304 may compress responsive to the movement of the piston. The balloon 1304 may be made of a polymer. In some embodiments, the balloon 1304 is made of butyl rubber. The balloon 1304 may be a bladder. In some embodiments, the balloon 1304 may be filled with gas. In some embodiments, the balloon 1304 may be filled with air. In some embodiments, the balloon 1304 may be filled with nitrogen. In some embodiments the balloon 1304 may have no containment (e.g., the balloon 1304 compresses the gas). The balloon 1304 may exert pressure on the piston. In some embodiments, the balloon 1304 may push the piston towards the hot end 1221 as the balloon expands.

The chamber 1220 may contain working fluid. The working fluid may be forced out of the chamber 1220 responsive to the movement of the piston and the balloon 1304. The working fluid may be drawn into the chamber 1220 responsive to the movement of the piston and the balloon 1304. The working fluid may exit the chamber 1220 into the first pipe 161. The working fluid may be drawn into the chamber 1220 from the first pipe 1261. In some embodiments, the working fluid may be drawn into the chamber 1220 from another pipe.

FIG. 14 is a schematic diagram illustrating a chamber, according to certain embodiments. Elements in FIG. 14 that have a similar reference number as elements in FIG. 1, 12, or 13 may include similar features and similar functionality.

In some embodiments, the chamber 1220 may be a U-shaped chamber 1400 (See FIG. 14). In some embodiments, the chamber 1220 is a U-shaped body. In some embodiments, the hot end 1221 and the cold end 1222 may have similar elevations. In some embodiments, the hot end 1221 (e.g., the first distal end) may be at a first height. The cold end 1222 (e.g., the second distal end) may be at a second height. The second height may be at least as high as the first height. The second height may be higher than the first height. In some embodiments, the U-shaped chamber 1400 may be a U-shaped body that is routed from the first distal end to a third height and is routed from the third height to the second distal end. In some embodiments, the third height may be lower than the first height and the second height. In some embodiments the walls of the chamber may be curved. In some embodiments of the U-shaped chamber, the balloon 1304 may be a pocket of gas. In some embodiments, the pocket of gas may be a pocket of air.

The U-shaped chamber 1400 may retain one or more of the features of the chamber 1220 as already described. For example, the piston may be a fluid piston 1303 as already described. In some embodiments, the U-shaped chamber 1400 may receive pressurized gas at the hot end 1221. In some embodiments, the U-shaped chamber may push working fluid into the first pipe 1261. The U-shaped chamber may contain an expansion bladder 1305. The expansion bladder may be contained at the hot end 1221.

FIG. 15 is a schematic diagram illustrating a valve assembly, according to certain embodiments. Elements in FIG. 15 that have a similar reference number as elements in FIG. 1, 12, 13, or 14 may include similar features and similar functionality. In some embodiments, the valve assembly illustrated is the first valve 1251.

The first valve 1251 may be a valve assembly that includes valves, fittings, and passages (see FIG. 15). In some embodiments, the first valve 1251 may include one or more of an outlet ball valve 1555, an outlet check valve 1556, an Initial Pressure Regulator (IPR) ball valve 1554, and a float valve. In some embodiments, the outlet ball valve 1555 may be made of polyvinyl chloride (PVC). In some embodiments, the outlet check valve 1556 is made of chlorinated polyvinyl chloride (CPVC). In some embodiments, the IPR ball valve 1555 may be made of polypropylene or CPVC.

First valve 1251 may include a gasket 1557 (e.g., O-ring). In some embodiments, the gasket 1557 may mate with the float ball 1559 to form a float valve. In some embodiments, the gasket 1557 may be disposed within a groove. In some embodiments, the gasket 1557 may be fastened into the groove by an adhesive. In some embodiments, the float ball 1559 may be a polypropylene ball. In other embodiments, the float ball 1559 may be one or more of a rubber, an elastomer, an EPDM material, an EPDM rubber, an EPDM elastomer, etc. In other embodiments, the float ball 1559 may be a metal (e.g., stainless steel, in lieu of a rubber ball). The float ball 1559 may be hollow. The float ball 1559 may be configured to float. In some embodiments, the gasket 1557 may be the sealing surface for which the float ball 1559 may seat against. The float ball 1559, perforated plate 1558, and gasket 1557 may protrude into the chamber 1220. The float ball 1559 may float on liquid contained within the chamber 1220. The float ball 1559 may be retained by the perforated plate 1558 and a cylindrical type body. This cylindrical body may be perforated (e.g., one or more sidewalls of the cylindrical body may be perforated) to allow fluid to pass while retaining the ball. The perforated plate may be configured to allow the float ball 1559 to move a distance from the gasket 1557. The perforated plate may be made of CPVC. The combination of the float ball 1559, the gasket 1557, and the perforated plate 1558 may be configured to allow the passage of liquid and gas one direction through the first valve 1251, but not allow the passage of liquid the opposite direction through the first valve 1251.

The first valve 1251 may include a pressure sensor 1560. The first valve 1251 may include a cross 1570. In some embodiments, the cross 1570 is made of CPVC. The pressure sensor 1560 may be configured to monitor the pressure of fluid within the cross 1570. The pressure sensor 1560 may send pressure data to a control box.

The first valve 1251 may include a compressed air reservoir 1553. The compressed air reservoir 1553 may contain an amount of compressed air. The compressed air within the compressed air reservoir 1553 may be used to initially set the pressure of at least part of system 1200. The compressed air reservoir 1553 may be fluidly connected to the CPVC cross. CPVC ball valve 1554 may regulate the flow of compressed air to the CPVC cross 1570. The CPVC cross 1570 may receive fluid under pressure from the hot drum 1250.

Figure 16A:
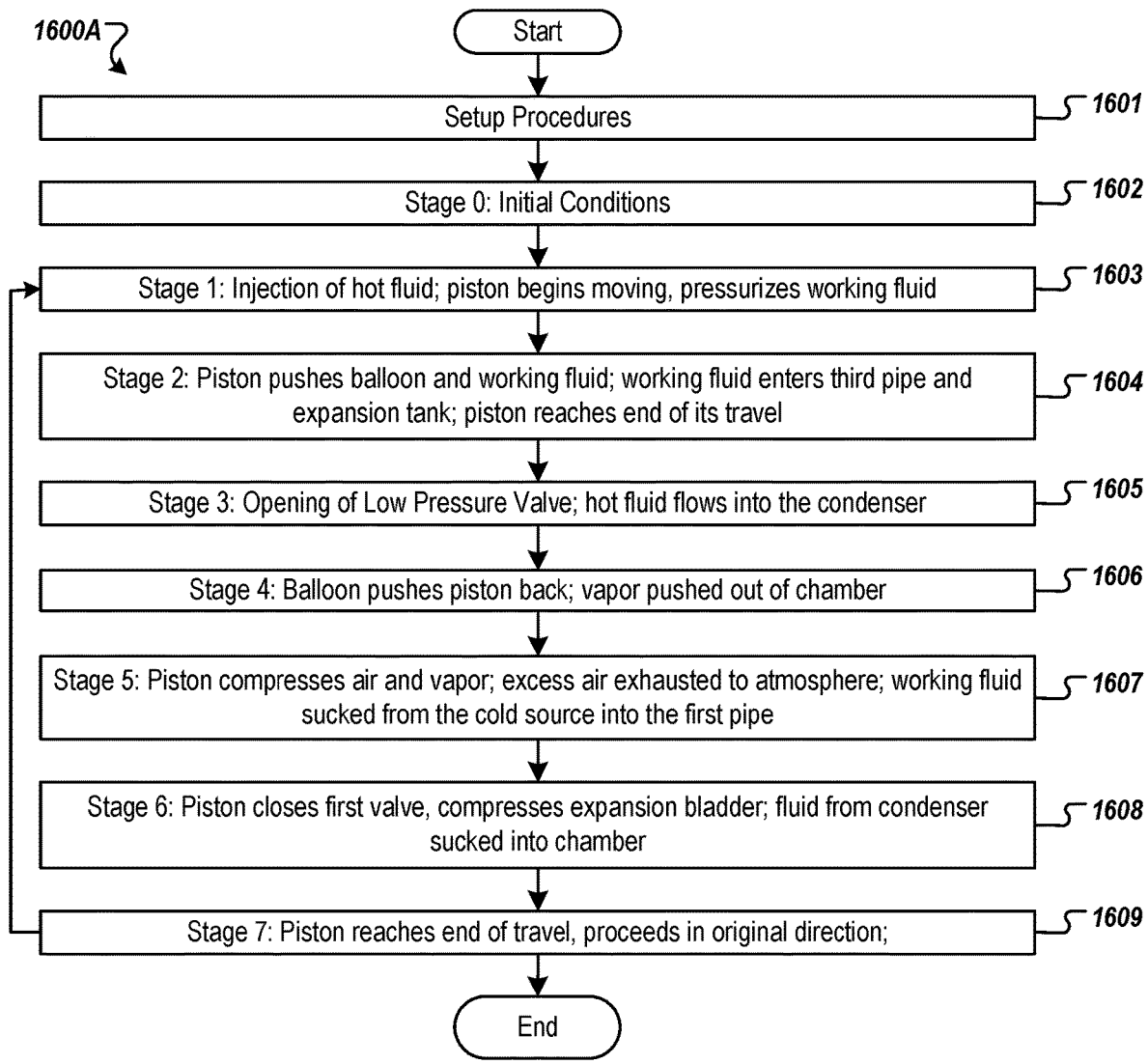
FIG. 16A is a flow diagram of a method of converting energy, according to certain embodiments.

FIG. 16A is a flow diagram of a method 1600A of converting energy, according to certain embodiments. In some embodiments, one or more operations of method 1600A are performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, a non-transitory storage medium stores instructions that when executed by a processing device (e.g., of control box 228) cause the processing device to perform one or more operations of method 1600A. In some embodiments, one or more operations of method 1600A are performed by the control box 228.

For simplicity of explanation, method 1600A is depicted and described as a series of operations. However, operations in accordance with this disclosure can occur in various orders and/or concurrently and with other operations not presented and described herein. Furthermore, not all illustrated operations are performed to implement method 1600A in accordance with the disclosed subject matter. In addition, those skilled in the art will understand and appreciate that method 1600A could alternatively be represented as a series of interrelated states via a state diagram or events.

In some embodiments, the method 1600A is cyclic. In some embodiments, the method 1600A may include operations including one or more of setup procedures (e.g., block 1601), Stage 0 (e.g., block 1602), Stage 1 (e.g., block 1603), Stage 2 (e.g., block 1604), Stage 3 (e.g., block 1605), Stage 4 (e.g., block 1606), Stage 5 (e.g., block 1607), Stage 6 (e.g., block 1608), and Stage 7 (e.g., block 1609). In some embodiments, one or more operations the method 1600A may repeat. In some embodiments, the method 1600A may proceed to Stage 1 (e.g., block 1603) after completing Stage 7 (e.g., block 1609). The method 1600A may be performed by one or more of system 100A of FIG. 1A, system 1200 of FIG. 12, and/or system 1700 of FIG. 17.

The system 1200 may operate in a cycle. The cycle may be continuous. In some embodiments, variables Y, $P_C$, $P_{LPV}$, $P_{b0}$, $P_{ATM}$, $P_{E0}$, and $P_T$ may be used to describe the cycle of system 1200. Y may be the position of the piston within the chamber 1220. $P_C$ may be the pressure maintained in the condenser 1230. $P_{LPV}$ may be the pressure at which the sixth valve 1256 (e.g., LPV) is set to open. $P_{b0}$ may be the internal pressure of the balloon 1304. $P_{ATM}$ may be atmospheric pressure. $P_{E0}$ may be the pressure of the expansion bladder 1305. $P_t$ may be the pressure within the expansion tank 1241.

At block 1601, setup procedures are performed. The setup procedures include filling the expansion tank 1241 and the third pipe 1263 with working fluid. In some embodiments, the turbine 140 and the cold source 1216 may be filled with working fluid. In some embodiments, the second pipe 1262 is filled with working fluid. The expansion tank is pressurized to $P_T$. In some embodiments, the fourth valve 1254 is closed to facilitate pressurizing the expansion tank 1241. The fourth pipe 1264 is filled with working fluid. The balloon 1304 is filled with air at $P_{ATM}$. The cold end 1222 of the chamber 1220 is filled with working fluid. In some embodiments, the piston is inserted into the chamber 1220. In some embodiments, liquid is poured into the chamber 1220 to make the fluid piston 1303. A vacuum pump may need to be connected to the outlet ball valve 1555. The pressure inside the cross 1570 and the chamber 1220 is reduced by the vacuum pump to a pressure less than $P_{ATM}$-$P_{LPV}$. The hot drum 1250, the first valve 1251, and the hot end 1221 are preheated. In some embodiments, the fifth valve 1255 opens to allow atmospheric pressure hot fluid into the hot drum 1250. In some embodiments, the vacuum pump is again connected to the outlet ball valve 1555. The pressure of the hot end 1221, the first valve 1251, the hot drum 1250, and the condenser 1230 may be lowered to $P_C$. In some embodiments, the outlet ball valve 1555 is then closed. Pressurized air may be introduced to the compressed air reservoir 1553 through the Schrader valve 1552. In some embodiments, working fluid is then allowed to flow into the condenser 1230. In some embodiments, the IPR ball valve 1554 is opened. In some embodiments, this brings the pressure inside the cross 1570 and the hot end 1221 to $P_{ATM}$. The outlet ball valve 1555, and the fourth valve 1254 may need to be quickly opened. Opening the outlet ball valve 1555 may allow excess air to be expelled from the hot end 1221. Opening the fourth valve 1254 may allow working fluid to flow through the turbine 140. In some embodiments, the cycle begins.

At block 1602, operations of Stage 0 is performed. At Stage 0, working fluid may fill the first pipe 1261. The piston may be at an initial position $Y_0$ and may rest and push down on the working fluid within the chamber 1220 with a pressure well below $P_{ATM}$. The working fluid within the chamber 1220 and the first pipe 1261 may be a fluid column. The fluid column may be prevented from ascending by the second valve 1252 which may only allow the passage of liquid. Air may be in the hot end 1221 of the chamber 1220. In some embodiments, air in the hot end 1221 of chamber 1220 may be at $P_{ATM}$. The sixth valve 1256 may be closed which may prevent air from passing into the condenser 1230. The first valve 1251 may be configured so that the float valve (e.g., the combination of the float ball 1559 and the gasket 1557) is closed when the piston is closer to the hot end 1221 than $Y_0$. The interior of the condenser 1230 may be at pressure $P_C$. The interior of the expansion bladder 1305 may be at pressure $P_{E0}$, which may be equal to or slightly higher than $P_{ATM}$. The pressure of the working fluid in the third pipe 1263 and the expansion tank 1241 may be maintained at pressure $P_T$ which may be well above $P_{ATM}$. The third valve 1253 may prevent the higher pressure fluid in the third pipe 1263 from flowing into the lower pressure first pipe 1261. Fluid at pressure $P_T$ may flow through the turbine 140 to the cold source 1216. The cold source 1216 may be maintained at pressure $P_{ATM}$ by a vent. A portion of fluid in the cold source 1216 may be bled off and routed to a cooling tower 1270 or a set of cooling towers. The fluid may be cooled to a temperature above the wet bulb temperature of the ambient air. The cooled fluid is sucked through the fourth pipe 1264 into the condenser 1230 by the lower pressure $P_C$.

At block 1603, operations of Stage 1 are performed. At Stage 1, the pressure sensor 1560 within the first valve 1251 may detect a pressure drop from $P_{ATM}$ in the cross 1570 as the piston is forced down by expanding air. In some embodiments, the pressure in the cross 1570 at this stage in the cycle may be the same pressure as in the hot end 1221. In some embodiments, the sensor may send the sensor data to the control box 228. The control box 228 may control the fifth valve 1255 to then inject hot fluid from the hot reservoir 212 into the hot drum 1250. The control box 228 may trigger the fifth valve 1255 to open for a specified amount of time. The control box 228 may then trigger the fifth valve 1255 to close so that a controlled (e.g., predetermined) amount of hot fluid is injected into the hot drum 1250. The hot fluid may emit a vapor. In some embodiments, the vapor may be expanding. The expanding vapor emitted from the hot fluid may flow from the hot drum 1250 through the first valve 1251 and associated piping into the chamber 1220. The piston may be pushed from the force of expanding air and vapor. The piston may exert force on the balloon 1304. The pressure of the balloon 1304 may increase responsive to the force exerted by the piston. In some embodiments, the balloon 1304 may compress. The balloon 1304 may exert a force on the working fluid in the cold end 1222 of the chamber 1220. As the piston moves and the balloon 1304 increases in pressure, the working fluid in the chamber 1220 and the first pipe 1261 may experience a pressure increase until the pressure of the working fluid reaches $P_T$. The pressure increase experienced by the working fluid in the chamber 1220 and the first pipe 1261 may be in the form of a pressure surge.

At block 1604, operations of Stage 2 are performed. At Stage 2, the piston may continue moving under its own momentum and under the force exerted by the expanding vapor in the hot end 1221. The piston may push the balloon 1304 toward the cold end 1222. The working fluid may be pushed through the first pipe 1261 and the third valve 1253. The expansion tank 1241 may be sufficiently large compared to the addition of working fluid into the third pipe 1263 to maintain near constant pressure. In some embodiments, the constant pressure within the third pipe 1263 is $P_T$. As the piston nears the end of its travel, it may reverse direction. The piston may decelerate rapidly as it nears the end of its travel. The rapid deceleration of the piston may cause a pressure surge to occur in the working fluid in the chamber 1220 and the first pipe 1261.

At block 1605, operations of Stage 3 are performed. At Stage 3, when the piston reaches the end of its travel, the pressure within the hot end 1221, hot drum 1250, and the associated piping may be $P_{LPV}$. The sixth valve 1256 may be triggered to open. Hot fluid may flow from the hot drum 1250 through the sixth valve 1256 into the condenser 1230. In the condenser 1230, the fluid may be condensed to pressure $P_C$. The pressure in the hot drum 1250 and the hot end 1221 may drop to $P_C$.

At block 1606, operations of Stage 4 are performed. At Stage 4, the piston may then be pushed back toward hot end 1221 by the balloon 1304. In some embodiments, the compressed balloon exerts a force on the piston. As the piston travels, pressure in the hot end 1221, the hot drum 1250, and the condenser 1230 may be maintained at $P_C$. Vapor may be pushed out of the hot end 1221 to the hot drum 1250 and the condenser 1230.

The piston may continue to travel towards the hot end 1221 and may compress the air occupying the hot end 1221. In some embodiments, the system 1200 may now be in Stage 5 at block 1607. The pressure sensor 1560 in the first valve 1251 may detect a rise in pressure in the cross 1570 and may send the sensor data to the control box 228. The control box 228 may trigger the fifth valve 1255 to open briefly. A small burst of hot fluid from the hot reservoir 212 may be injected into the hot drum 1250. The hot fluid injected into the hot drum 1250 may cause the pressure inside the hot drum 1250 to rise above $P_{LPV}$ which may cause sixth valve 1256 to close. If the pressure in the hot end 1221 exceeds $P_{atm}$, excess air may be pushed through the float valve (e.g., the combination of the float ball 1559 and the gasket 1557) into the cross 1570, through the outlet check valve 1556, through the outlet ball valve 1555. The excess air may be vented to atmosphere. Working fluid may fill the cold end 1222 responsive to the piston and the balloon 1304 traveling toward the hot end 1221. In some embodiments, fluid may be sucked through the second pipe 1262 and the second valve 1252 into the first pipe 1261. Only liquid may be allowed to pass through the second valve 1252.

At block 1608, operations of Stage 6 are performed. At stage 6, when the piston reaches its initial position $Y_0$, the float valve (e.g., the combination of the float ball 1559 and gasket 1557 of the first valve 1251) may close. Pressure in the hot end 1221 and the hot drum 1250 may be $P_{ATM}$. The piston may continue its travel under its own momentum. The piston may compress air in the hot end 1221 and the expansion bladder 1305. The expansion bladder may compress responsive to the piston's travel. When the piston reaches the end of its travel, it may reverse direction. Fluid from the condenser 1230 may be sucked into the cold end 1222 before the piston changes direction.

At block 1609, operations of Stage 7 are performed. In some embodiments, at Stage 7, the piston may begin to fall under its own weight. In some embodiments, the piston may be pushed by the force of expanding air at hot end 1221. In some embodiments, the piston may be pushed by the force of the compressed expansion bladder 1305. When the piston reaches its initial position $Y_0$, the pressure in hot end 1221 may be $P_{ATM}$. As the piston falls, the pressure may fall below $P_{ATM}$. The pressure sensor 1560 may detect a pressure below $P_{ATM}$. The pressure sensor 1560 may send the sensor data to the control box 228. The control box 228 may trigger the fifth valve 1255 to open. In some embodiments, flow may continue from block 1609 to block 1603.

Figure 16B:
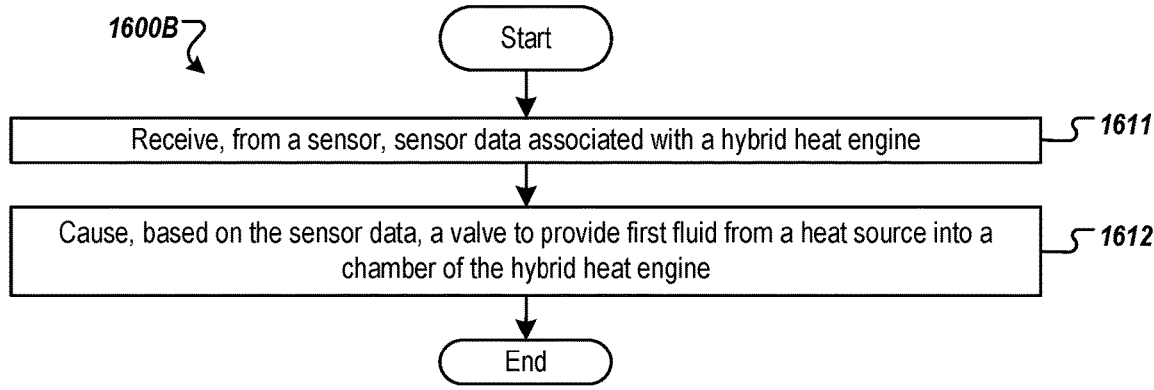
FIG. 16B is a flow diagram of a method of converting energy, according to certain embodiments.

FIG. 16B is a flow diagram of a method 1600B of converting energy (e.g., generating power), according to certain embodiments. The method 1600B may be performed by processing logic that includes hardware (e.g., circuitry, dedicated logic, programmable logic, microcode, etc.), software (e.g., instructions run on a processor to perform hardware simulation), or a combination thereof. In one embodiment, the method 1600B may be performed by control box 228 of FIG. 12. In one embodiment, the method 1600B may be performed by control box 228 of FIG. 17. In one embodiment, the method 1600B may be performed by a processing device of a control box of a heat engine. Alternatively, the method 1600B can be performed by other components as described herein.

For simplicity of explanation, method 1600B is depicted and described as a series of operations. However, operations in accordance with this disclosure can occur in various orders and/or concurrently and with other operations not presented and described herein. Furthermore, not all illustrated operations are performed to implement method 1600B in accordance with the disclosed subject matter. In addition, those skilled in the art will understand and appreciate that method 1600B could alternatively be represented as a series of interrelated states via a state diagram or events.

At block 1611, the control box 228 receives, from a sensor, sensor data associated with a hybrid heat engine. In some embodiments, the sensor is a pressure sensor and the sensor data indicates a drop in pressure (e.g., in a chamber of the hybrid heat engine, in cross 1570, etc.). In some embodiments, the pressure sensor is proximate to cross 1570 (see FIG. 15). In some embodiments, the pressure sensor monitors the pressure of the interior of the cross 1570.

At block 1612, the control box 228 causes, based on the sensor data, actuation of a valve (e.g., fifth valve 1255) to provide first fluid (e.g., hot fluid, hot water, steam) from a heat source into a chamber of the hybrid heat engine. In some embodiments, the first fluid expands. The first fluid (e.g., expanding hot fluid) causes movement of a piston disposed within the chamber. The movement of the piston causes second fluid (e.g., working fluid) to be pushed through a turbine to generate energy. The turbine is fluidly coupled to the chamber via one or more first pipes.

In some embodiments, a partition (e.g., bladder structure) is disposed in the chamber between the piston (e.g., fluid piston) and the second fluid.

In some embodiments, the actuation of the valve in block 1612 causes a first amount of the first fluid to enter the chamber and the first amount of the first fluid causes the movement of the piston in a first direction away from the first amount of the first fluid. Subsequent to the movement of the piston in the first direction, the drop in pressure in the chamber causes opposite movement of the piston in a second direction opposite the first direction.

In some embodiments, the movement and opposite movement of the piston causes a cyclical flow of the second fluid through the one or more first pipes, the turbine, and one or more second pipes fluidly coupled between the turbine and the one or more first pipes.

In some embodiments, at block 1612, the control box 228 causes the valve to open and to close (e.g., so that only a predetermined amount of hot fluid is injected). In some embodiments, the control box 228 determines the amount of hot fluid to be injected based on efficiency and power requirements. In some embodiments, the piston reverses direction at the end of movement of the piston.

In some embodiments, the control box 228 receives sensor data (e.g., pressure data from the pressure sensor located proximate to the cross 1570, pressure data indicating a pressure rise, such as within the cross 1570). In some embodiments, the control box 228 causes the valve to open (e.g., responsive to receiving the sensor data indicating a pressure rise). In some embodiments, the control box 228 causes the valve to close (e.g., after a short duration). The open valve may provide a burst of hot fluid to the chamber. In some embodiments, the burst of hot fluid may cause a pressure rise within the chamber. In some embodiments, the pressure rise within the chamber may cause a LPV (e.g., the sixth valve 1256) to close. In some embodiments, flow may continue to block 1611 (e.g., flow is cyclic).

Figure 17:
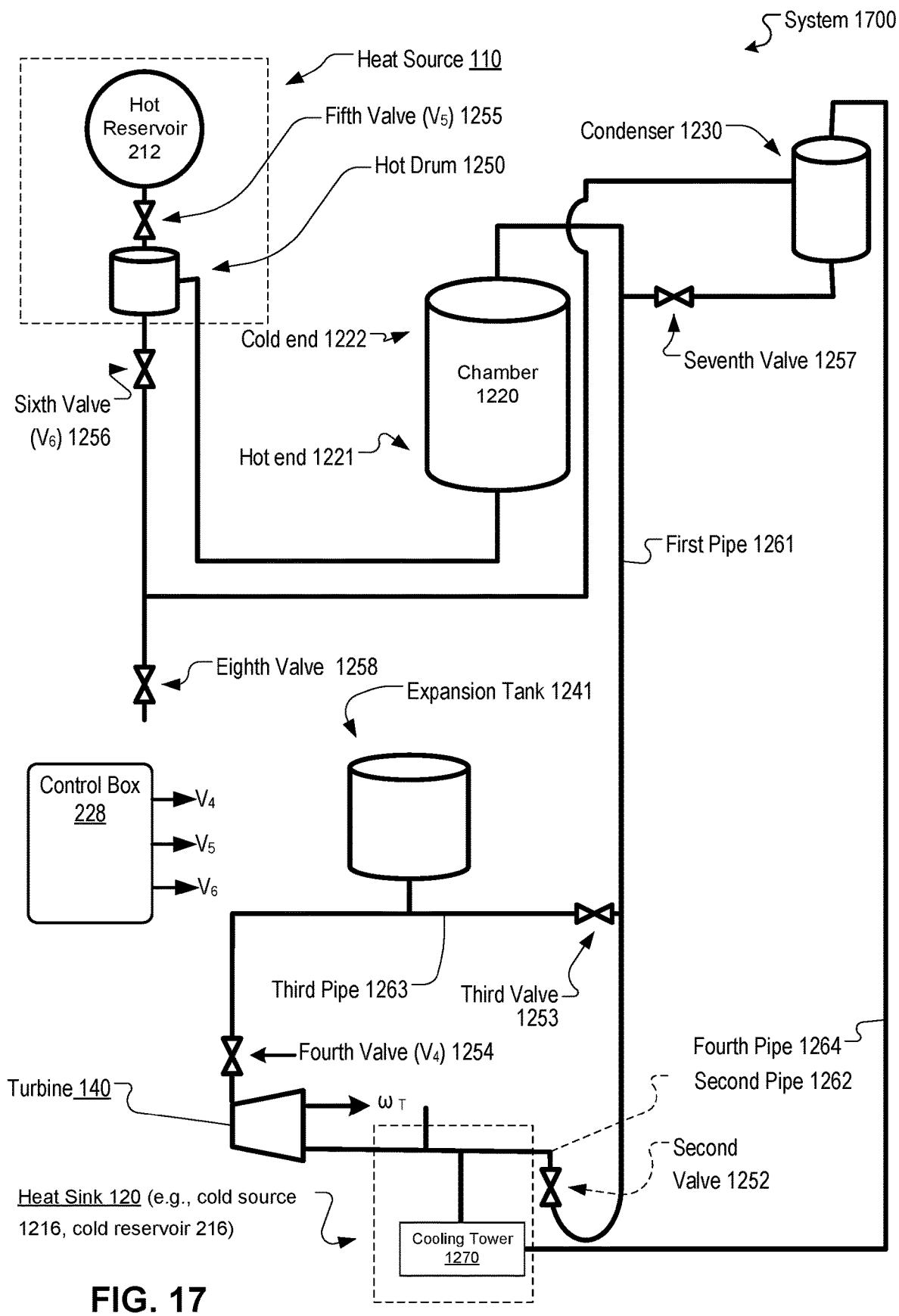
FIG. 17 is a schematic diagram illustrating a system to convert energy, according to certain embodiments.

FIG. 17 is a schematic diagram illustrating a system 1700 to convert energy, according to certain embodiments. Elements in FIG. 17 that have a similar reference number as elements in other FIGS. (e.g., FIGS. 1A and 12) may include similar features and/or similar functionality. System 1700 may be a hybrid heat engine that transforms a low-level temperature differential between a heat source and a heat sink into useful power. System 1700 may be a steam powered hydraulic ram (e.g., steam hydram).

System 1700 may be coupled to a heat source 110 (e.g., hot reservoir 212), and a heat sink 120 (e.g., cold source 1216, located proximate the output of the turbine 140). System 1700 may include pipes including one or more of a first pipe 1261, a second pipe 1262, a third pipe 1263, and a fourth pipe 1264. System 1700 may include valves including one or more of a second valve 1252, a third valve 1253, a fourth valve 1254, a fifth valve 1255, a sixth valve 1256, a seventh valve 1257, and an eighth valve 1258. (To maintain continuity with the numbering of system 1200, system 1700 has no first valve). One or more of the valves of system 1700 may be controlled by the control box 228. One or more valves of system 1700 may not be controlled by the control box 228.

The chamber 1220 may contain a balloon. The balloon may be a partition. In some embodiments, the balloon is fluidly coupled to the hot drum 1250 by way of piping. In some embodiments, hot fluid may fill the balloon. The hot fluid may expand within the balloon. In some embodiments, the balloon may be compressible. In some embodiments, the balloon may expand responsive to the actuation of the fifth valve 1255. In some embodiments, the balloon may compress responsive to the movement of the piston. The balloon may be made of a polymer. In some embodiments, the balloon is made of butyl rubber. The balloon may be a bladder. The balloon may exert pressure on the piston. In some embodiments, the balloon may push the piston towards the cold end 1222 as the balloon expands.

The chamber 1220 may contain a pocket of gas. In some embodiments, the pocket of gas may be a pocket of air. The pocket of gas may be contained in the cold end 1222. The pocket of gas may compress responsive to the movement of the piston and the balloon. The pocket of gas may exert a force upon the working fluid in the first pipe responsive to the compression of the pocket of gas.

The fifth valve 1255 may be configured to open at controlled intervals. The control box 228 may control the intervals at which the fifth valve 1255 opens. Hot fluid may flow into the balloon at the hot end 1221 of the chamber 1220 when the fifth valve 1255 is open. Hot fluid may flow out of the balloon at the hot end 1221 of the chamber 1220 when the sixth valve 1256 is open responsive to the movement of the piston. Hot fluid from the heat source 110 may expand within the balloon. The expanding hot fluid may exert a force on the piston within the chamber 1220.

The chamber 1220 may be fluidly coupled to the first pipe 1261. The first pipe 1261 may be fluidly coupled to the condenser 1230. The first pipe 1261 may receive working fluid from the condenser 1230. The working fluid in the first pipe 1261 may be pushed by the pocket of air within the chamber 1220 responsive to the flow of hot fluid into the balloon in the hot end 1221 of the chamber 1220. In some embodiments, the hot fluid may push the piston which may push the working fluid. The pressure of the working fluid may be raised when pushed on by the piston. The working fluid may be prevented from flowing back to the condenser 1230 by the seventh valve 1257. The seventh valve 1257 may be a check valve.

Expended heat source fluid from the chamber 1220 may be routed to the condenser 1230 through, the hot drum 1250, the sixth valve 1256, and associated piping. The sixth valve 1256 may be a solenoid drain valve (e.g., SDV 1800 of FIG. 18). In some embodiments, the sixth valve 1256 may be a low pressure valve (LPV).

FIG. 18 is a schematic diagram illustrating a solenoid drain valve (SDV) 1800, according to certain embodiments. In some embodiments, the sixth valve 1256 is a SDV 1800. For example, the sixth valve 1256 of FIG. 12 or of FIG. 17 that allows hot water that has cooled to drain from the lower portion of the hot drum 1250 to the condenser 1230 may be an SDV 1800. An SDV 1800 may actuate responsive to a signal from the control box 228. The SDV 1800 may be used in heat engines (e.g., one or more of system 100, system 200, system 300, system 700, system 1200, or system 1700).

The SDV 1800 may include one or more of a lower slug 1801, an upper slug 1802, a rod 1811, a spring 1812, a ball 1813, a solenoid 1821, a lower gasket 1831, an upper gasket 1832, a valve body 1840, and multiple sealing surfaces configured to seal ports or passages.

The lower slug 1801 and the upper slug 1802 may be cylindrical in shape. In some embodiments, the lower slug 1801 and the upper slug 1802 may be made of similar materials. In some embodiments, one or both of the lower slug 1801 and the upper slug 1802 are made of steel. In some embodiments, one or both of the lower slug 1801 and the upper slug 1802 are made of galvanized steel. The upper slug 1802 may be secured to the valve body 1840 with a fastener. In some embodiments, the upper slug 1802 is secured with a pin. The upper slug 1802 may have a hollow core configured to receive the rod 1811 and the spring 1812. The lower slug 1801 may slide freely within the valve body 1840. The lower slug 1801 may be prevented from passing a point in the valve body by a stop. The stop may be non-magnetic. The stop may be made of stainless steel. The stop may be made of rubber. In some embodiments, the stop is the lower gasket 1831. The lower gasket 1831 may be an O-ring.

The rod 1811 may pass through the hollow core of the upper slug 1802. In some embodiments, the rod 1811 may be able to slide freely through the hollow core of the upper slug 1802. A distal end of the rod 1811 may be attached to a spring. In some embodiments, the spring is cylindrical. In some embodiments, the spring is attached to the lower slug 1801. In some embodiments, the spring is spring 1812. The rod 1811 may protrude from an end of the upper slug 1802 when the SDV 1800 is closed. The rod 1811 may be made of a non-magnetic material. In some embodiments, the rod 1811 is made of acetal plastic (e.g., polyacetal and polyoxymethylene (POM)), a semi-crystalline engineered thermoplastic, etc.).

The ball 1813 may be attached to a distal end of the rod 1811. The ball 1813 may be attached to the rod 1811 by a fastener. In some embodiments, the ball 1813 may be threaded onto the rod 1811. The ball 1813 may be made of rubber. The ball 1813 may seat against the upper gasket 1832 to form a seal. The upper gasket 1832 may form a sealing surface. The upper gasket may be made of rubber. The upper gasket 1832 may be an O-ring. The ball 1813 and the rod 1811 may move together in relation to the valve body 1840.

Responsive to a signal, the solenoid 1821 may become energized. When the solenoid 1821 becomes energized, the lower slug 1801 may become magnetized. The lower slug 1801 may move toward the upper slug 1802 responsive to becoming magnetized. The lower slug 1801 may move responsive to magnetic force. As the lower slug 1801 rises, the spring 1812 may compress and exert a force upon the rod 1811. The rod 1811 may move responsive to the force exerted by the spring 1812. The rod 1811 may push the ball 1813 off a sealing surface, opening the valve and allowing fluid to pass. Responsive to a signal, the solenoid 1821 may become de-energized and the valve may close.

FIG. 19 is a schematic diagram illustrating a reverse float valve 1900, according to certain embodiments. The reverse float valve 1900 may include one or more of a reverse float ball 1901, a reverse float gasket 1902, and a reverse float body 1903. The reverse float ball 1901 may be hollow. In some embodiments, the reverse float ball 1901 may be made of metal. In other embodiments, the reverse float ball 1901 may be made of polypropylene plastic. The reverse float ball 1901 may seat against the reverse float gasket 1902 in the absence of liquid within the reverse float body 1903. The reverse float gasket 1902 may be made of rubber. In some embodiments, the reverse float gasket 1902 is an O-ring. When seated against the reverse float gasket 1902, the reverse float ball 1901 may cover a port. The reverse float ball 1901 may float on liquid present within the reverse float body 1903. The reverse float valve 1900 may be configured to allow the passage of liquid. The reverse float valve 1900 may be configured to prevent the passage of gas.

When the reverse float body 1903 fills with liquid, the reverse float ball 1901 may float on the liquid. When the reverse float ball 1901 floats on the liquid within the reverse float body 1903, the float ball 1901 may become unseated from the reverse float gasket 1902 and the liquid may drain from the reverse float body. When enough liquid drains from the reverse float body 1903 to no longer provide sufficient buoyancy, the reverse float ball 1901 may seat against the reverse float gasket 1902. The seating of the reverse float ball 1901 against the reverse float gasket 1902 may prevent the passage of gas through the reverse float valve 1900. In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "controlling," "providing," "maintaining," "generating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present disclosure. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A hybrid heat engine system comprising:
   a valve configured to provide a first fluid in a heated state directly from a heat source;
   one or more first pipes fluidly coupled between the valve and a turbine, the one or more first pipes housing a second fluid;
   a chamber disposed between the valve and the one or more first pipes;
   a piston disposed in the chamber between the first fluid and the second fluid, wherein at least a portion of the second fluid is to be pushed through the turbine to generate energy responsive to an actuation of the valve;
   a partition disposed in the chamber between the piston and the second fluid, wherein the partition is configured to compress and is configured to push the second fluid responsive to movement of the piston, wherein the partition is a first bladder filled with gas; and
   a second bladder disposed in the chamber proximate the valve.

2. The hybrid heat engine system of claim 1, wherein:
   a first distal end of the chamber is fluidly coupled to the heat source to receive the first fluid from the heat source responsive to the actuation of the valve;
   a second distal end of the chamber is fluidly coupled to the one or more first pipes to receive a first amount of the second fluid; and
   the piston is configured to move the first amount of the second fluid responsive to the actuation of the valve to increase pressure of the second fluid and to push the at least the portion of the second fluid through the turbine.

3. The hybrid heat engine system of claim 1 further comprising one or more second pipes fluidly coupled between the turbine and the one or more first pipes, wherein the second fluid has a cyclical flow from the one or more first pipes to the turbine, from the turbine to the one or more second pipes, and from the one or more second pipes to the one or more first pipes.

4. The hybrid heat engine system of claim 1 further comprising a condenser fluidly coupled to the heat source and the one or more first pipes, wherein the condenser is configured to condense at least a portion of the first fluid and to provide the at least the portion of the first fluid that has been condensed to the one or more first pipes responsive to the first fluid having pushed the piston within the chamber, the second fluid comprising the at least the portion of the first fluid that has been condensed and cooling water from the condenser.

5. The hybrid heat engine system of claim 1, wherein the piston is a slug of fluid.

6. The hybrid heat engine system of claim 1, wherein:
   the hybrid heat engine system is a hydraulic ram;
   the first fluid is steam;
   the heat source is a steam source; and
   the second fluid is water.

7. The hybrid heat engine system of claim 1 further comprising:
   an expansion tank fluidly coupled to the one or more first pipes, wherein the expansion tank is configured to regulate pressure of the second fluid in the one or more first pipes responsive to flow of the second fluid through the one or more first pipes toward the turbine.

8. The hybrid heat engine system of claim 1 further comprising a valve assembly disposed between the valve and the chamber, wherein the valve assembly is configured to regulate flow of the first fluid between the valve and the chamber.

9. The hybrid heat engine system of claim 1, wherein the chamber comprises:
   a first distal end that is at a first height and is configured to receive the first fluid from the heat source;
   a second distal end that is at a second height that is at least as high as the first height; and
   a U-shaped body that is routed from the first distal end to a third height and is routed from the third height to the second distal end, wherein the third height is lower than the first height and the second height.

10. A hybrid heat engine system comprising:
    a chamber housing a piston;
    one or more first pipes fluidly coupled between the chamber and a turbine, wherein responsive to an actuation of the piston within the chamber, a working fluid within the one or more first pipes is to be pushed through the turbine to generate energy, wherein the actuation of the piston is caused by actuating a valve to provide a heat source fluid to the chamber, and wherein the valve is configured to receive the heat source fluid in a heated state directly from a heat source;
    an expansion tank coupled to the one or more first pipes between the chamber and the turbine, wherein the expansion tank is configured to regulate change in pressure generated in the working fluid by the actuation of the piston;
    a partition disposed in the chamber between the piston and the working fluid, wherein the partition is configured to compress and is configured to push the working fluid responsive to the actuation of the piston, and wherein the partition is a first bladder filled with gas; and
    a second bladder disposed in the chamber proximate the valve.

11. The hybrid heat engine system of claim 10, wherein the actuation of the piston is caused by the actuating of the valve to provide the heat source fluid to a first distal end of the chamber, the heat source fluid being at a higher pressure than the working fluid at a second distal end of the chamber.

12. A method comprising:
    receiving, by a processor from a sensor, sensor data associated with a hybrid heat engine; and
    causing, by the processor based on the sensor data, an actuation of a valve to provide a first fluid in a heated state directly from a heat source into a chamber of the hybrid heat engine, wherein the first fluid causes a movement of a piston disposed within the chamber, wherein the movement of the piston causes a second fluid to be pushed through a turbine to generate energy, the turbine being fluidly coupled to the chamber via one or more first pipes, wherein a partition is disposed in the chamber between the piston and the second fluid, wherein the partition is a first bladder, and wherein a second bladder is disposed in the chamber proximate the valve.

13. The method of claim 12, wherein the piston is a fluid piston.

14. The method of claim 12, wherein the sensor is a pressure sensor and the sensor data indicates a drop in pressure in the chamber.

15. The method of claim 14, wherein:
    the actuation of the valve causes a first amount of the first fluid to enter the chamber;

the first amount of the first fluid causes the movement of the piston in a first direction away from the first amount of the first fluid; and subsequent to the movement of the piston in the first direction, the drop in pressure in the chamber causes an opposite movement of the piston in a second direction opposite to the first direction.

16. The method of claim 15, wherein the movement of the piston and the opposite movement of the piston cause a cyclical flow of the second fluid through the one or more first pipes, the turbine, and one or more second pipes fluidly coupled between the turbine and the one or more first pipes.

* * * * *